(12) United States Patent
Toyoda et al.

(10) Patent No.: US 6,608,296 B1
(45) Date of Patent: Aug. 19, 2003

(54) HIGH-SPEED VISION SENSOR HAVING A PARALLEL PROCESSING SYSTEM

(75) Inventors: Haruyoshi Toyoda, Hamamatsu (JP); Masatoshi Ishikawa, Kashiwa (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/807,039

(22) PCT Filed: Oct. 7, 1999

(86) PCT No.: PCT/JP99/05546
§ 371 (c)(1),
(2), (4) Date: Apr. 9, 2001

(87) PCT Pub. No.: WO00/21284
PCT Pub. Date: Apr. 13, 2000

(30) Foreign Application Priority Data

Oct. 7, 1998 (JP) .......................................... 10-285565
Mar. 16, 1999 (JP) .......................................... 11-070115

(51) Int. Cl.[7] .............................................. H01L 27/00
(52) U.S. Cl. ................................ 250/208.1; 250/214 R
(58) Field of Search ........................... 250/208.1, 214 R, 250/214 VT; 348/294, 308, 311, 304, 303, 302

(56) References Cited

U.S. PATENT DOCUMENTS 6,486,912 B1 * 11/2002 Aizawa et al. .............. 348/308

FOREIGN PATENT DOCUMENTS

| JP | A 6-195480 | 7/1994 |
| JP | A 7-85260 | 3/1995 |
| JP | B2 7-62866 | 7/1995 |
| JP | B2 7-95342 | 10/1995 |
| JP | A 8-235149 | 9/1996 |
| JP | A 10-145680 | 5/1998 |

OTHER PUBLICATIONS

"An Object Position and Orientation IC with Embedded Imager", David L. Standley, *Solid State Circuits*, vol. 26, No. 12, Dec. 1991, pp. 1853–1859. Reprinted from IEEE 0-8186-6492-4\95, pp. 387–393.

"Computing Motion Using Analog and Binary Resistive Networks", James Hutchinson, et al., *Computer*, vol. 21, Mar. 1988, pp. 52–64, Reprinted from IEEE 0-8186-6492-4\95, pp. 263–274.

"Artificial Retinas—fast versatile image processors", Kazuo Kyuma, et al., *Nature*, vol. 372, Nov. 10, 1994 pp. 197–198.

"Stereo Vision" Masatoshi Okutomi ("Computer Vision", edited by Matsuyama, et al., *New Technology Communications*, Jun. 1998, pp. 123–124.

"Stereo Image–Based 3–D Sensing", Masatoshi Okutomi, Graduate School of Information Science and Engineering, Tokyo Institute of Technology, text for the Fourth Image Sensing Symposium, Jun. 1998 (w/ abstract).

(List continued on next page.)

*Primary Examiner*—Que T. Le
(74) *Attorney, Agent, or Firm*—Oliff & Berridge, PLC

(57) ABSTRACT

A high-speed vision sensor has: an analog-to-digital converter array 13 including analog-to-digital converters 210 corresponding to respective lines of photodetectors 120 of a photodetector array 11, and a parallel processing system 14 including processing elements 400 and shift registers 410. The processing elements 400 are provided in one to one correspondence with the photodetectors 120. The shift registers 410 are provided in one to one correspondence with the photodetectors 120. Because the processing elements 400 carry out the image processing between neighboring pixels by parallel processing at high speed, independently from the operation in the shift registers 410, the processing and shifting can be performed efficiently.

11 Claims, 30 Drawing Sheets

OTHER PUBLICATIONS

"High Speed Vision System Using Massively Parallel Processing", Masatoshi Ishikawa et al. Proceedings of the 1992 IEEE/RSJ International Conference on Intelligent Robots and Systems, Jul. 7–10, 1992. Printed from IEEE 0–7803–0737–2\92 pp. 373–377.

"Massively Parallel Processing Vision and Its Application", Masatoshi Ishikawa, et al., Methodologies for the Conception, Design and Application of Intelligent Systems, Proceedings of IIZUKA '96 pp. 117–120 (Month unknown).

"Architecture for massively parallel processing vision chip", Takashi Komura et al., Technical Report of IEICE, 1995–04 pp. 63–69 (w/ abstract) (Month unknown).

"Control Architecture for Massively Parallel Processing Vision Chip", Tatsuya Murata, et al., Technical report of IEICE (1997–11), pp. 161–168 (w/ abstract) (Month unknown).

"Massively Parallel Processing Vision Chip Architecture" Idaku Ishii, et al. Television Commission Technical Report vol. 19, No. 57, pp. 13–18, Oct. 27, 1995. (w/ abstract).

"Massively Parallel and Ultra high speed vision information processing system–a general use vision chip and a hierarchial photoelectron vision system", Masatoshi Ishikawa, Applied Physics, vol. 67, No. 1, 1998, pp. 33–38. (w/ abstract) (Month unknown).

* cited by examiner

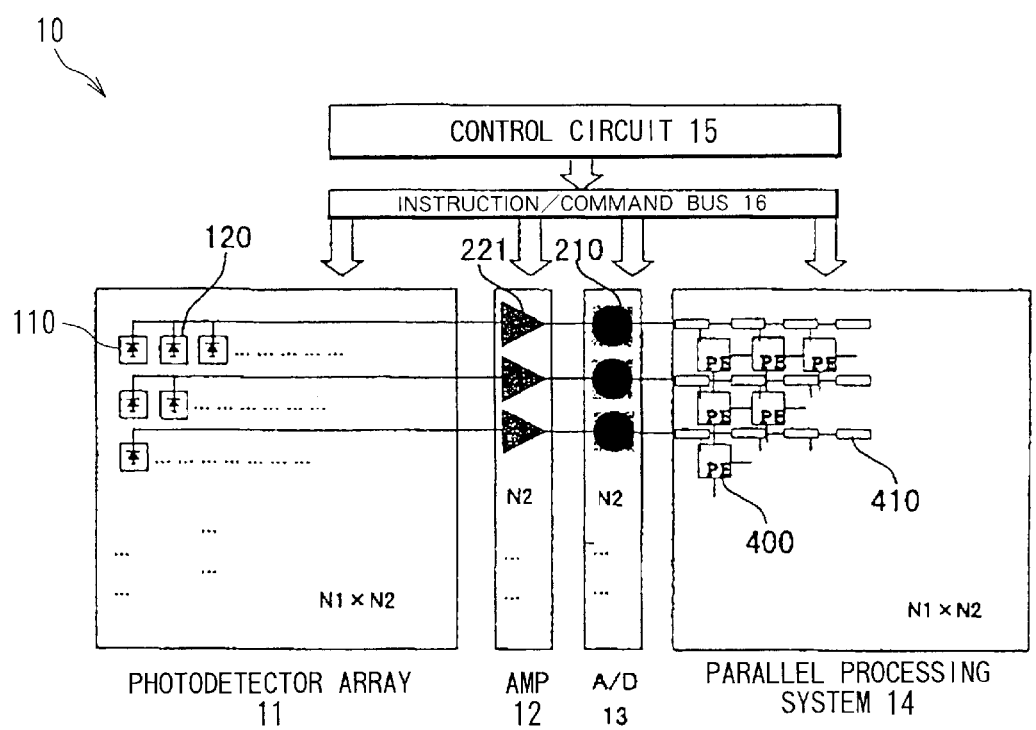

HIGH-SPEED VISION SENSOR HAVING A PARALLEL PROCESSING SYSTEM

TECHNICAL FIELD

The present invention relates to a high-speed vision sensor having an image processing function.

BACKGROUND ART

High-speed image processing is required to operate high-speed robots in a factory automation (FA) system or the like. For example, when a robot is configured with a feedback loop between its vision sensor and its actuator, the actuator can be controlled in units of milliseconds. Accordingly, the image processing speed matching this speed is required. However, because the image processing speed in modern vision systems is limited by the video frame rate, the robot can only operate at low speeds matching the image processing speed. It is impossible to take full advantage of the robot's performing capability.

There are some high-speed CCD cameras that can take images at intervals of about one (1) millisecond. In these devices, the images are temporarily stored in memory and later read and processed. Therefore, the devices can be applied to such applications as image analysis. However, the devices have almost no real-time capability, and are not suitable for controlling robots or similar real-time applications.

In order to overcome these problems, institutes such as the Massachusetts Institute of Technology, the California Institute of Technology, and Mitsubishi Electric Corporation have been researching a vision chip that combines the image reading portion and the processing portion into one unit ("An Object Position and Orientation IC with Embedded Imager," David L. Standley, Solid State Circuits, Vol. 26, No. 12, Dec. 1991, pp. 1853–1859, IEEE); "Computing Motion Using Analog and Binary Resistive Networks," James Hutchinson, et al., Computer, Vol. 21, March 1988, pp. 52–64, IEEE); and "Artificial Retinas—fast versatile image processors," Kazuo Kyuma, et al., Nature, Vol. 372, Nov. 10, 1994). However, these chips employ a fixed analog circuit that is easy to integrate. Accordingly, these circuits have such shortcomings as requiring subsequent-processing of output signals and a lack of universality. Hence, the type of image processing they can perform is limited to special applications.

Japanese Unexamined Patent Application Publication HEI-10-145680 has proposed a vision chip that is capable of performing universal image processing. This vision chip is provided with a processing element for each photodetector. An analog-to-digital converter is provided for each photodetector row. Therefore, the vision chip can reduce the processing time through parallel processing. The vision chip can also reduce the number of transmission lines between the photodetectors and the processing elements, achieving an optimal integration level for both.

However, since this vision chip is configured to use the processing elements themselves when transferring data thereto, processing cannot be performed during image transfers. It is noted that it is necessary to perform image processing over a plurality of images in order to detect the shape of objects or to detect movement. Since conventional methods temporarily read a plurality of images into memory before processing, such processing cannot be performed in real-time.

DISCLOSURE OF THE INVENTION

In view of the foregoing, it is an object of the present invention to provide a multi-pixel high-speed vision sensor which has a simple circuit construction and which is capable of performing efficient high-speed calculations even over a plurality of images.

In order to attain the object, the high-speed vision sensor of the present invention comprises: at least one photodetector array, each having a plurality of photodetectors which are arranged two-dimensionally in a plurality of rows and in a plurality of columns; an analog-to-digital converter array having a plurality of analog-to-digital converters which are arranged one-dimensionally such that each analog-to-digital converter corresponds to one row in the at least one photodetector array, each analog-to-digital converter converting, into digital signals, analog signals which are successively outputted from the photodetectors in the corresponding row; a parallel processing system, including a parallel processing element array and a shift register array, the parallel processing element array having a plurality of processing elements which are arranged two-dimensionally in a plurality of rows and in a plurality of columns and in one-to-one correspondence with the plurality of photodetectors in the at least one photodetector array, each processing element performing a predetermined calculation on digital signals transferred from the analog-to-digital converter array, the shift register array having a plurality of shift registers which are disposed in one-to-one correspondence with the plurality of analog-to-digital converters and in one-to-one correspondence with the plurality of rows of processing elements, each shift register successively transferring digital signals, which are received from the corresponding analog-to-digital converter and which are equivalent to signals outputted from the photodetectors in a corresponding photodetector row, to predetermined processing elements in the corresponding row; and a control circuit controlling the photodetector array and the analog-to-digital converter array to output digital signals for a single frame and controlling the shift register array to transfer the digital signals of the single frame to the parallel processing element array, and thereafter controlling the photodetector array and the analog-to-digital converter array to output digital signals for the next frame and controlling the shift register array to transfer the digital signals of the next frame to the parallel processing element array, while simultaneously controlling the parallel processing element array to perform the predetermined calculation onto the single frame.

According to the present invention, the plurality of processing elements are provided in one to one correspondence with the plurality of photodetectors. It is therefore possible to perform high-speed image processing through parallel processing. Additionally, the shift registers are used as being dedicated to transferring data for processing. Accordingly, image processing can be performed during the transfer process. Image processing can be performed efficiently by reducing the wait time for both of the transfer process and the calculating process, thereby reducing the overall processing time. It is therefore possible to achieve a pipeline operation. It is possible to perform high-speed image processing, and particularly real-time processing. An analog-to-digital converter is provided for each row. Accordingly, the total number of transmission paths can be reduced.

When the high-speed vision sensor has a plurality of photodetector arrays, the parallel processing system may preferably include, in correspondence with each processing element row, a plurality of lines of shift registers, the number of the plurality of lines being equal to the number of the plurality of photodetector arrays.

With this construction, the plurality of lines of shift registers are provided for transferring, to each row of processing elements, data from the corresponding row of photodetectors in the plurality of photodetector arrays. Accordingly, even when the high-speed vision sensor has plural photodetector arrays, image signals from the plural photodetector arrays can be transferred independently from one another, thereby requiring no extra time for the transfer process than when the high-speed vision sensor has only one photodetector array. Therefore, the image processes, including the calculating processes, can be performed at a high rate of speed.

The plurality of photodetector arrays may be disposed at positions different from one another. The control circuit may include: a parallel processing control portion controlling the respective lines of shift registers to transfer images which are taken at different positions and outputted from the corresponding photodetector arrays, and controlling the parallel processing system to perform calculations, based on image signals obtained by the plurality of photodetector arrays, to determine the amount of positional shift, of an object, between its images taken by the plurality of photodetector arrays; and a calculating portion calculating three-dimensional positional information of the object based on the determined amount of positional shift and information on the position of each photodetector array and on the direction in which each photodetector array takes images.

By arranging the plurality of photodetector arrays in different positions and by controlling the photodetector arrays to take images of the same object, images obtained by the respective photodetector arrays will correspond to images of the object projected in predetermined directions. It is possible to determine the three-dimensional position of the object by using trigonometry based on the positions of the same portion of the object in the respective images. The above-described process requires at least two photodetector arrays. However, three or more photodetector arrays can be used in order to improve accuracy and to reduce blind spots.

In order to determine the three-dimensional position of the object, the plurality of photodetector arrays may preferably be arranged such that data transfer directions, along which the rows of the photodetectors in the respective photodetector arrays extend to transfer data from the photodetectors, are lined up in the same direction and such that corresponding photodetectors in the plural photodetector arrays are positioned to be shifted from one another in the data transfer direction. The parallel processing control portion may control the parallel processing system to calculate, based on the image signals obtained by the plural photodetector arrays, the amount of positional shift along the data transfer direction among the images taken by the plural photodetector arrays.

In this way, the direction of data transfer is the same for all the photodetector arrays, and corresponding photodetectors in the photodetector arrays are disposed in positions which are shifted from one another in the data transfer direction. Accordingly, a matching point of the images detected by the photodetector arrays will appear in different positions in the images taken by the plural photodetector arrays. This shift in position will occur in the same direction as that in which the photodetector arrays are shifted, that is, the direction of data transfer. Because the direction in which the shift in position occurs is the same as the data transfer direction, it becomes easy to shift one image in relation to another image by controlling the transfer amount of data transfer. It therefore becomes easy to search the same part of images and, therefore, to detect three-dimensional positional information.

Preferably, the high-speed vision sensor may further comprise a pixel shift amount storage device storing the amount of positional shift, along the data transfer direction, which is calculated by the parallel processing system with respect to the plurality of images taken by the plurality of photodetector arrays. The parallel processing control portion may control, based on the stored positional shift amount, the transfer position of the processing elements, to which each line of shift registers transfers an image signal.

With this construction, it is possible to perform calculations using, as a reference, the positional shift amount calculated for the previous frame. Hence, calculations of the positional shift amount and recognition of the matching point can be performed more quickly.

Alternatively, the high-speed vision sensor may further comprise: a timing controller that controls the plurality of photodetector arrays to take images at timings independent from one another; and a beam splitter that enables the plurality of photodetector arrays to pick up images from the same direction. The control circuit may include a parallel processing control portion controlling the plural lines of shift registers to transfer images taken by the respective photodetector arrays at the different times, and controlling the processing elements to perform calculation onto the images taken at the different times.

The timings when images are taken by the photodetector arrays are controlled independently from one another. Thus, the times when images are obtained are controlled. Additionally, the photodetector arrays are made to take images of the object from the same direction. Accordingly, the plural photodetector arrays can take images at different times at short intervals. It is possible to obtain a plurality of frame images at different times by transferring those images using the different lines of shift registers. By performing calculations onto those images, it is possible to easily attain the recognition of a high-speed moving object or of movement.

The high-speed vision sensor may further comprise a filtering/beam splitter mechanism enabling the plurality of photodetector arrays to pick up, from the same direction, color-separated images, of an object, which have colors different from one another. The control circuit may include a parallel processing control portion controlling the plural lines of shift registers to transfer the color-separated images outputted from the respective photodetector arrays and controlling the processing elements to perform calculations onto the color-separated images.

With this construction, color-separated image data is transferred from each photodetector array to the processing elements. Hence, the processing elements can easily perform image processes such as color adjustment or color correction.

The high-speed vision sensor may further comprise data supply mechanism supplying predetermined data required for image processing calculation. Each shift register may successively transfer output signals, outputted from the corresponding analog-to-digital converter, and the predetermined data, supplied from the data supply mechanism, to the predetermined processing elements in the corresponding processing element row. The control circuit may control the photodetector array, the analog-to-digital converter array, the parallel processing system, and the data supply mechanism.

With this construction, not only image data from the photodetectors, but also various types of data, necessary for processing, is transferred to the processing elements using the dedicated shift registers. Accordingly, it is possible to perform these data transfer operation in parallel with the image processing operation.

The data supply mechanism may preferably include a time-sharing mixing unit combining, according to a time-sharing manner, output signals outputted from the analog-to-digital converters and the predetermined data. By combining, in a time-sharing manner, image data and the predetermined data necessary for processing, both types of data can be transferred reliably and efficiently on the same line of shift registers.

Alternatively, the parallel processing system may further include a plurality of data-transfer shift registers which are arranged in one-to-one correspondence with the plurality of rows of processing elements, each data-transfer shift register supplying the predetermined data to the respective processing elements in the corresponding row.

With this construction, the high-speed vision sensor is provided with two separated groups of shift registers: one group being for transferring input image data; and the other being for transferring the predetermined data required for image processing. Accordingly, the high-speed vision sensor can achieve a pipeline process by performing in parallel: the calculation operation with the processing elements, the transferring operation of input image data, and the transferring operation of other data required for image processing, thereby enabling the high-speed image processing and, particularly, the real time image processing.

When the high-speed vision sensor has a plurality of photodetector arrays, the parallel processing system may preferably include a single line of shift register for each processing element row, the single line of shift register being used in a time-sharing manner to transfer the output signals from the plurality of photodetector arrays.

BRIEF DESCRIPTION OF THE DRAWINGS

FIG. 36 is a block diagram showing a modification of the high-speed vision sensor of the present invention.

BEST MODE FOR CARRYING OUT THE INVENTION

Figure 1:
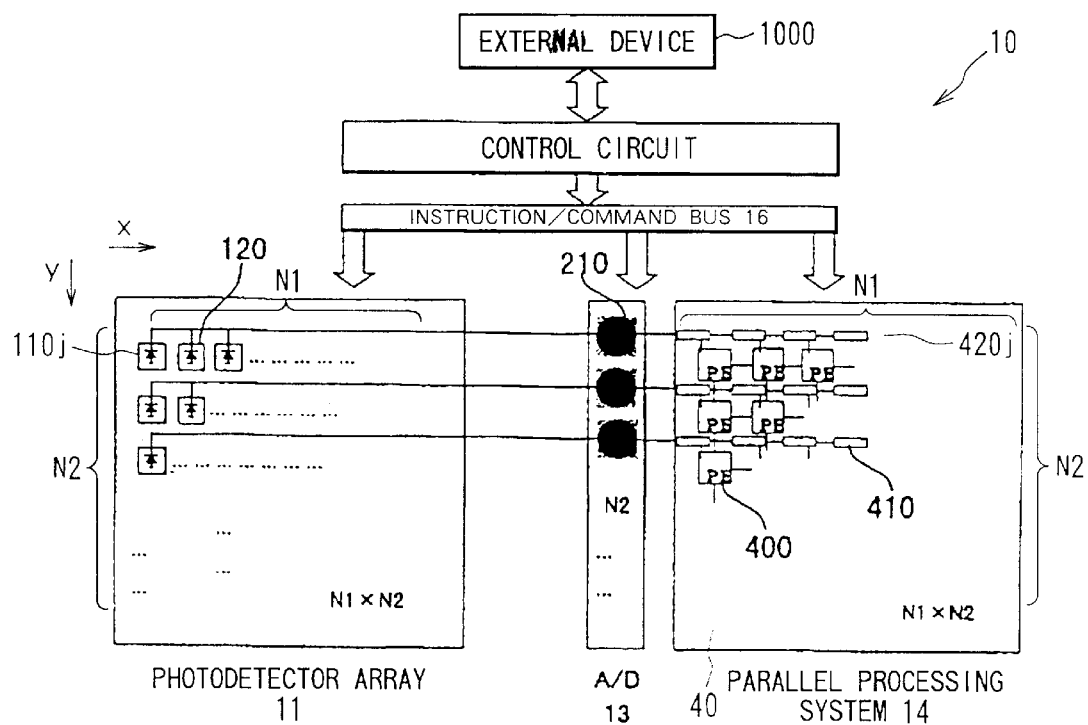
FIG. 1 is a block diagram showing a high-speed vision sensor according to a first embodiment of the present invention.

A high-speed vision sensor according to preferred embodiments of the present invention will be described while referring to FIGS. 1–36.

It is noted that the same parts and components are designated by the same reference numerals to avoid duplicating description.

First, a high-speed vision sensor 1 according to a first embodiment of the present invention will be described with reference to FIGS. 1–11.

FIG. 1 is a block diagram showing the high-speed vision sensor 10 according to the present embodiment.

First, a brief description will be given for the overall configuration of the high-speed vision sensor 10, with reference to FIG. 1. The high-speed vision sensor 10 of the present embodiment includes a photodetector array 11, an analog-to-digital converter array 13, a parallel processing system 14, a control circuit 15, and an instruction/command bus 16.

N1×N2 photodetectors 120 are arranged two-dimensionally (that is, N2 rows×N1 columns) in the photodetector array 11. In other words, a horizontal photodetector row 110 includes N1 photodetectors 120 which are lined up in the horizontal direction (X direction). The photodetector array 11 includes N2 photodetector rows 110 which are arranged vertically (Y direction), that is, orthogonal to the horizontal direction (X direction).

The analog-to-digital converter array 13 includes N2 analog-to-digital converters 210 which are arranged one-dimensionally (vertically in the Y direction). N2 analog-to-digital converters 210 are arranged in one-to-one correspondence with the N2 photodetector rows 110 in the photodetector array 11. Each analog-to-digital converter 210 is for successively converting electric charges, outputted from photodetectors 120 that belong to a corresponding photodetector row 110, into voltage signals and then further analog-to-digital converting the voltage signals into digital signals.

The parallel processing system 14 is provided with a processing element array 40. The processing element array 40 includes N1×N2 processing elements (PE) 400 that are arranged two-dimensionally (that is, N2 rows×N1 columns) in one-to-one correspondence with the photodetectors 120. The processing element array 40 is also provided with N2 shift register lines 420 (lines of shift registers for transferring image data) in one-to-one correspondence with the N2 rows of processing elements. Each shift register line 420 includes N1 shift registers 410 (shift registers for image data transfers). The total number N1 of the shift registers in each line 420 is equal to the total number of processing elements 400 in the corresponding row. The N1 shift registers 410 are connected in series in each shift register line 420. Each shift register 410 is connected to a corresponding processing element 400 of the corresponding row.

The control circuit 15 is for controlling the entire circuit in the high-speed vision sensor 10 by transmitting command signals thereto. The instruction/command bus 16 is for transferring signals from the control circuit 15 to each circuit.

Figure 2:
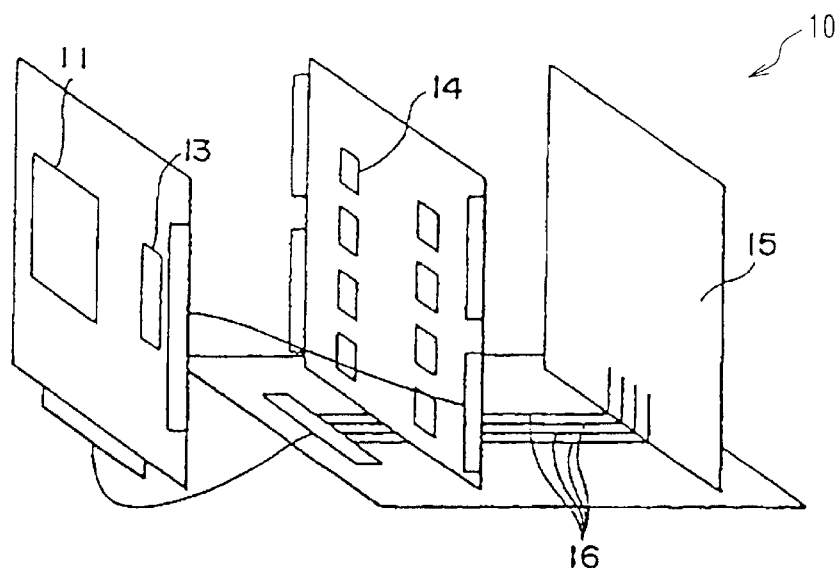
FIG. 2 is a schematic view showing the construction of the high-speed vision sensor of the first embodiment.
Figure 3:
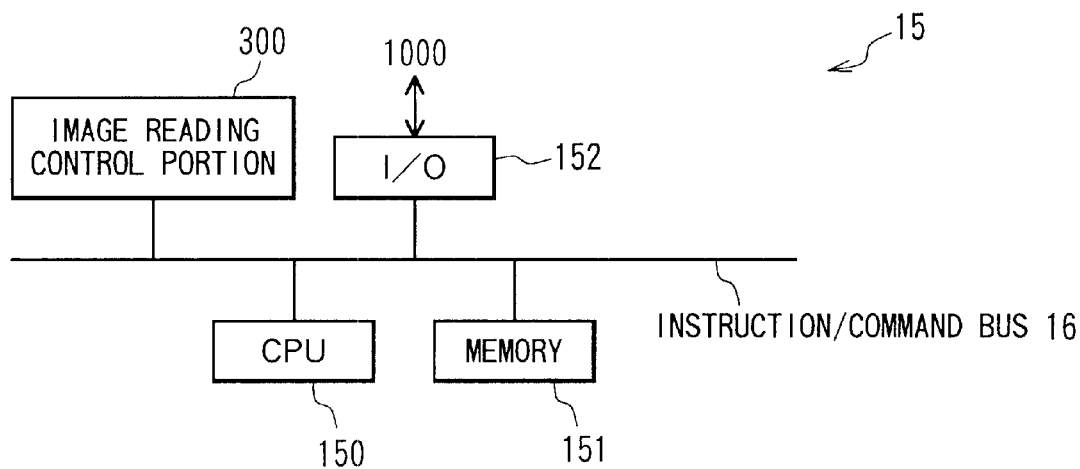
FIG. 3(A) is a structural block diagram showing a control circuit employed in the high-speed vision sensor of the first embodiment.
FIG. 3(B) is a functional block diagram showing the control circuit employed in the high-speed vision sensor of the first embodiment.
Figure 3:
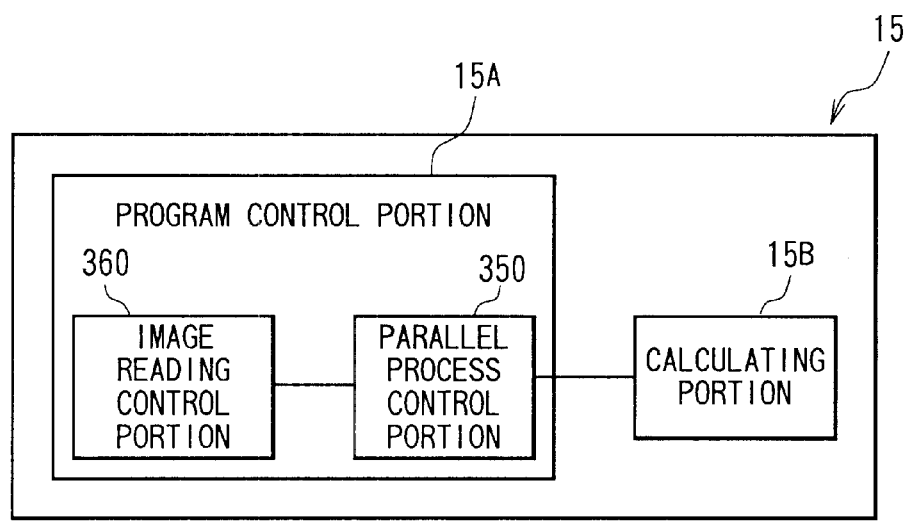

With this construction, N2 data lines are used in the high-speed vision sensor 10 to connect the photodetector array 11 with the parallel processing system 14. Accordingly, the photodetector array 11 and the parallel processing system 14 can be formed on separate circuit boards, as shown in FIG. 2, in a configuration that enables the operations of each device to be verified separately.

Therefore, production of the high-speed vision sensor 10 can be more stable. Further, by forming the photodetector array 11 and the parallel processing system 14 on separate circuit boards in this way, it is possible to manufacture both devices with a high level of integration. In addition, it is possible to employ a processing method suitable for the characteristics of each device, thereby enabling a more stable production. It is noted that as shown in FIG. 2, the parallel processing system 14 is divided into a plurality of regions and mounted on a circuit board. However, such division is not necessary. It is also noted that because each component of the high-speed vision sensor 10 can be entirely created using the CMOS process, it is possible to create all the components on one chip, thereby greatly reducing production costs.

Next, the components of each circuit will be described

FIG. 3(A) is a block diagram showing the construction of the control circuit 15. The control circuit 15 includes a CPU 150, a memory 151, an image reading control portion 300 (see FIG. 4), an input/output interface 152, and the like. All of these components are connected by the instruction/command bus 16. The input/output interface 152 is for performing input/output operation with an external device. The memory 151 stores therein data of programs to be executed by the CPU 150. The programs include: a vision sensor process program (shown in FIG. 8) which will be described later; and an image process program for controlling the parallel processing system 14 to execute a parallel image processing (FIG. 9, for example) during an image processing step (S200 in FIG. 8) of the vision sensor process program. Data of the vision sensor process program and the image process program is written in the memory 151 via the I/O interface 152 by an external device 1000 (an external computer, for example).

Based on the vision sensor process program stored in the memory 151, the CPU 150 controls the photodetector array 11 and the analog-to-digital converter array 13, via the image reading control portion 300, and controls the parallel processing system 14. The CPU 150 further calculates overall characteristic quantities of an object, being viewed, based on the results of the image processing calculations which are performed by the parallel processing system 14 during the image processing step (S200). The overall characteristic quantities include the center of gravity, displacement, and moving speed of the object being viewed. After calculating the overall characteristic quantities, the CPU 150 outputs the calculated results to the external device 1000 (for example, an external computer or an external actuator) via the I/O interface 152.

FIG. 3(B) is block diagram showing the functions of the control circuit 15. The control circuit 15 has a program control portion 15A and a calculating portion 15B according to the function of the CPU 150 that executes the vision sensor process program of FIG. 8. By executing the vision sensor process program of FIG. 8, the program control portion 15A controls the photodetector array 11 and the analog-to-digital converter array 13, via the image reading control portion 300, and also controls the parallel processing system 14. More specifically, the program control portion 15A includes an image reading process control portion 360 (S101 in FIG. 8) and a parallel process control portion 350 (S102–S106 in FIG. 8). The image reading process control portion 360 is for controlling the image reading control portion 300 (see FIG. 4) to pick up images by the photodetector array 11 and the analog-to-digital converter array 13. The parallel process control portion 350 is for controlling both of: data transfers executed by the shift registers 410 in the parallel processing system 14, and calculations executed by the processing elements 400, thereby achieving single instruction and multi-data stream (SIMD) parallel processing. The calculating portion 15B performs required calculations, while the program control portion 15A is executing the vision sensor process program. The calculating portion 15B further calculates, based on results obtained by the vision sensor process program, the overall characteristic quantities, such as the area and the center of gravity, of the picked up images, and makes determinations. The calculating portion 15B also communicates with the external device 1000, such as an external computer, or controls a separate external device 1000, such as an external actuator.

Next, the structure of the photodetector array 11 and the analog-to-digital converter array 13, which serve as an image reading portion, will be described in detail with reference to FIGS. 4 and 5.

The photodetector array 11 functions as a light receiving unit for detecting light. The analog-to-digital converter array 13 functions as a signal processing unit for converting electric current signals outputted from the photodetector array 11 to voltage signals and further for performing analog-to-digital conversion onto the voltage signals. The image reading control portion 300, in the control circuit 15, is connected to both of the photodetector array 11 and the analog-to-digital converter array 13. The image reading control portion 300 functions as a timing control unit for transmitting instructions signals, indicative of operation timings, to both of the photodetector array 11 and the analog-to-digital converter array 13.

First, the structure of the photodetector array 11 (light receiving portion) will be described.

Figure 4:
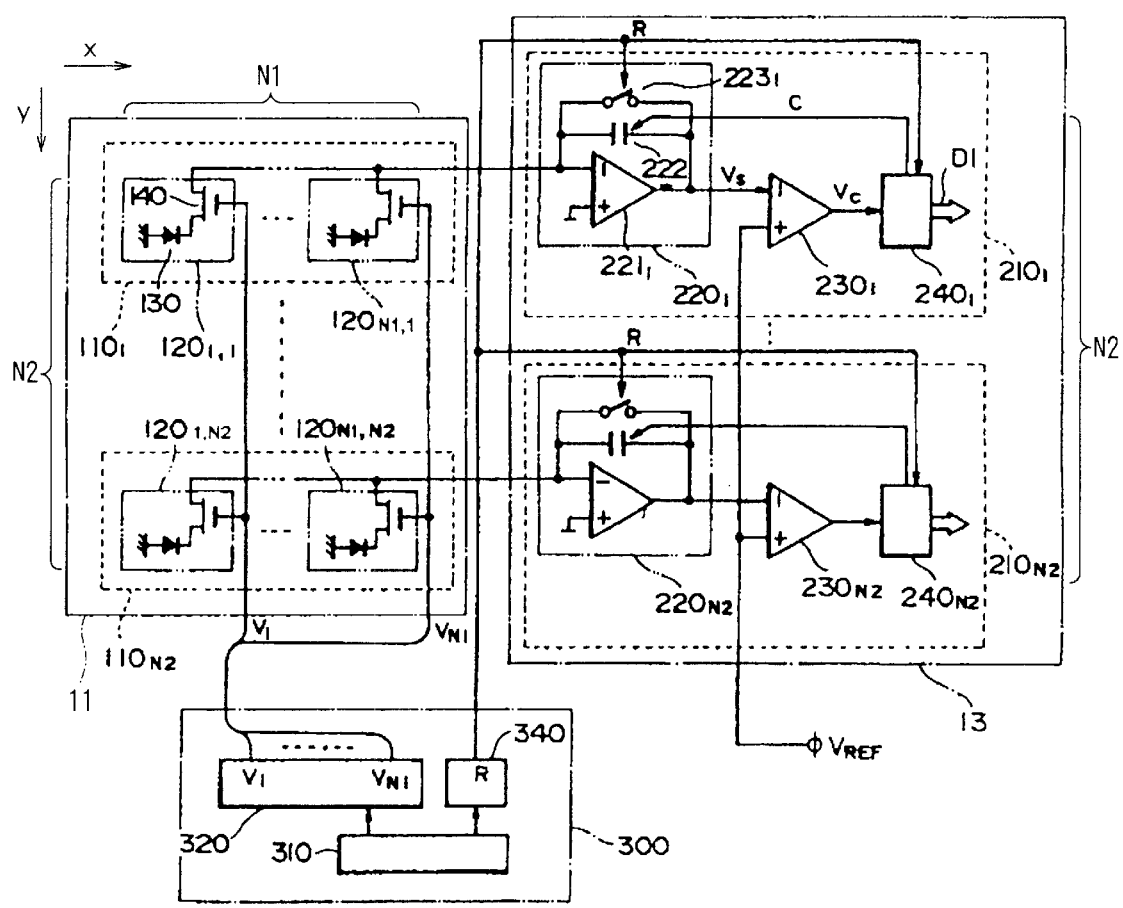
FIG. 4 is a circuit diagram showing a photodetector array and an analog-to-digital converter array of the high-speed vision sensor of the first embodiment.

As shown in FIG. 4, each photodetector 120 is configured from a photoelectric conversion element 130 and a switch element 140. The photoelectric conversion element 130 is for generating an electric charge according to the intensity of received light. The switch element 140 is connected to a signal output terminal of the photoelectric conversion element 130. The switch element 140 outputs the electric charge, accumulated in the photoelectric conversion element 130, in response to a horizontal scan signal $V_i$ (i=1~N1). Each photodetector row 110 is constructed from N1 photodetectors 120 arranged in the horizontal direction (x-direction) with their corresponding switch elements 140 being connected with one another. The photodetector array 11 is constructed from N2 photodetector rows 110 which are arranged vertically (in the y-direction), that is, perpendicularly to the horizontal direction. Thus, the photodetectors $120_{i,j}$ (i=1~N1, j=1~N2) are arranged two-dimensionally in N1 columns×N2 rows.

Next, the structure of the analog-to-digital converter array 13 will be described with reference to the same FIG. 4. The analog-to-digital converter array 13 serves as the signal processing unit.

The analog-to-digital converter array 13 is constructed from N2 analog-to-digital converters $210_j$ (j=1~N2).

Each analog-to-digital converter $210_j$ is for extracting electric charges individually from the respective photodetectors in the corresponding photodetector row $110_j$ (j=1~N2), for processing the electric charges, and for outputting digital signals corresponding to the magnitudes of the electrical charges.

Each analog-to-digital converter $210_j$ includes: an integrating circuit $220_j$ having a charge amp $221_j$; a comparator circuit $230_j$; and a capacity control mechanism $240_j$.

The integrating circuit $220_j$ includes: the charge amp $221_j$; a variable capacity unit $222_j$; and a switch element $223_j$. The charge amp $221_j$ is for amplifying the charge of an input signal received from the photodetector row $110_j$. The variable capacity unit $222_j$ is connected, on one end, to the input terminal of the charge amp $221_j$, and is connected, on the other end, to the output terminal of the same. The switch element $223_j$ is connected, on one end, to the input terminal of the charge amp $221_j$, and is connected, on the other end, to the output terminal of the same. The switch element $223_j$ is turned ON or OFF in response to a reset signal R which is supplied from the image reading control portion 300, thereby toggling the operation of the integrating circuit $220_j$ between an integrating state and a not-integrating state.

Figure 5:
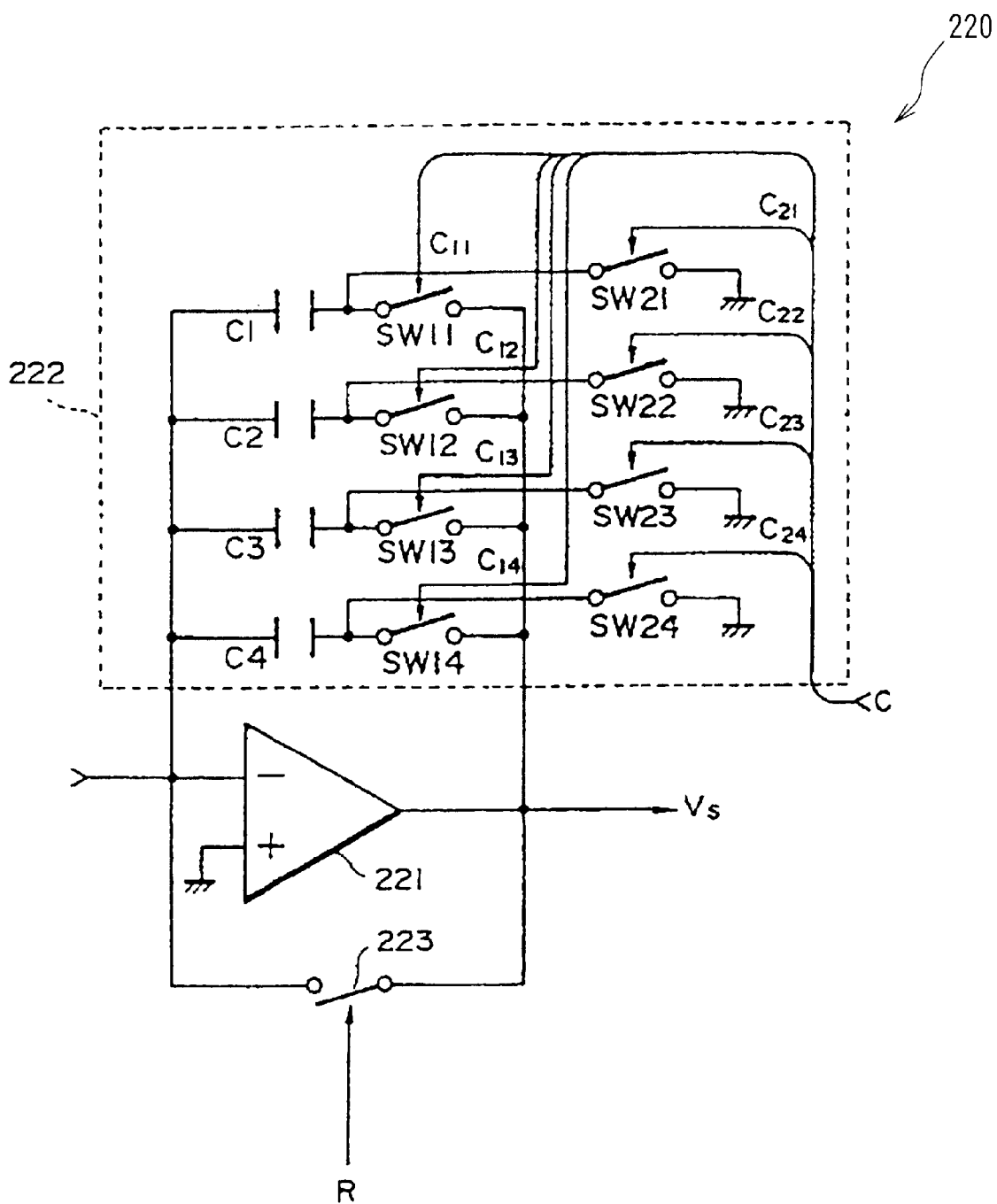
FIG. 5 is a detailed circuit diagram showing the integrating circuit in the analog-to-digital converter array of FIG. 4.

FIG. 5 shows a more detailed construction of the integrating circuit 220. This drawing shows one example of the integrating circuit that has an analog-to-digital converting function with a 4-bit (16 gradation) resolution. The integrating circuit 220 will be described below for this circuit structure.

The variable capacity unit 222 includes: capacity elements C1–C4; switch elements SW11–SW14; and other switch elements SW21–SW24. Each of the capacity elements C1–C4 is connected, on one end, to the input terminal of the charge amp 221 that receives signals outputted from the corresponding photodetector row 110. Each of the switch elements SW11–SW14 is connected between the other end of a corresponding capacity element C1–C4 and the output terminal of the charge amp 221. The switch elements SW11–SW14 are for opening and closing in response to capacity instructions signals $C_{11}$–$C_{14}$, respectively. Each of the switch elements SW21–SW24 has one terminal, which is connected between the corresponding capacity element C1–C4 and the corresponding switch element SW11–SW14, and another terminal, which is connected to a ground level GND. The switch elements SW21–SW24 are for opening and closing in response to capacity instructions signals $C_{21}$–$C_{24}$, respectively. The capacities $C_1$–$C_4$ of the capacity elements $C_1$–$C_4$ have the following relationships:

$$C_1 = 2C_2 = 4C_3 = 8C_4$$

$$C_0 = C_1 + C_2 + C_3 + C_4$$

Wherein $C_0$ is the maximum electrical capacity required by the integrating circuit 220. It is assumed that the saturation charge of the light receiving element 130 (see FIG. 4) is $Q_0$ and that a reference voltage is $V_{REF}$. In this case, the following relationship is satisfied:

$$C_0 = Q_0 / V_{REF}$$

The remainder circuits in the analog-to-digital converter $210_j$ other than the integrating circuit $220_j$ will be described below while once again referring to FIG. 4. The comparator circuit $230_j$ is for comparing the value of an integral signal $V_s$, which is outputted from the integrating circuit $220_j$, with the reference voltage $V_{REF}$, and for outputting a comparison result signal $V_c$. Based on the value of the comparison result signal $V_c$, the capacity control mechanism $240_j$ outputs a capacity instruction signal C to notify the variable capacity unit $222_j$ in the integrating circuit $220_j$. The capacity control mechanism $240_j$ also outputs a digital signal D1 that corresponds to the capacity instruction signal C.

It is noted that the analog-to-digital converter array 13 has been described above for the case where the analog-to-digital converter array 13 has a 4-bit (16 gradation) resolution. However, the analog-to-digital converter array 13 can be configured to have a 6-bit, 8-bit, or other bit resolution.

The image reading unit 11, 13, having the above-described structure, is controlled in image reading timings by the image reading control portion 300 in the control circuit 15. As shown in FIG. 4, the image reading control portion 300 includes: a basic timing portion 310, a horizontal shift register 320, and a control signal portion 340. The basic timing portion 310 is for generating a basic timing to attain clock control of the entire circuits 11 and 13. The horizontal shift register 320 is for generating a horizontal scan signal $V_i$ according to a horizontal scan instruction inputted from the basic timing portion 310. The control signal portion 340 is for generating a reset instruction signal R.

Next, the structure of the processing elements 400 and the shift registers 410 that make up the parallel processing system 14 will be described.

Figure 6:
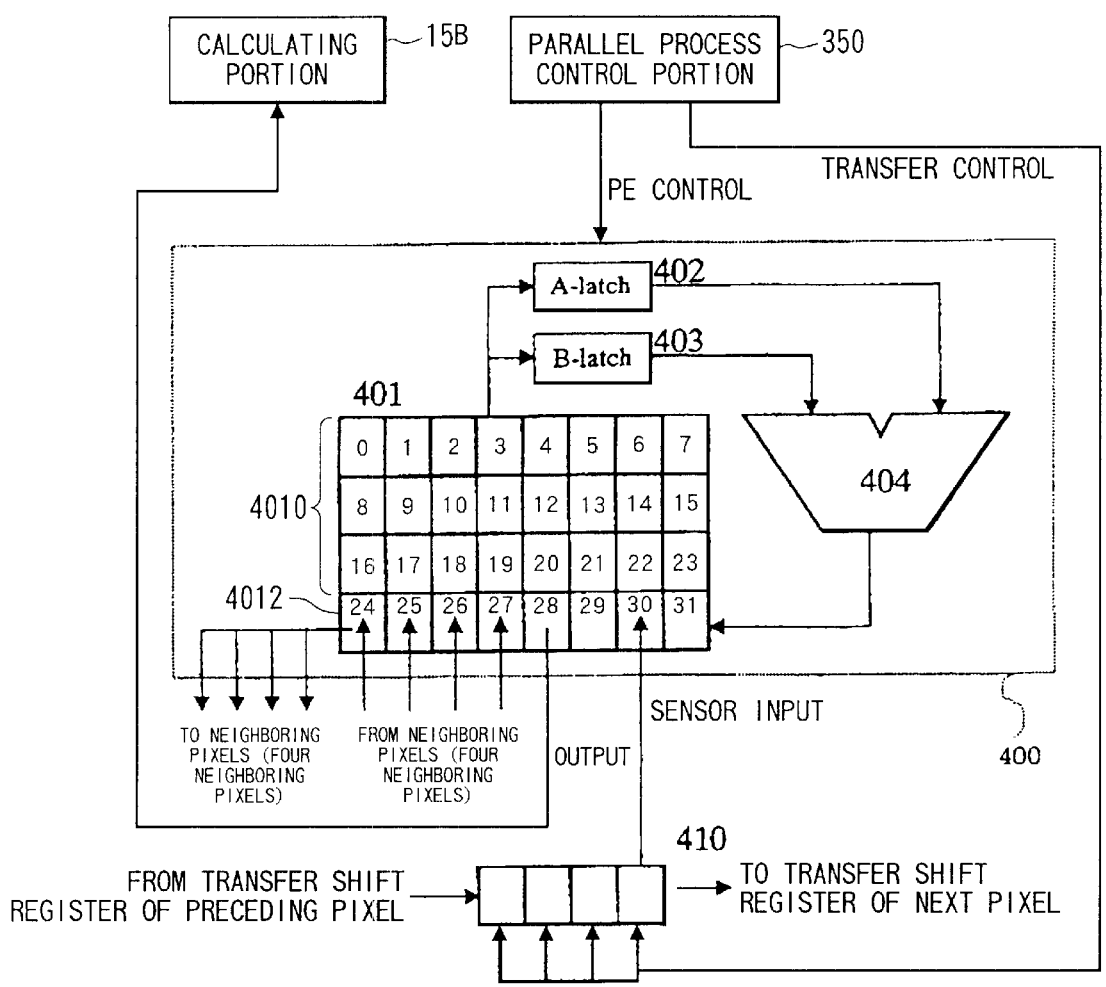
FIG. 6 is a block diagram showing a processing element and a shift register employed in the high-speed vision sensor of the first embodiment.
Figure 7:
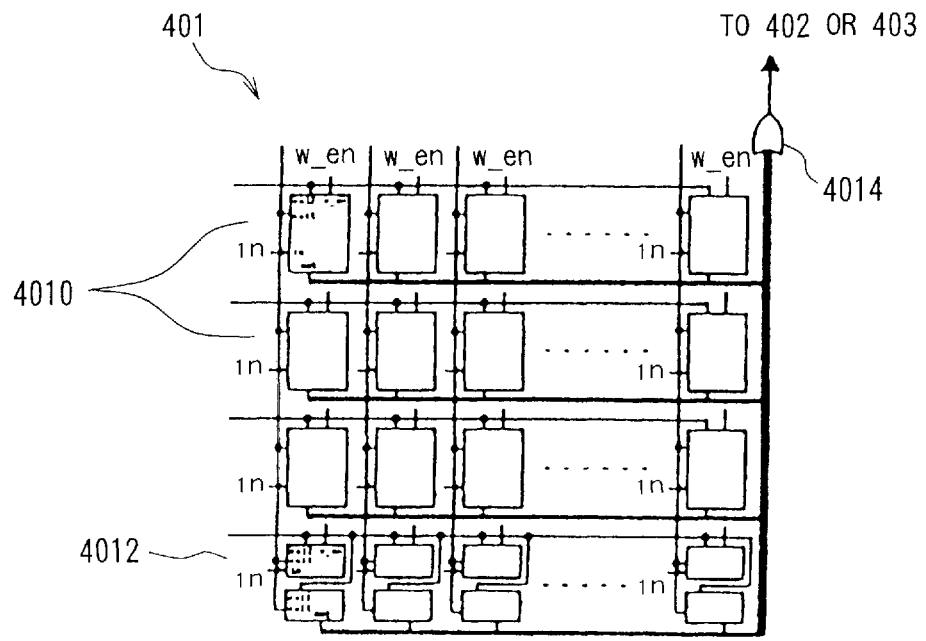
FIG. 7(A) is a circuit diagram showing a register matrix employed in the processing element of FIG. 6.
FIG. 7(B) is a control timing chart of the processing element of FIG. 6.
Figure 7:
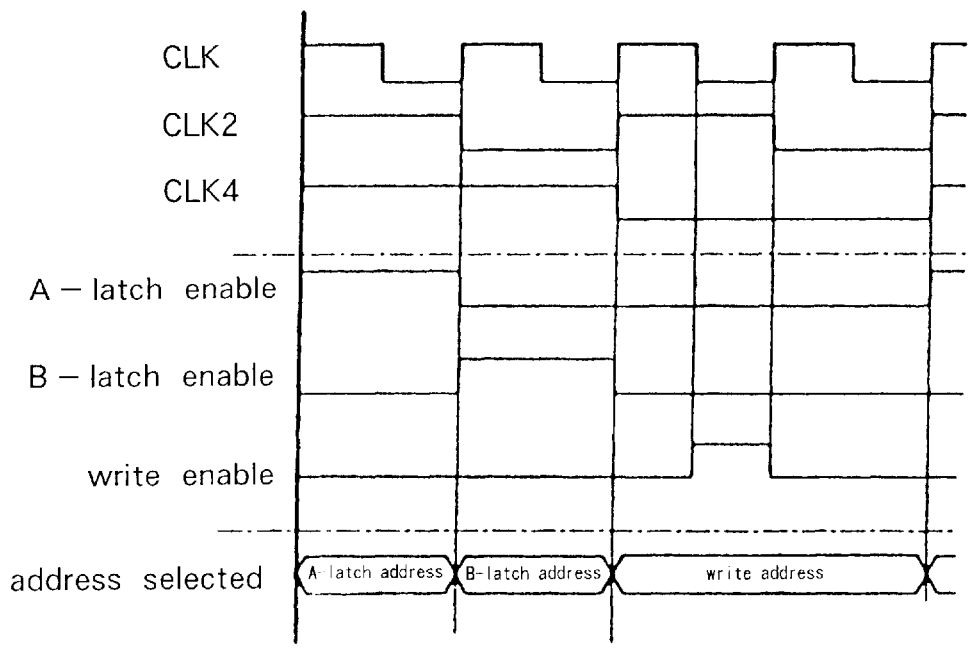

As described already, as shown in FIG. 1, the parallel processing system 14 is provided with N2 shift register lines $420_j$ (j=1~N2) in correspondence with the N2 photodetector rows $110_j$ (j=1~N2) in the photodetector array 11 and in correspondence with the N2 analog-to-digital converters $210_j$ (j=1~N2) in the analog-to-digital converter array 13. In each shift register line $420_j$, N1 shift registers $410_{i,j}$ are connected in series. Each shift register $410_{i,j}$ has a plurality of bits (four (4) bits in this example). As shown in FIG. 6, the parallel process control portion 350, in the controller 15, is connected to each shift register $410_{i,j}$ (i=1~N1, j=1~N2). The parallel process control portion 350 controls transfer of data from the analog-to-digital converter array 13 to the required position among the processing elements 400 by outputting a transfer start signal to each shift register $410_{i,j}$.

In the parallel processing system 14, the processing elements $400_{i,j}$ (i=1~N1, j=1~N2) are arranged two-dimensionally in one to one correspondence with the N1×N2 photodetectors $120_{i,j}$ (i=1~N1, j=1~N2). Each processing element $400_{i,j}$ (i=1~N1, j=1~N2) is connected to a corresponding shift register $410_{i,j}$ (i=1~N1, j=1~N2) in a corresponding shift register line $420_j$ (j=1~N2). As shown in FIG. 6, the parallel process control portion 350 is connected to each processing element $400_{i,j}$. The parallel process control portion 350 is for controlling calculations executed by each processing element 400.

Next, the structure of the processing element 400 will be described in more detail with reference to the block diagram shown in FIG. 6.

The processing elements 400 are configured to perform SIMD-type parallel processing. In this type of parallel processing, all the elements are controlled by common control signals. Accordingly, the number of transistors mounted in each element can be reduced, enabling higher integration in the parallel processing system 14 and enabling an increased number of elements.

The processing element 400 includes a register matrix 401, an A-latch 402, a B-latch 403, and an arithmetic logic unit (ALU) 404. The register matrix 401 has 4×8 bits, and can be randomly accessed. The register matrix 401 is of a 1-bit shift type. The register matrix 401 is for performing data storage operation and data input/output operation. More specifically, the register matrix 401 of each processing element 400 is for receiving, from the corresponding shift register 410, a digital signal D1 that is equivalent to a signal outputted from a corresponding photodetector 120, and for storing it therein. The register matrix 401 of each processing element 400 is directly connected to the register matrices 401 of four neighboring processing elements 400 thereof. The register matrix 401 can therefore receive digital signals that are stored in the register matrices 401 of the neighboring processing elements and can store them therein. The ALU 404 is for performing bit serial calculations to perform calculation one bit at a time beginning from the least significant bit. The A-latch 402 and the B-latch 403 are for receiving signals that are stored in the register matrix 401, and for supplying these signals to the ALU 404 for calculations.

In each processing element 400 having the above-described structure, the A-latch 402 and the B-latch 403 can read data from desired registers in the register matrix 401. The ALU 404 performs calculations based on this data. The results of the calculations are written back to desired registers in the register matrix 401. The processing element 400 executes various calculations by repeatedly performing this operation cycle.

More specifically, the ALU 404 is a one-bit calculator having calculating functions for calculating logical product (AND), logical sum (OR), exclusive or (XOR), addition (ADD), Carry-addition, and the like. The ALU 404 can process only one bit at a time. Therefore, the ALU 404 can execute multi-bit calculations by performing a series of one-bit calculations. It is noted that complex calculations can be described by a combination of plural calculations. Accordingly, the ALU 404 performs complex calculations by repeatedly performing calculations each time selecting one function from those available to be performed by the ALU 404. For example, multiplication can be described as a combination of additions. Therefore, the ALU 404 can perform multiplication by repeating adding functions a plurality of times. Subtraction can be implemented by first reversing the bits in the number to be subtracted, adding one (1) to make the value negative, and then performing adding operation. Division can be implemented by setting the divisor to a number, such as 8, 4, or 2, and shifting bits. (For example, the bits are shifted three places to the right if the divisor is 8.) An absolute value for a negative number can be calculated by reversing the sign of the negative number, whose sign bit is 1, that is, by reversing the bit and then adding one (1) to the result.

As shown in FIG. 7(A), in the register matrix 401, there are arranged: 24 one-bit registers 4010 and eight function registers 4012. The 24 one-bit registers 4010 can be randomly accessed. The eight function registers 4012 are for enabling input/output operations with external devices and with neighboring processing elements 400. All of these registers are treated as defining a single address space. The numbers appearing in the registers 4010 and 4012 in FIG. 6 indicate the addresses assigned to the corresponding registers. More specifically, the 24 registers 4010 are assigned addresses 0–23, while the eight function registers 4012 are assigned addresses 24–31. With this configuration, input/output data can be accessed in the same manner as reading data from and writing data into the registers.

As shown in FIG. 7(A), the register matrix 401 further includes one OR gate 4014, which is connected to all of these 32 registers 4010, 4012. All of the registers 4010 and 4012 are connected to the A-latch 402 and the B-latch 403 via the single OR gate 4014. When one address in the registers 4010 and 4012 is selected, only the selected register outputs its content, while all the remaining non-selected registers output zero (0). The result of the OR function on the values from all the registers is outputted to the A-latch 402 or the B-latch 403 as the output of the entire register matrix 401.

The function registers 4012 are mainly used for performing input and output operations. More specifically, the function register 4012 at address 30 is connected to a corresponding shift register 410, and is used for inputting data from the shift register 410. The function register 4012 at address 24 is used for outputting data to register matrices 401 of neighboring processing elements 400 that are located on all the four sides of up, down, left, and right. The function registers 4012 at addresses 24–27 are used for inputting data from register matrices 401 of the neighboring processing elements 400 on the four sides, respectively. The function register 4012 at address 28 is used for outputting data to the calculating portion 15B. It is noted that the function register 4012 at address 28 is configured to always read zero (0), while the function register 4012 at address 29 is configured to always read one (1).

The parallel process control portion 350 controls accesses to the register matrix 401 and calculations by the ALU 404, thereby controlling the entire processes of calculations and input/output operations of the processing element 400. In order to write data, inputted from the shift register 410, to address zero (0) in the register matrix 401, for example, the parallel process control portion 350 outputs, to the processing element 400, an instruction to calculate the logical OR of 0 (register address 28) and the sensor input (register address 30) and then to write the calculated result to register address (0). It is noted that as shown in FIG. 7(B), the parallel process control portion 350 sets one cycle of operation to the value four times as long as a basic clock CLK. While providing various clocks CLK2, CLK4, the parallel process control portion 350 successively performs control operation to read data into A-latch, to read data into B-latch, and to write the result of calculation into the register matrix. By performing this process repeatedly over a plurality of cycles, it is possible to attain required inputting/outputting operation with the register matrix 401 and to attain calculations at the ALU 404.

Next, the operations of the present embodiment will be described with reference to FIGS. 4–6.

First, the operations of the image reading portion 11, 13 will be described.

First, the image reading control portion 300 sets the reset signal R to enabled, and sets all of the switches SW11–SW14 in the variable capacity unit 222 of FIG. 5 to ON and sets all the switches SW21–SW24 to OFF. With this operation, the capacity between the input and output terminals of the charge amp 221 is set to $C_0$. At the same time, all the switch elements 140 shown in FIG. 4 are set to OFF, and the horizontal scan signal $V_i$ is set to a state that does not select any photodetectors $120_{i,j}$. From this state, the reset signal R is set to disabled, and each integrating circuit 220 is controlled to start integration operations.

After starting the integration operation, a horizontal scan signal $V_1$ is outputted for setting, to ON, only the switch element 140 in the first photodetector $120_{1,j}$ among the photodetectors in each of the N2 photodetector rows $110_j$. When the switch element is thus turned ON, a charge $Q_1$, which has been accumulated in the photoelectric conversion element 130 in response to light received until present, is outputted as a current signal from the photodetector array 11. Thus, a signal is read from the photoelectric conversion element. The charge $Q_1$ then flows to the variable capacity unit $222_j$, which is now being set at capacity $C_0$.

Next, the internal operations of the integrating circuit 220 will be described with reference to FIG. 5. The capacity control mechanism 240 (FIG. 4) opens switches SW12–SW14, and then closes the switches SW22–SW24. As a result, the integral signal $V_s$ is outputted to have the following voltage value:

$$V_s = Q/C_1$$

The integral signal $V_s$ is inputted into the comparator circuit 230, and is compared with the reference voltage $V_{REF}$. If the difference between the integral signal $V_s$ and the reference voltage $V_{REF}$ is within the range of resolution, that is, lower than or equal to $\pm C_4/2$, then the integral signal $V_s$ is determined to match the reference voltage $V_{REF}$. In this case, no further capacity control is performed and the integral operation ends. On the other hand, if the difference does not fall within the range of resolution, then further capacity control will be performed to continue the integral operation.

For example, if $V_s$ is greater than $V_{REF}$, the capacity control mechanism 240 opens the switch SW22 and subsequently closes the switch SW12. As a result, the integral signal $V_s$ changes to have the following voltage value:

$$V_s = Q/(C_1 + C_2)$$

This integral signal $V_s$ is inputted into the comparator circuit 230 (FIG. 4) and is compared with the reference voltage $V_{REF}$.

On the other hand, if $V_s$ is smaller than $V_{REF}$, then the capacity control mechanism 240 opens both switches SW11 and SW22 and subsequently closes the switches SW12 and SW21. As a result, the integral signal $V_s$ changes to have the following voltage value:

$$V_s = Q/C_2$$

This integral signal $V_s$ is outputted to the comparator circuit 230 to be compared with the reference voltage $V_{REF}$.

By repeating this feedback loop among the integrating circuit 220, the comparator circuit 230, the capacity control mechanism 240, and back to the integrating circuit 220, comparison operation and capacity setting operation (that is, control of the ON/OFF settings of the switches SW11–SW14 and SW21–SW24) are repeated until the integral signal $V_s$ matches the reference voltage $V_{REF}$ within the resolution range. The values of the capacity instructions signals $C_{11-C14}$, which indicate the ON/OFF states of the switches SW11–SW14 at the time when the integration operations are ended, constitute a digital signal that corresponds to the charge $Q_1$, wherein the most significant bit (MSB) of the digital signal is the value of $C_{11}$, while the least significant bit (LSB) is the value of $C_{14}$. The input signal is thus analog-to-digital converted into the digital signal, and the digital signal is outputted as a digital signal D1 to the processing element array 14. As described above, the present apparatus successively determines the values of the respective bits in the digital signal D1 one bit at a time from the MSB to the LSB.

Hence, according to the present embodiment, the integral signal $V_s$ is repeatedly compared with the reference voltage $V_{REF}$, while the capacity elements C1–C4 are successively turned ON one at a time. The comparison result is outputted as a digital signal D1. More specifically, C1 is first set to ON, thereby making integral signal $V_s$ equal to Q/C1. This integral signal $V_s$ is compared with the reference voltage $V_{REF}$. A one (1) is outputted as the MSB (most significant bit) if the integral signal $V_s$ is larger than the reference voltage $V_{REF}$. A zero (0) is outputted as the MSB (most significant bit) if the integral signal $V_s$ is smaller than the reference voltage $V_{REF}$. Next, C2 is set to ON, making the integral signal $V_s$ be equal to Q/(C1+C2) when MSB=1, or the integral signal $V_s$ be equal to Q/C2 when MSB=0. This integral signal $V_s$ is compared to the reference voltage $V_{REF}$. A one (1) is outputted as the second bit if the integral signal $V_s$ is larger than the reference voltage $V_{REF}$. A zero (0) is outputted as the second bit if the integral signal $V_s$ is smaller than the reference voltage $V_{REF}$. Analog-to-digital conversion is executed by repeating the above-described process the number of times equal to the number of bits required.

When output of a digital signal equivalent to the photoelectric output from the first photodetector $120_{1,j}$ is completed, the reset signal R is enabled. The reset signal is then disabled again, and the capacity value of the variable capacity unit $222_j$ is initialized. Subsequently, a horizontal scan signal $V_2$ is outputted for turning ON the switch element 140 only in the second photodetector $120_{2,j}$ in each row $110_j$. Then, the above-described process is performed again for reading the photoelectric output from the second photodetector $120_{2,j}$ and for outputting a corresponding digital signal. Hereafter, by successively changing the horizontal scan signal $V_i$, photoelectric outputs are read successively from all the photodetectors $120_{i,j}$, and corresponding digital signals are outputted to the parallel processing system 14.

Next, the operations of the processing elements 400 will be described with reference to FIG. 6.

The digital signal of the output from each photodetector $120_{i,j}$, which is produced by the analog-to-digital conversion, is transmitted to the register matrix 401 of a corresponding processing element $400_{i,j}$ via the shift registers 410. This transmission process is executed, in the corresponding shift register line 420, by successively transferring the signal in one shift register to the shift register 410 of a neighboring pixel. Because the shift registers 410 are provided in the present embodiment, signal transmission operation by the shift registers can be performed independently from the calculation processing performed by the processing elements 400. Accordingly, it is possible to perform a pipeline process to control the shift registers 410 to transmit next data while controlling the processing elements 400 to perform calculation processing onto present data. It is therefore possible to perform calculations at the processing elements 400 at a higher frame rate. It is noted that the shift registers 410 begin transferring the analog-to-digital converted data in response to a transfer start signal, which is sent from the parallel process control portion 350. The shift registers 410 return a "data transfer complete" signal to the parallel process control portion 350 after performing bit-shifting transfer operation by the number of bits that is equal to the product of the total number (N1) of elements in a row and the number of bits of analog data levels. Thus, an efficient transmission operation can be attained. Hence, according to the present embodiment, the pipeline process can be executed by performing the calculation processes and the transmission processes in parallel. It is possible to reduce the amount of wait time between the calculation processes and the transmission processes in the successive frames, thereby achieving faster image processing.

The image process calculations are conducted in the processing elements 400 as described below. Signals stored in the register matrices 401 of the respective processing elements 400 are transmitted to other processing elements 400 when required. In each processing element, signals for calculations are read from the register matrix 401 into the A-latch 402 and the B-latch 403. Predetermined calculation is achieved in the ALU 404. The calculated result is outputted via the register matrix 401 to the calculating portion 15B. It is noted that in the parallel processing system 14, the above-described image processing calculations are performed simultaneously by all the processing elements 400 in a parallel processing manner. Accordingly, calculation can be performed at an extremely high rate of speed. The calculating portion 15B calculates required image characteristic values based on the results of calculations obtained by the parallel processing system 14, and outputs the calculated results to the external device 1000. It is noted that the results of calculations obtained by the parallel processing system 14 can be outputted directly to the external computer system 14 or to other external devices 1000. For example, the results of calculations obtained by the parallel processing system 14 can be used as ON/OFF signals for an external equipment.

Figure 8:
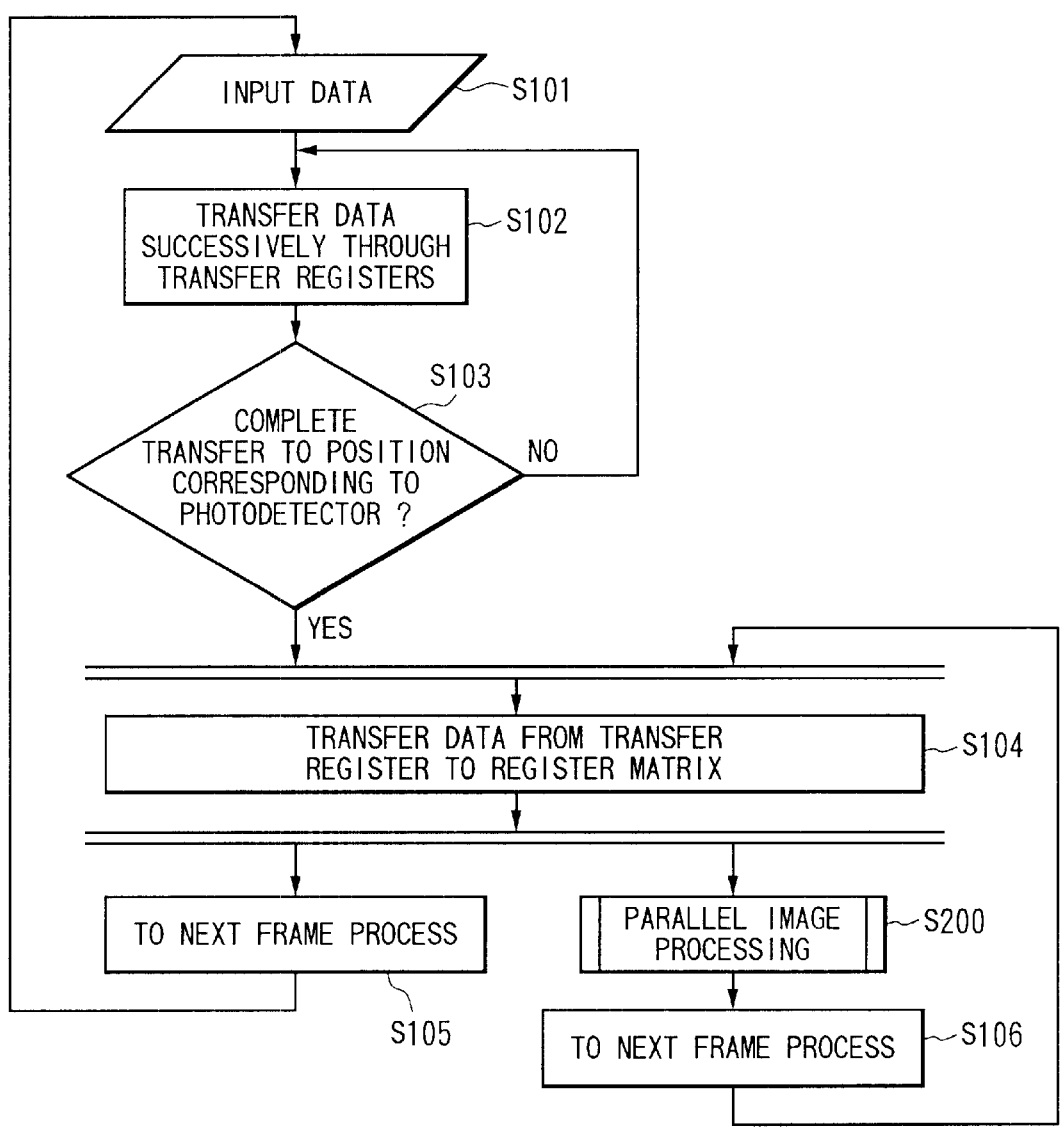
FIG. 8 is a flowchart showing the process of the high-speed vision sensor of the first embodiment.

Next, a series of vision sensor processes performed by the present vision sensor 10 will be described with reference to FIGS. 8 and 9. This series of processes covers the image input process and the image transmission process up through the completion of the calculation process.

The CPU 150, in the control circuit 15, controls in S101 the image reading control portion 300 (see FIG. 4) thereby successively switching the reset signal R between the enabled condition and the disabled condition and successively switching the horizontal scan signal $V_i$. As a result, in each row j (j=1, ..., N2) of the photodetector array 11, image data (frame data; hereinafter referred to as I(x, y)), which is outputted from each photodetector $120_{i,j}$ (hereinafter referred to as photodetectors 120 (x, y)), is successively inputted into the parallel processing system 14 via the corresponding analog-to-digital converter $210_j$.

In S102, in each row j, data inputted from the analog-to-digital converter $210_j$ is transmitted in succession via the shift registers 410. This transfer process continues in S103 until image data from each photodetector 120 reaches the shift register $410_{i,j}$ at the corresponding position (i, j) (hereinafter referred to as (x, y)).

After transmission has been completed, in S104, data I(x, y) of each pixel is transferred from the corresponding shift register 410 to the register matrix 401 of the corresponding processing element $400_{i,j}$ (hereinafter referred to as processing element 400(x, y)). As shown in FIG. 6, data in the shift register 410 is composed of a plurality of bits (four bits in the present embodiment) Accordingly, data is transferred from the shift register 410 one bit at a time into the register matrix 401. In S200, each processing element 400 is controlled to perform necessary image processing.

While each processing element 400 performs calculation processes in S200, each shift register 410 that has completed transferring data to the corresponding processing element 400 continues to the process of the next frame in S105, and the processes of S101–S103 are executed again. After completing the calculating process in S200, each processing element 400 advances to the next frame process in S106. Accordingly, image data for the next frame is transmitted in S104 from each shift register 410 to the register matrix 401 of the corresponding processing element 400. By repeating the above-described processes, each processing element 400 can perform the calculation process onto the present frame data in S200 while each shift register 410 transfers the next frame data in S101–S103, thereby reducing wasteful wait time.

Next, the operations of the processing elements 400 executed in S200 will be described in detail. In this description, the processing elements perform an "edge-enhancement" as an example.

It is noted that "edge-enhancement" is one of the processes which are used most frequently in image processing. In order to calculate the edge-enhancement in one of the simplest manners, calculation is performed onto every two neighboring pixels. More specifically, the difference is calculated between the intensity of each pixel and the intensity of a neighboring pixel on the left side thereof. For example, if the input image intensity at a position (x, y) is I(x, y), then image intensity data I'(x, y) of an edge-enhancement image can be expressed by the following equation:

$$I'(x,y)=|I(x,y)-I(x-1,y)|.$$

Figure 9:
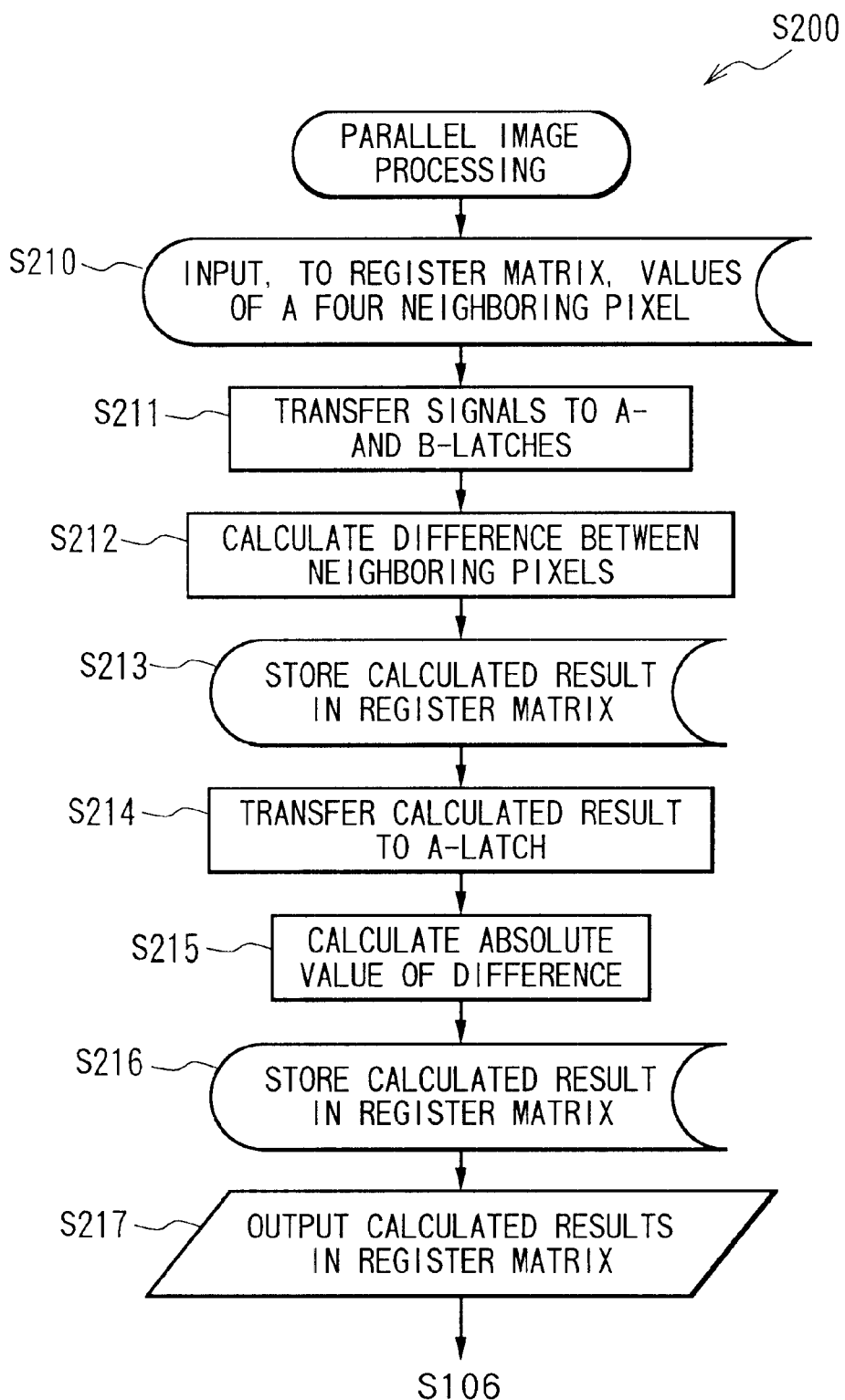
FIG. 9 is a flowchart of the process S200 in FIG. 8.

In order to perform the edge-enhancement operation, the process shown in FIG. 9 is executed in S200. This image processing operation is performed simultaneously by each of all the processing elements 400 according to a parallel processing manner.

More specifically, first, in S210, to each processing element (x, y), data I(x−1, y) of its left neighboring pixel is transferred via the input terminal for its four neighboring pixels. The data I(x−1, y) is then stored in the register matrix 401 of the subject processing element (x, y). As a result, data I(x, y) and I(x−1, y) is currently stored in the register matrix 401 of each processing element (x, y). In S211, data I(x, y) is transferred into the A-latch 402 in order from its least significant bit, and data I(x−1, y) is transferred into the B-latch 403 in order from its least significant bit. In S212, the ALU 404 calculates the difference between these two values I(x, y) and I(x−1, y). In S213, the result of the calculation is stored temporarily in the register matrix 401. After this calculation is completed, the result of the calculation is read again into the A-latch 402 in S214. In S215, the ALU 404 calculates the absolute value of the difference. In S216, the result of this calculation is stored in the register matrix 401. When the calculation of the absolute value is completed, in S217, the result presently stored in the register matrix 401 is outputted to the calculating portion 15B of the control circuit 15, and this image processing process ends. The above-described calculation operation can be performed extremely fast because the operation is executed by each of all the processing elements 400 simultaneously according to the parallel processing manner.

When receiving the calculated results, the calculating portion 15B calculates, based on the calculated results, the overall characteristic values of an imaging object, such as the object's center of gravity, the object's displacement, and the object's velocity. Based on the calculated results of the overall characteristic values, the calculating portion 15B determines the quality of the image. The calculating portion 15B may output the result of this determination as a control signal to the external device 1000, such as an external actuator.

Thus, according to the present sensor 10, the parallel processing system 14 performs image processing calculations, such as calculations of the sum, the difference, the product, or the matching of the images. On the other hand, the calculating portion 15B performs calculations of the overall characteristic quantities of the object, such as the center of gravity, the displacement, and the velocity of the object.

Figure 10:
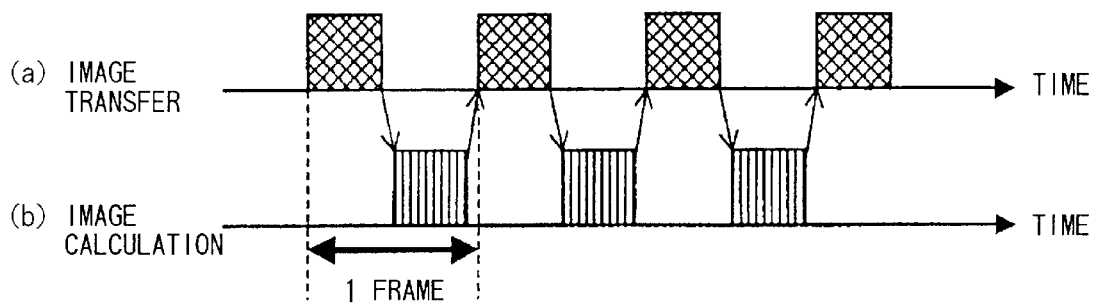
FIG. 10 is a timing chart for the transfer and calculating processes according to a comparative example.
Figure 11:
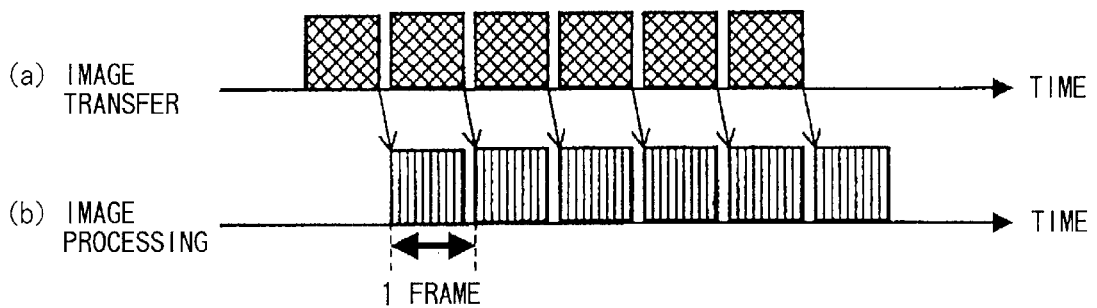
FIG. 11 is a timing chart for the transfer and calculating processes according to the first embodiment.

FIG. 10 is a timing chart of the transfer process and the calculating process according to a comparative example, while FIG. 11 is a timing chart of the transfer process and the calculating process according to the present embodiment. In the comparative example, the parallel processing system 14 is not provided with shift registers 410. The transfer process is therefore performed by the processing elements 400 themselves. Accordingly, as shown in FIG. 10, the calculating process is conducted after the transfer process is completed. In order to perform the next transfer process, it is necessary to wait until the present calculation process has ended. The time required to process one frame is equal to or longer than the sum of the time required for the transfer process and the time required for the calculating process. In contrast, in the high-speed vision sensor 10 of the present embodiment, a circuit dedicated for the transfer process and a circuit dedicated for the calculating process are provided separately. The transfer process and the calculating process are performed independently from each other. Accordingly, as shown in FIG. 11, while the calculating process is performed with data that has just been transferred by the transfer process, it is possible to begin the next transfer process. Hence, the time to process one frame is equal to the longer one of the time required for the transfer process and the time required for the calculating process. Thus, it is possible to speed up the calculating and transfer processes through a pipeline method.

In the image processing step of S200, each processing element 400, having the above-described configuration, can perform various image processing operation in addition to the above-described edge-enhancement operation.

For example, when performing a four-neighboring edge-enhancement, if the intensity of an input image at point (x, y) is represented by I(x, y), the image intensity I'(x, y) at point (x, y) of a four-neighboring edge-enhancement image can be represented by the following equation:

$$I'(x,y)=I(x,y-1)+I(x,y+1)+I(x-1,y)+I(x+1,y)-4I(x,y).$$

When performing a four-neighboring smoothing, the image intensity value I'(x, y) of a four-neighboring smoothed image is represented by the following equation:

$$I'(x,y)=(4I(x,y)+I(x-1,y)+I(x+1,y)+I(x,y-1)+I(x,y+1))/8.$$

It is noted that Table 1 below shows a list showing the number of steps required for performing each of several algorithms, which include the above-described algorithms and other algorithms and which are frequently used in image processing operations. The Table 1 also shows the length of processing time required for completing each algorithm when the subject algorithm is executed according to the present embodiment.

TABLE 1

| Name of Process | | Number of steps | Time required ($\mu$s) |
|---|---|---|---|
| Two-neighboring edge detection | 1-bit input/output | 5 | 0.40 |
| Four-neighboring edge detection | 1-bit input/output | 11 | 0.72 |
| Four-neighboring smoothing | 1-bit input/output | 14 | 1.0 |
| Four-neighboring edge detection | 8-bit input/output | 70 | 5.6 |
| Four-neighboring edge detection | 8-bit input/output | 96 | 7.7 |
| Four-neighboring thinning | 1-bit input/output | 23 | 1.9 |
| Eight-neighboring thinning | 1-bit input/output | 53 | 4.2 |
| Convolution | 1-bit input, 4-bit output | 40 | 3.2 |
| Convolution | 4-bit input, 11-bit output | 372 | 30 |

TABLE 1-continued

| Name of Process | | Number of steps | Time required ($\mu s$) |
|---|---|---|---|
| Poisson's equation | 1-bit input, 8-bit output | 63 | 5.0 |

As can be apparent from Table 1, general image processings, such as smoothing, thinning, convolution, correlation, and masking, can be attained extremely rapidly by executing a complete parallel processing. It is noted that the length of each calculation time listed in Table 1 does not include the time required by the shift registers 410 to transfer image data. If no shift registers 410 are provided, an extra amount of time would be required to transfer image data to the processing elements 400 in addition to the calculating time. It is also noted that the data transfer rate is limited by the conversion speed of the analog-to-digital converter 210. If the length of time required for analog-to-digital conversion is 1 $\mu s$/bit, for example, then the time, required for transferring 128×128 pixels×8 bits' worth of image data in parallel using the 128 lines, would be 128 pixels×8 bits×1 $\mu s$/bit=1 ms. Hence, the transfer process would require several times as long as the amount of time required to perform the calculations, making difficult image processing in real-time. Contrarily, according to the present embodiment, the transfer processes and the image processes are executed in parallel, and therefore it becomes possible to process such image data within approximately 1 ms. Accordingly, the present embodiment can be applied to such fields, as factory automation (FA) robot control, contrary to conventional vision sensor devices which have slow image processing speeds and slow transfer rates.

The object of the present embodiment is to provide an image processing system of a practically high speed and sufficiently high resolution. It is noted that the robot control in FA systems requires such a resolution that 128×128 photodetectors 120 or more are arranged. According to the present embodiment, the photodetector array 11 and the parallel processing system 14 can be separated from each other. Accordingly, each device can be constructed with a high level of integration. It is therefore possible to attain the required high resolution. Additionally, the processing speed has to match the actuator speed of a robot (1–10 ms). According to the present embodiment, the processing speed is determined by the speed of the analog-to-digital conversion performed in the analog-to-digital converters 210. This conversion rate can be made sufficiently fast as described below.

For example, according to the present embodiment, the analog-to-digital conversion rate per pixel is 1 $\mu s$/bit. For example, when converting analog input signals to 6-bit digital data (64 gradation), the entire length of time required to convert signals, outputted from 128 photodetectors 120 in one row, to the digital signals is 0.768 ms=6 $\mu s$×128. On the other hand, the processing elements are provided in one-to-one correspondence with the photodetector elements. All the processing elements are operated in parallel. Accordingly, most image processings can be completed within 0.4 ms as apparent from Table 1. Additionally, by performing the calculating processes and the transfer processes in parallel, it is possible to reduce the amount of dead time between the respective processes and to shorten the overall processing time.

As described already, each analog-to-digital converter 210 performs analog-to-digital conversion beginning from the most significant bit. Accordingly, it is possible to change the gradation of the analog-to-digital conversion, by outputting a reset signal R after a desired number of bits have been converted so that the process will shift to perform an analog-to-digital conversion of the next optical signal. It is therefore possible to perform complicated processes at a higher rate of speed. For example, in order to track an object which is moving at a high rate of speed, it is preferable to process images in two levels, that is, one bit. In this case, the transfer time can be shortened to 0.128 ms, which is about ⅙ the time required for transferring six bits. This method can therefore be applied to the control of high-speed feedback operation. Conversely, when the object is moving slowly, the gradation can be raised to be able to track the object with a higher precision.

In order to allow the output from the analog-to-digital converter to have a variable bit length, it is necessary to adjust, before inputting the output to the shift registers, the varied bit length of input data to a fixed length. It is noted that a shift register line, for transferring data at a normal length of 8 bits, for example, is constructed from one set of shift registers that has the total fixed length equal to the product of eight bits and the total number (N1) of pixels in one row. In the set of shift registers, a plurality of eight bit-shift registers, which are spaced from one another and each of which has eight bits, function as individual shift registers to transfer data for their corresponding pixels. Therefore, if the bit length of the image data for each pixel is not fixed to eight bits, then it is impossible to transfer each pixel's worth of image data correctly to the shift register at the corresponding position. For this reason, each pixel's worth of image data is added with a dummy signal to have eight bits in total before the image data is transferred to the shift register. It can be ensured that image data will be transferred correctly.

As described above, the high-speed vision sensor 10 of the present embodiment includes the analog-to-digital converter array 13 and the parallel processing system 14. The analog-to-digital converter array 13 has one analog-to-digital converter 210 in correspondence with all the photodetectors 120 that belong to one row of the photodetector array 11. In the parallel processing system 14, the processing elements 400 are provided in one to one correspondence with the photodetectors 120, and the shift registers 410 are provided also in one to one correspondence with the photodetectors 120. By providing a processing element 400 in correspondence with each photodetector 120, it is possible to perform high-speed image processing calculations between neighboring pixels by parallel processing. Further, by providing a shift register 410 in correspondence with each processing element 400, the transfer process can be performed independently from the calculation processing, thereby achieving calculation and transfer processes efficiently. Because the calculation process and the transfer process are executed in parallel, it is possible to reduce wait time between the respective processes and to perform image processing at a faster overall speed.

Additionally, by providing an analog-to-digital converter 210 in each row, it is possible to reduce the number of transfer lines, provided between the photodetectors 120 and the processing elements 400, in comparison to a configuration where an analog-to-digital converter 210 is provided in correspondence with each photodetector 120. The photodetectors 120 and the processing elements 400 can be produced separately, before being assembled together. Accordingly, both components can be manufactured with an optimal level of integration. Production of the high-speed vision sensor 10 having a large number of pixels can be simplified. It is noted that because one analog-to-digital converter 210 is provided for each row, the overall processing speed is limited by the A/D conversion process. However, most processes can be completed within one millisecond, even when 128×128 pixel images, which are sufficient for FA robot control, are processed at a 64 gradation. Such a high-speed processing can be attained. Accordingly, the high-speed vision sensor 10 of the present embodiment not only can be constructed with a simple circuit, but also can perform efficient high-speed calculations even onto a plurality of images.

Next, a second embodiment of the present invention will be described with reference to FIGS. 12–18.

In the first embodiment, only one photodetector array 10 is provided. Contrarily, according to the second embodiment, a plurality of photodetector arrays 10 are provided. Signals outputted from the plurality of photodetector arrays 10 are inputted into the single parallel processing system 14, and are subjected to calculation processing.

Figure 12:
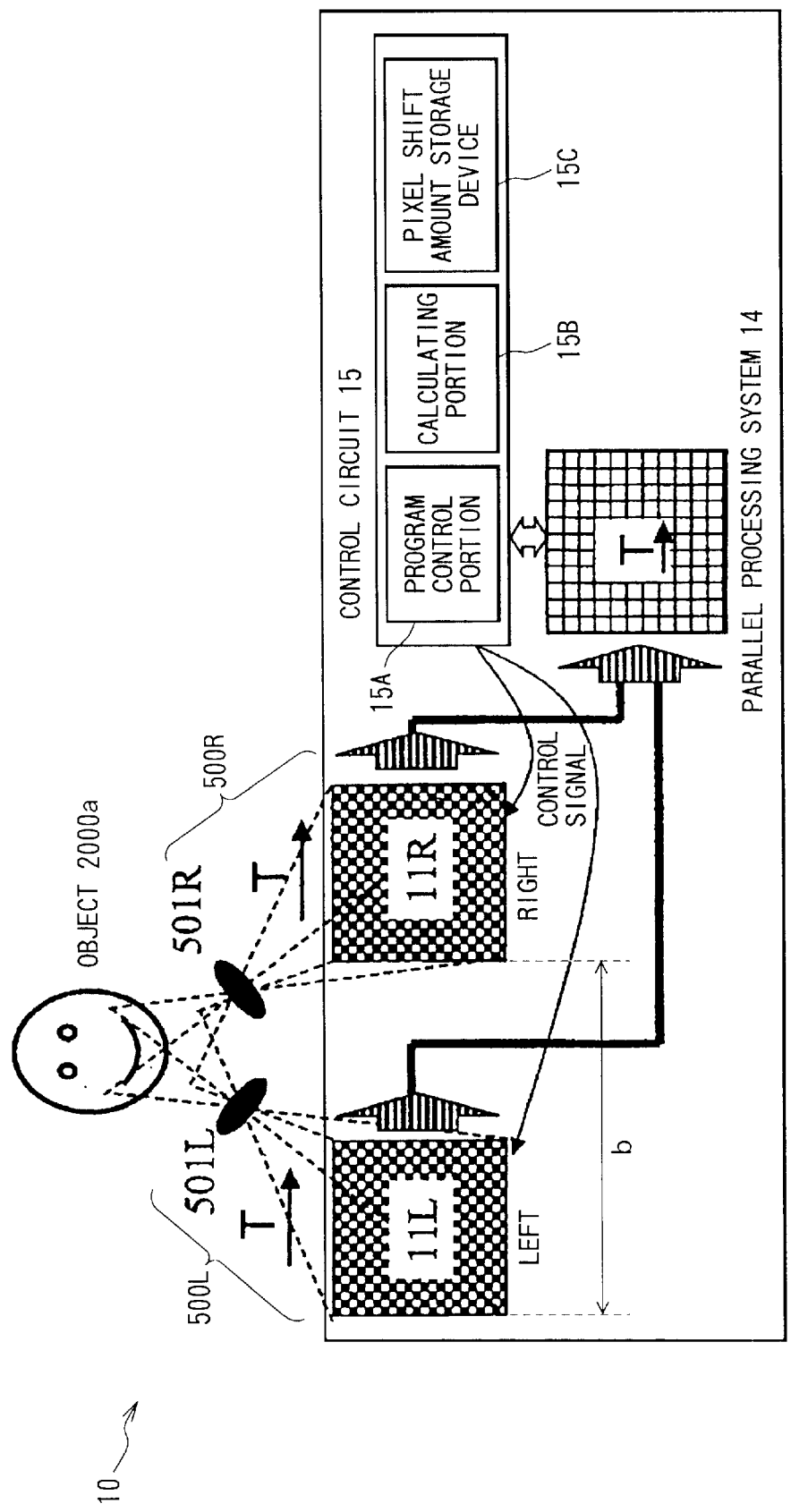
FIG. 12 is an explanatory diagram showing a high-speed vision sensor for three-dimensional vision according to a second embodiment of the present invention.
Figure 13:
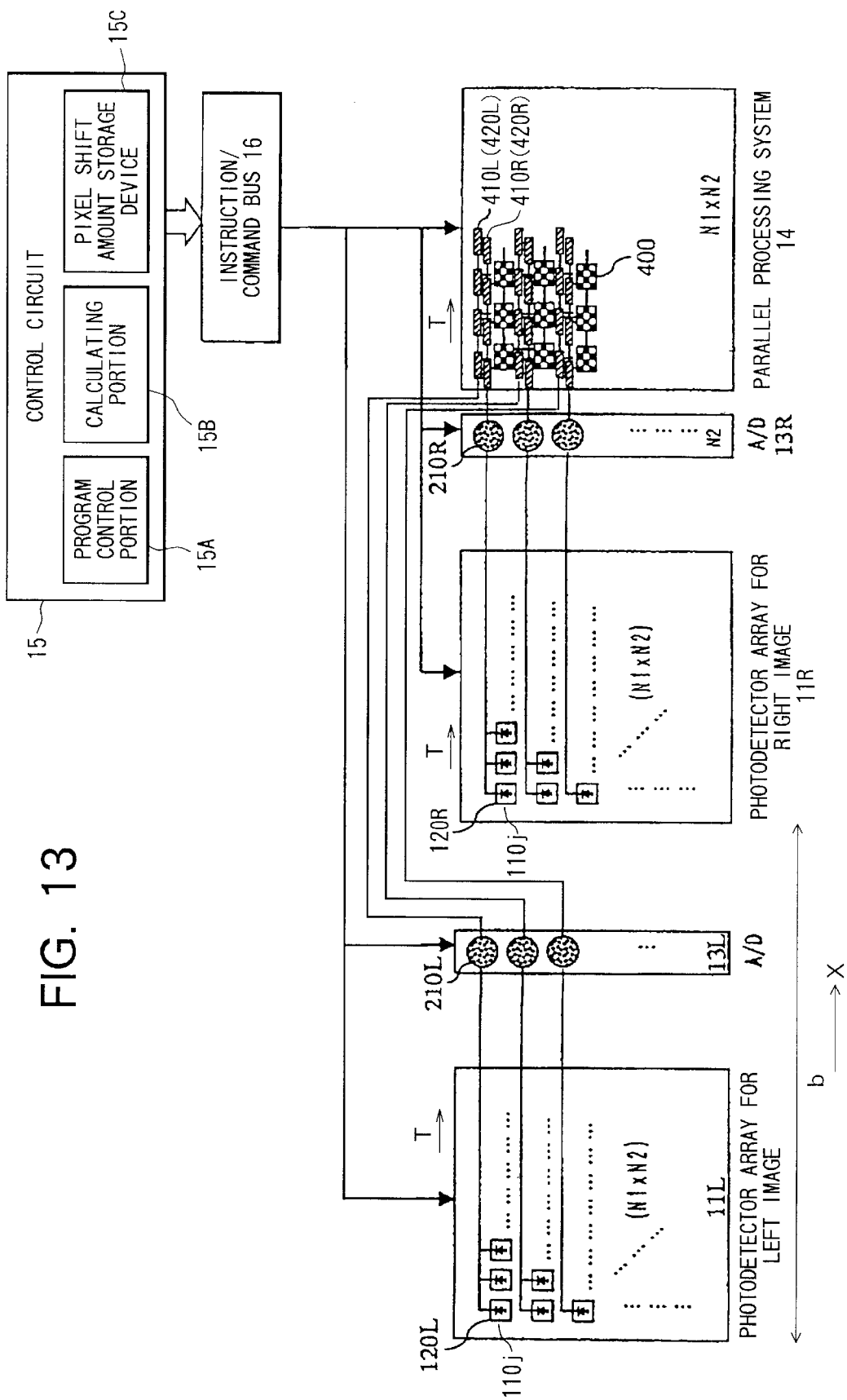
FIG. 13 is an entire block diagram showing the high-speed vision sensor of the second embodiment.
Figure 14:
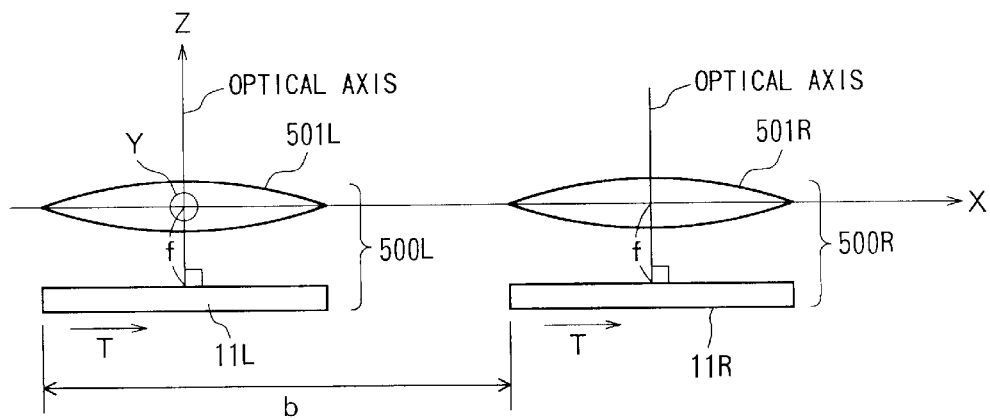
FIG. 14(A) is an explanatory diagram showing how left and right cameras are arranged in the second embodiment.
FIG. 14(B) is an explanatory diagram showing the positional relationship of images taken by the left and right cameras and the object of the images.
Figure 14:
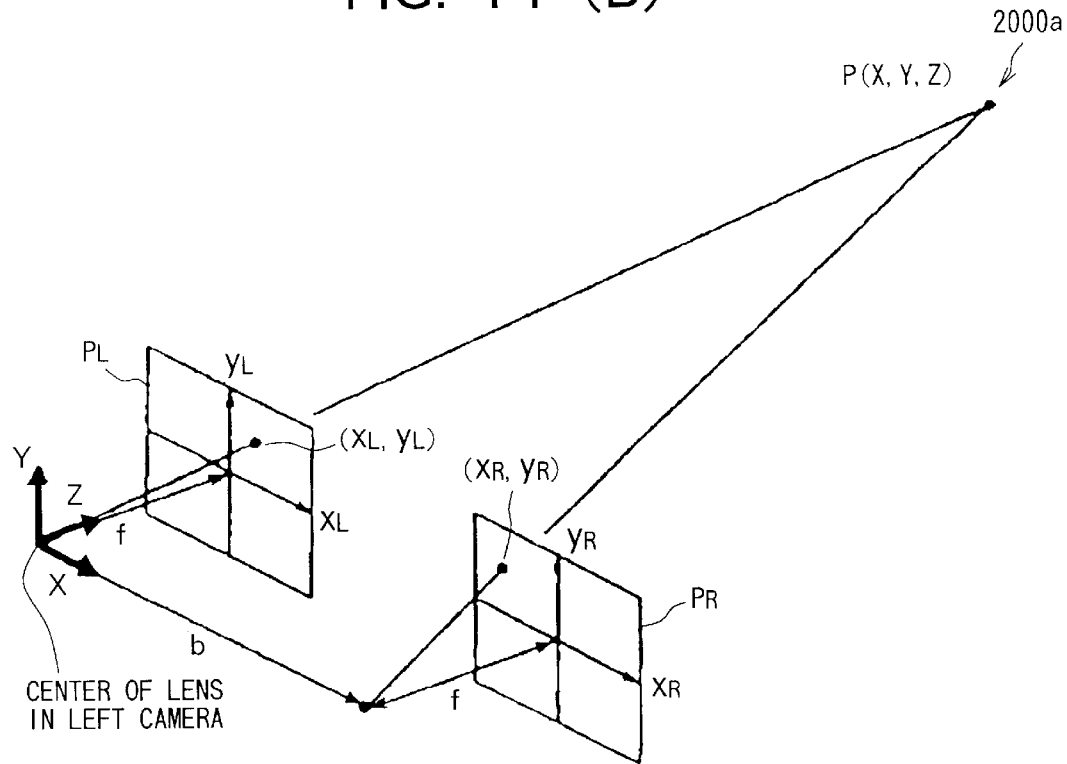

FIG. 12 is an explanatory diagram showing the general construction of the high-speed vision sensor 10 according to the present embodiment. The high-speed vision sensor 10 of the present embodiment includes two photodetector arrays for performing three-dimensional imaging operation. FIG. 13 is a block diagram showing a more detailed construction of the high-speed vision sensor 10.

As shown in FIG. 12, the image of an object 2000a is guided to photodetector arrays 11L and 11R via lenses 501L and 501R, and are processed by the single parallel processing system 14. The lenses 501L and 501R are disposed in different positions from each other. The photodetector array 11L corresponds to the left eye, and photodetector array 11R corresponds to the right eye. The photodetector arrays 11L and 11R are arranged so that they will transfer data in the same direction, as indicated by the arrows T in the diagram, and so that their pixels, which correspond to each other along the data transfer direction, are disposed as being shifted from each other by an optical base length b in the horizontal direction. More specifically, as shown in FIG. 13, the photodetector arrays 11L and 11R are arranged so that all the photodetector rows $110_j$ in both photodetector arrays extend in the same horizontal direction.

It is noted that the world coordinate system (x, y, z) is defined as shown in FIG. 14(A). In this world coordinate system, the right eye lens 501R is disposed in front of the photodetector array 11R. The right eye lens 501R and the photodetector array 11R construct a right eye camera 500R. Similarly, the left eye lens 501L is disposed in front of the photodetector array 11L. The left eye lens 501L and the photodetector array 11L construct a left eye camera 500L. Both lenses 501L and 501R have the same amount of focal length f, and are positioned on the x-y plane such that their optical axes (z-direction) extend parallel to each other. It is noted that the center of the lens 501L is set as the origin in the world coordinate system (x, y, z). The lenses 501L and 501R are shifted from each other by the optical base length b in the x-direction. The photodetector arrays 11L and 11R are located behind the corresponding lenses 501L and 501R and are separated from the corresponding lenses 501L and 501R exactly by the distance of the focal length f. Accordingly, the photodetector arrays 11L and 11R are also positioned parallel to the x-y plane and are shifted from each other by the optical base length b in the x-direction. The transfer direction T of the photodetector arrays 11L and 11R is the same, with the x-direction.

As shown in FIG. 12, the control circuit 15 is provided with a pixel shift amount storage device 15C. The pixel shift amount storage device 15C is for storing data of a positional shift amount J between images which are obtained by the photodetector arrays 11L and 11R for one frame. The positional shift amount J is a result calculated by the parallel processing system 14.

As shown in FIG. 13, each of the photodetector arrays 11L and 11R has the same configuration as the photodetector array 11 in the first embodiment. Similarly, each of analog-to-digital converter arrays 13L and 13R has the same construction as the analog-to-digital converter array 13 in the first embodiment.

As in the first embodiment, the parallel processing system 14 is provided with N1 columns×N2 rows of processing elements $400_{i,j}$ (i=1~N1, j=1~N2) which are arranged two-dimensionally with a one-on-one correspondence to the photodetectors $120_{i,j}$ in each of the photodetector arrays 11L and 11R. The parallel processing system 14 is further provided with: N2 shift register lines $420R_j$ for transferring data for the right eye, and N2 shift register lines $420L_j$ for transferring data for the left eye. The N2 shift register lines $420R_j$ (j=1~N2) are provided in one-on-one correspondence with the N2 rows of processing elements j (j=1~N2). The N2 shift register lines $420L_j$ (j=1~N2) are provided also in one-on-one correspondence with the N2 rows of processing elements j (j=1~N2).

The N2 shift register lines $420R_j$ are respectively connected to the N2 analog-to-digital converter $210_j$ in the analog-to-digital converter array 13R. The N2 shift register lines $420L_j$ are respectively connected to the N2 analog-to-digital converter $210_j$ in the analog-to-digital converter array 13L.

In each shift register line $420R_j$, N1 shift registers $410R_{i,j}$ (i=1~N1), for transferring data for the right eye, are connected in series, similarly to the shift register line 410 of the first embodiment. Each shift register $410R_{i,j}$ has a plurality of bits (four bits in the present embodiment). Similarly, in each shift register line $420L_j$, N1 shift registers $410L_{i,j}$ (i=1~N1), for transferring data for the left eye, are connected in series. Each shift register $410L_{i,j}$ also has a plurality of bits (four bits in this case). Each processing element $400_{i,j}$ (i=1~N1, j=1~N2) is connected to both of the corresponding shift register $410R_{i,j}$(i=1~N1, j=1~N2) and the corresponding shift register $410L_{i,j}$(i=1~N1, j=1~N2).

In this way, in the parallel processing system 14, the shift registers 410R are provided in one-to-one correspondence with the photodetectors 120R in the photodetector array 11R, and the shift registers 410L are provided in one-to-one correspondence with the photodetectors 120L in the photodetector array 11L. One processing element 400 is provided in corresponding to each pair of photodetectors 120R and 120L. Accordingly, a pair of shift registers 410L and 410R are provided for each processing element 400. The construction of the control circuit 15 and the instruction/command bus 16 are basically the same as those described in the first embodiment shown in FIG. 1, except that the pixel shift amount storage device 15C is added to the control circuit 15, and that the control circuit 15 controls transfer operations of both shift registers 410R and 410L.

In the present embodiment, image signals obtained by the photodetectors 120R in the photodetector array 11R are transferred to the shift registers 410R via the analog-to-digital converters 210R. Similarly, image signals obtained by the photodetectors 120L are transferred to the shift registers 410L via the analog-to-digital converters 210L. These transfer operations are performed independently from each other. When the image signals for the left and right eyes are transferred from the shift registers 410L and 410R to the processing elements 400, they are processed by the processing elements 400. The processing elements 400 perform predetermined calculations based on positional information of the photodetectors 120R and 120L and the like, thereby attaining three-dimensional measurements of the object 2000a.

It is noted that three-dimensional measurements by stereo vision are attained by performing calculations based on image matching and on the principle of trigonometry as disclosed in "Stereo vision" written by Masatoshi Okutomi ("Computer Vision," edited by Matsuyama, et al., New Technology Communications, June 1998, pp. 123–124).

Next, a brief description will be given how to calculate the distance to an object using the three-dimensional vision system.

First, an image matching process is conducted to find a matching point in the right eye image PR and the left eye image PL. The world image coordinate system $(x_R, y_R)$ for the right eye image $P_R$ and the world image coordinate system $(x_L, y_L)$ for the left eye image $P_L$ are determined as shown in FIG. 14(B) with respect to the world coordinate system (x, y, z) shown in FIG. 14(A). It is assumed that the position of the object 2000a is set as shown in FIG. 14(B) with respect to the world coordinate system (x, y, z). Next, a predetermined small region $(x_R \pm wx_R, y_R \pm wy_R)$ is set on the right eye image $P_R$ at its area centered on the point $(x_R, y_R)$ represented in the world coordinate system for the right eye image $P_R$. A small region of the same size with that of the small region $(x_R \pm wx_R, y_R \pm wy_R)$ is then set on the left eye image $P_L$, and the difference between both images is calculated. By conducting this calculation, the center point $(x_L, y_L)$, in the world coordinate system, of an area that causes the smallest amount of difference is searched. The point $(x_L, y_L)$ found by the searching operation is the matching point of the left eye image $P_L$ with respect to the fixed position $(x_R, y_R)$ in the right eye image $P_R$. The positional difference between those areas, that is, the distance $(x_R-x_L, y_R-y_L)$ is called the parallax d. It is noted that there occurs little positional difference between the right and left eye images in the direction perpendicular to the direction, in which the left and right cameras are shifted from each other. According to the present embodiment, the left and right cameras are placed at positions shifted from each other in the x-direction. Accordingly, the value $y_R$ is nearly equal to the value $y_L$. The parallax d is therefore nearly equal to $x_R-x_L$. In this case, a point P (x, y, z) in the space is projected onto the left eye image at $(x_L, y_L)$ and onto the right eye image at $(x_R, y_R)$ Accordingly, the following formula is established:

$Z=bf/d$ wherein f is the focal length, b is the length of the baseline (distance between the left eye camera 500L and the right eye camera 500R), and d is the parallax $(x_R-x_L)$. Under the condition where f and b are known, it is possible to reproduce the three-dimensional position of the imaged object.

Thus, it is possible to find a distance Z to the object by Z=bf/d when f is the focal length of both cameras and when b is the distance between the optical centers of both cameras.

In order to improve the processing speed of three-dimensional measurements, it is necessary to effectively find a matching point between the images taken by the left eye camera 500L and taken by the right eye camera 500R. According to the present embodiment, as shown in FIG. 12, the photodetector arrays 11L and 11R are located so that each pixel, that is, each photodetector 120 in the photodetector array 11R is arranged as being shifted from a corresponding pixel, that is, a corresponding photodetector 120 in the photodetector array 11L, along the direction the same as the data transfer direction T (left-right direction or row-extending direction). As a result, the position of a specific image on a screen in the image taken by the photodetector array 11L is shifted from the position of the subject image on a screen in the image taken by the photodetector array 11R in the left-to-right direction. It is therefore possible to detect the position of the object using trigonometry in the following manner: The difference between the two images is repeatedly calculated while shifting one of the two images in the left or right direction. When the one image is shifted by some pixel shift amount to reach some position, the difference between the images becomes smallest. This indicates that the two images match with each other. The position of the object can be determined using trigonometry based on the pixel shift amount that allows the two images to match with each other.

According to the present embodiment, the shift registers 410L and 410R transfer the left and right images independently from each other. Accordingly, while performing the calculation of the image difference, it is possible to shift one image for the next calculation, thereby performing effective processings.

The positional shift amount J calculated in the previous frame is stored in the storage device 15C. If a positional shift amount of fifteen (15) pixels, for example, is determined between the left and right images in the previous frame, it can be estimated that a positional shift amount of approximately fifteen (15) pixels will be determined in the current frame. Accordingly, it is preferable to begin, for the current frame, calculation of the image difference from that range. In order to cause a required amount of pixel shift between the left and right images, one of the following methods can be employed: (1) vary the timings between the left and right cameras; (2) provide a buffer between the cameras and the parallel processing system; and (3) control the transfer registers to perform transfer operation in a state that pixel shift occurs only in one image. It becomes possible to begin a calculation, in the current frame, from a state where matching occurs in the previous frame. Accordingly, it is possible to reduce the length of time required to determine the accurate pixel shift amount in the current frame.

Next, one example of the operations of the high-speed vision sensor 10 according to the present embodiment will be described with reference to flowcharts of FIGS. 15 and 16. In this example, in order to cause a pixel shift between the left and right images with an amount that is the same as that detected in the previous frame, the method (3) described above is employed, wherein the transfer registers are controlled to transfer data such that the pixel shift occurs only in one image.

First, in S301, the photodetector arrays 11L and 11R are controlled to pick up left and right images L and R. These images are converted into digital data by the corresponding analog-to-digital converter arrays 13L and 13R. In S302, left image data L is transferred using the shift registers 410L up to a corresponding position (x, y). More specifically, the shift registers 410L are controlled by a transfer start signal to start transferring left image data. The shift registers 410L are controlled to perform transferring operation by shifting bits by the number that is equal to the product of the total number (N1) of elements in a row and the number of bits of analog data levels. At the same time, the shift registers 410R are controlled to transfer right image data R to a position (x–J, y) that is shifted by a pixel shift amount J, which has been obtained in the previous frame and which is being stored in the storage device 15C. More specifically, the shift registers 410R are controlled by the transfer start signal to start transferring data for the right image. The shift registers 410R are controlled to perform transferring operation by shifting bits by the number that is equal to the product of (the total number (N1) of elements in a row—J) and the number of bits of analog data levels.

Next, in S303, left and right image data L (x, y) and R (x−J, y) is transferred from the shift registers 410L and 410R to the register matrix 401 at the corresponding position (x, y).

Next, in S400, a process for matching left and right images is performed.

Figure 16:
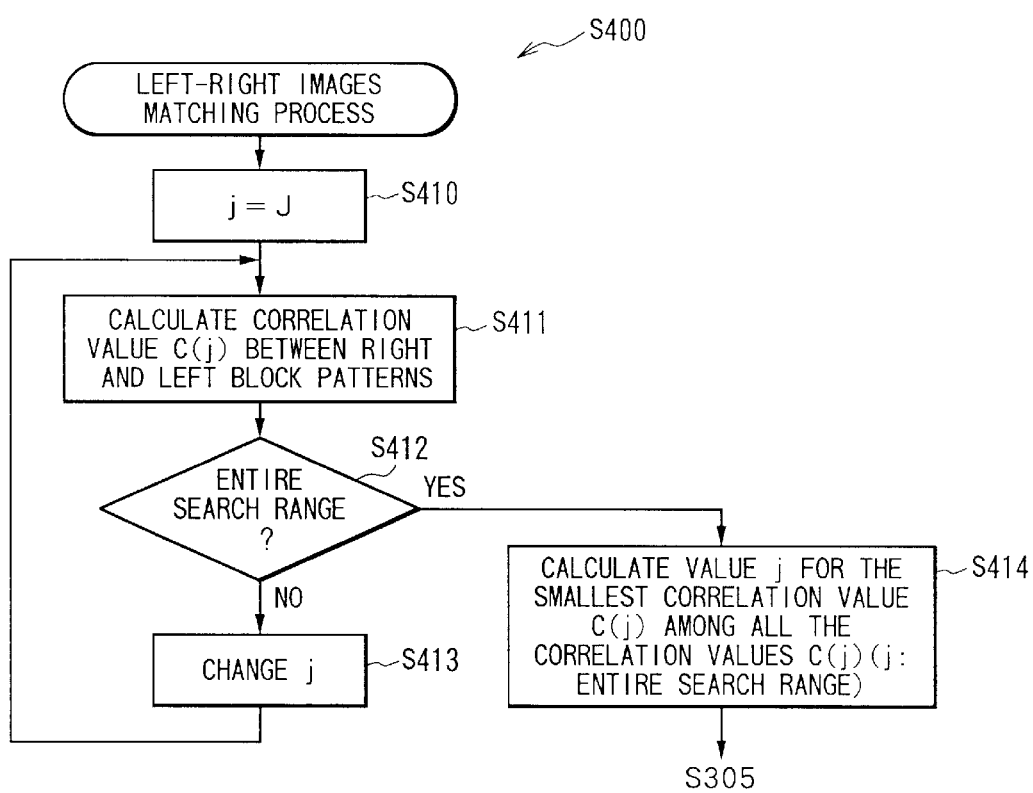
FIG. 16 is a flowchart showing the process S400 in FIG. 15.

During the left and right image matching process, as shown in FIG. 16, j is first initialized to J in S410.

Subsequently, a block, having 3×3 pixels or 8×8 pixels, for example, is set in the left image as a reference image. In order to find which portion of the right image best matches the reference image, a correlation value C(j), wherein j is initially set to J, is calculated between the block (reference image) in the left image and a presently-corresponding block in the right image.

Here, the correlation value C(j) is expressed by the following equation:

$$C(j)=\Sigma|L(x,y)-R(x-j,y)|$$

wherein x, y indicates all the pixels located in the present block.

More specifically, in S411, the processing element 400 at each pixel (x, y) first calculates the difference, between the currently-stored image data L(x, y) and R(x−j, y) in the same manner as in the processes of S211–S213 in FIG. 9. The processing element in each pixel then calculates the absolute value of the difference (hereinafter referred to as D(x, y)) in the same manner as in the processes S214–S216 in FIG. 9. The total sum of the absolute values over the entire block is then calculated to obtain the correlation value C(j). In order to calculate the total sum, each processing element 400 repeats data transfer operations (to transfer data between neighboring register matrices 401) and repeats data adding functions.

More specifically, in order to calculate the total sum of the absolute values over the entire block, if the block is a 3×3 pixel block (which has the center pixel and its eight neighboring pixels), for example, the difference absolute value D(x−1, y) obtained by the pixel in the left column is first transferred to calculate D(x−1, y)+D(x, y) This calculation is performed by each of all the processing elements 400 using SIMD. Next, the difference absolute value D(x+1, y) obtained by the pixel in the right column is transferred to calculate D(x−1, y) +D(x, y)+D(x+1, y). Next, data obtained by the pixel on the upper row is transferred to obtain the following sum: D(x+1, y−1)+D(x, y−1)+D(x+1, y−1)+D(x+1, y) +D(x, y)+D(x+1, y). Next, data obtained by the pixel on the lower row is transferred to calculate the following sum: D(x+1, y−1)+D(x, y−1)+D(x+1, y−1)+D(x+1, y)+D(x, y) +D(x+1, y)+D(x+1, y+1) +D(x, y+1)+D(x+1, y+1). Thus, the correlation value C(j) is finally obtained. When a 8×8 pixel block is used, the above-described total sum operation further continues while transferring data in the upper, lower, left, and right directions to finally obtain the correlation value C(j).

The obtained value C(j) is transferred to the calculating portion 15B, and is stored therein.

Next, j is changed within the entire search range (No in S412 and S413). More specifically, data R for the right image is transferred to the right or left between the register matrices 401 of the neighboring processing elements 400.

Next, the correlation value C(j) is calculated again in S411. Thus, calculation of the correlation value C(j) is repeated within the entire search range while the right image data R is transferred between the neighboring processing elements 400 (no in S412 and in S413). It is noted that this search range is determined dependently on conditions such as an estimated maximum speed of the object 2000a, reduction power of the lenses 501R and 501L, and pixel pitch in the photodetector arrays 11. However, because the frame rate is high, the search range can be set as small as ±1 or ±2, for example, with respect to the initial value J in the left-right direction.

When all the correlation values C(j) are obtained for the entire search range (Yes in S412), the process proceeds to S414. At this time, correlation values C(j), where j=J J−1, J+1, for example, are stored in the calculating portion 15B. Accordingly, in S414, among all the correlation values C(j) in the calculating portion 15B, the smallest value C(j) is selected, and the value j for the smallest value C(j) is determined. This value j indicates the matching position of the left image block with respect to the right image block.

Thus, the process of S400 ends.

Figure 15:
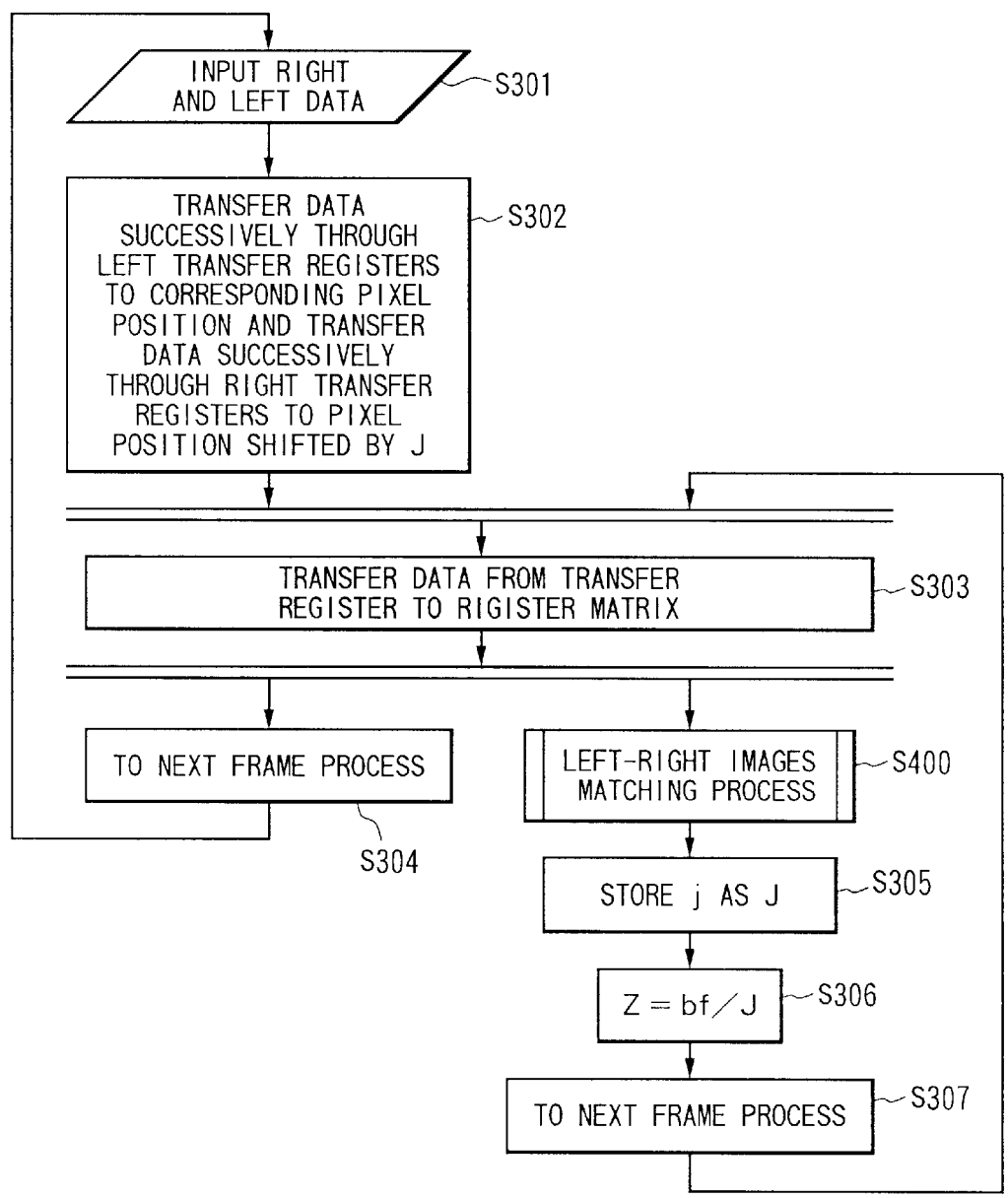
FIG. 15 is a flowchart showing the process of the high-speed vision sensor of the second embodiment.

Next, as shown in FIG. 15, in S305, the value j determined during the left and right image matching process of S400 is set as the pixel shift amount J for the current frame, and is stored in the storage device 15C. Next, in S306, the distance Z=bf/J to the object, appearing in the left block image, is calculated, wherein b is the distance between the left and right cameras, and f is the focal length of the cameras.

It is noted that during the right and left image matching process of S400, the processes of S411–S413 are executed by the program control portion 15A controlling the processing elements 400 to perform parallel processing. Calculations in steps S414, S305, and S306 are executed by the calculating portion 15B. It is noted that by performing the matching process of S400 for all the blocks in the light-receiving surfaces 11L and 11R, it is possible to determine the distances to all the objects, which appear in the respective block images, through steps S305 and S306.

The shift registers 410R and 410L perform transfer operation to transfer data of one frame to the processing elements 400. While the processing elements 400 and the calculating portion 15B perform calculations in S400–S306 for the received frame data, the shift registers 410R and 410L move on to the process for the next frame in S304 and execute processes of S301–S302. When completing the calculations of S400–S306, the processing elements 400 and the calculating portion 15B also move on to the process of the next frame in S307. Then, in S303, left and right image data from the next frame is transferred from the shift registers 410L and 410R to the register matrices 401 of the processing elements 400. By repeating the above-described procedures, the processing elements 400 and the calculating portion 15B can perform calculation processes (S400–S306) onto the present frame while the shift registers 410L and 410R transfer left and right image data for the next frame (S301–S302), thereby reducing wasteful wait time.

As described above, according to the sensor 10 of the present embodiment, the pixel shift amount J, detected in the previous frame, is stored. Accordingly, the search of the matching position for the present frame can be started from the position determined based on the pixel shift amount detected in the previous frame. Accordingly, the size of the search range can be reduced. It is possible to perform searching operation efficiently. Especially, according to the high-speed vision sensor 10 of the present embodiment, matching can be performed at an extremely fast frame rate (such as 1 ms). Accordingly, there is almost no movement in the object between successive frames. For example, an object moving at a rate of 150 kilometers per hour will not move more than 4 cm between frames. Hence, by knowing in advance the approximate value of the pixel shift amount between the left and right images, the object can be found by searching only several points to the left or right of the known position.

If the shift registers 401R or 410L are not used, it requires time when the processing elements 400 transfer image data from both of the photodetector arrays 11R and 11L. In this case, the time required for the transfer process is more than double that required for only one photodetector array. It becomes difficult to perform high-speed image processing. Contrarily, according to the present embodiment, the shift registers 410L and 410R perform transfer operations in parallel while the processing elements 400 are conducting calculations. Accordingly, high-speed image processing can be attained similarly to the case where only one photodetector array is used. It is noted that the number of the photodetector arrays is not limited to two, but can also be three or more. In the latter example, it is necessary to provide three or more shift registers for each processing element, each shift register being dedicated for the corresponding photodetector array. Using three or more photodetector arrays can increase precision and can reduce blind spots.

Figure 17:
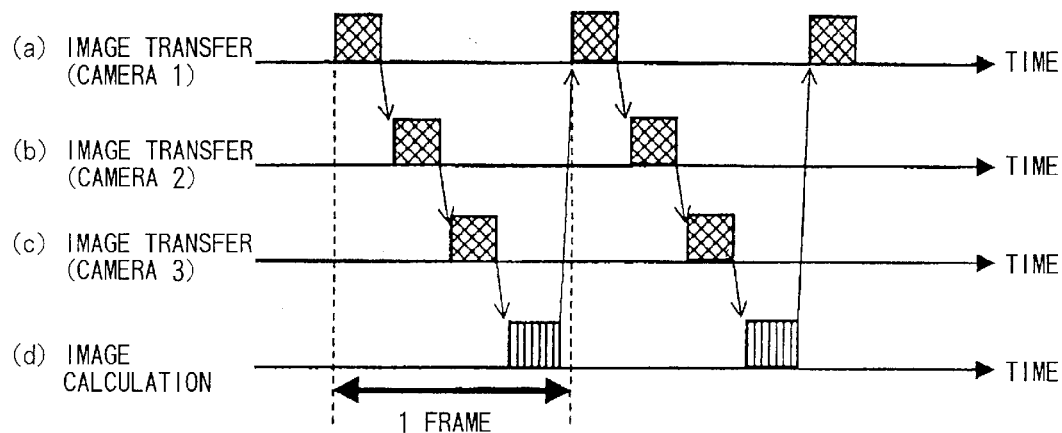
FIG. 17 is a timing chart for the transfer and calculating processes of a comparative example of a system that has a plurality of cameras.
Figure 18:
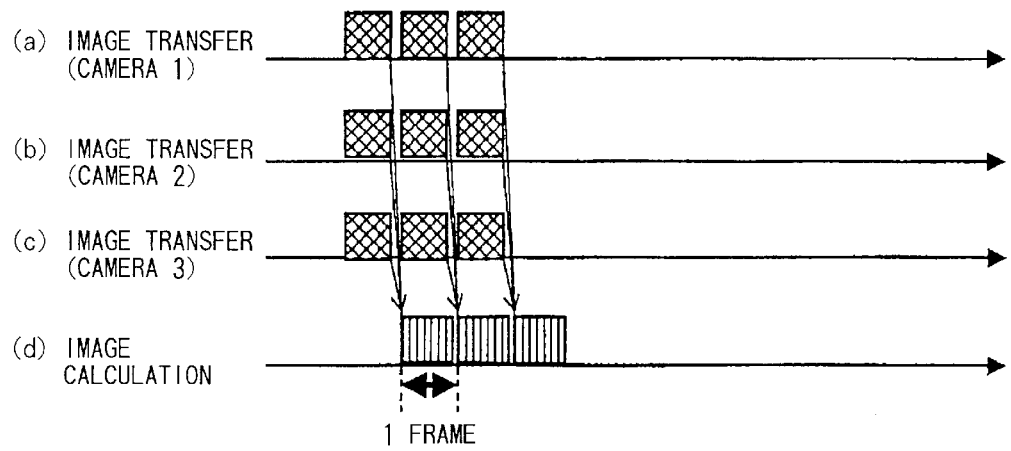
FIG. 18 is a timing chart for the transfer and calculating processes using a system with plural cameras according to the second embodiment.

FIG. 17 is a time chart of the transfer process and calculation process in a comparative example, wherein three photodetector arrays (cameras) 11 are employed, but no transfer shift registers 410 are employed. FIG. 18 is a time chart of the transfer and calculation processes according to the present embodiment, wherein three photodetector arrays (cameras) 11 are employed. In the comparative example of FIG. 17, the processing elements transfer image signals. Accordingly, the processing elements have to perform calculation processes after completing transfer of image signals. In other words, (a) image signals from camera 1 are transferred, after which (b) image signals from camera 2 are transferred, after which (c) image signals from camera 3 are transferred. After all the transfer operations are completed, (d) the calculation process is performed. Image signals for the next frame cannot be transferred until this calculation process is completed. Accordingly, the time required to process one frame is (the time required for transferring signals from one camera)×3+(the time required for the calculation process) or more.

On the other hand, according to the present embodiment, each processing element is provided with transfer shift registers, the number of which corresponds to the number of the cameras (three in this case). Accordingly, the transfer processes for the image signals from the respective cameras can be performed simultaneously, and the calculation processes can be performed independently from the transfer processes. As shown in FIGS. 18(a)–(c), image signals are transferred simultaneously from the cameras 1–3 by the shift registers. The transferred data is processed by the processing elements. While this calculation process is being performed, the shift registers move on to transferring image data for the next frame. Accordingly, the processing elements can perform a calculation process of the next frame immediately after finishing the current calculation process without waiting. Hence, the time required to process one frame is determined by the longer of the <time required to transfer signals from one camera> or <time required for the calculation process>. According to the present embodiment, even when employing a large number of cameras, it is still possible to prevent increase in processing time.

Next, another embodiment (third embodiment) that employs a plurality of photodetector arrays will be described with reference to FIGS. 19–22.

Figure 19:
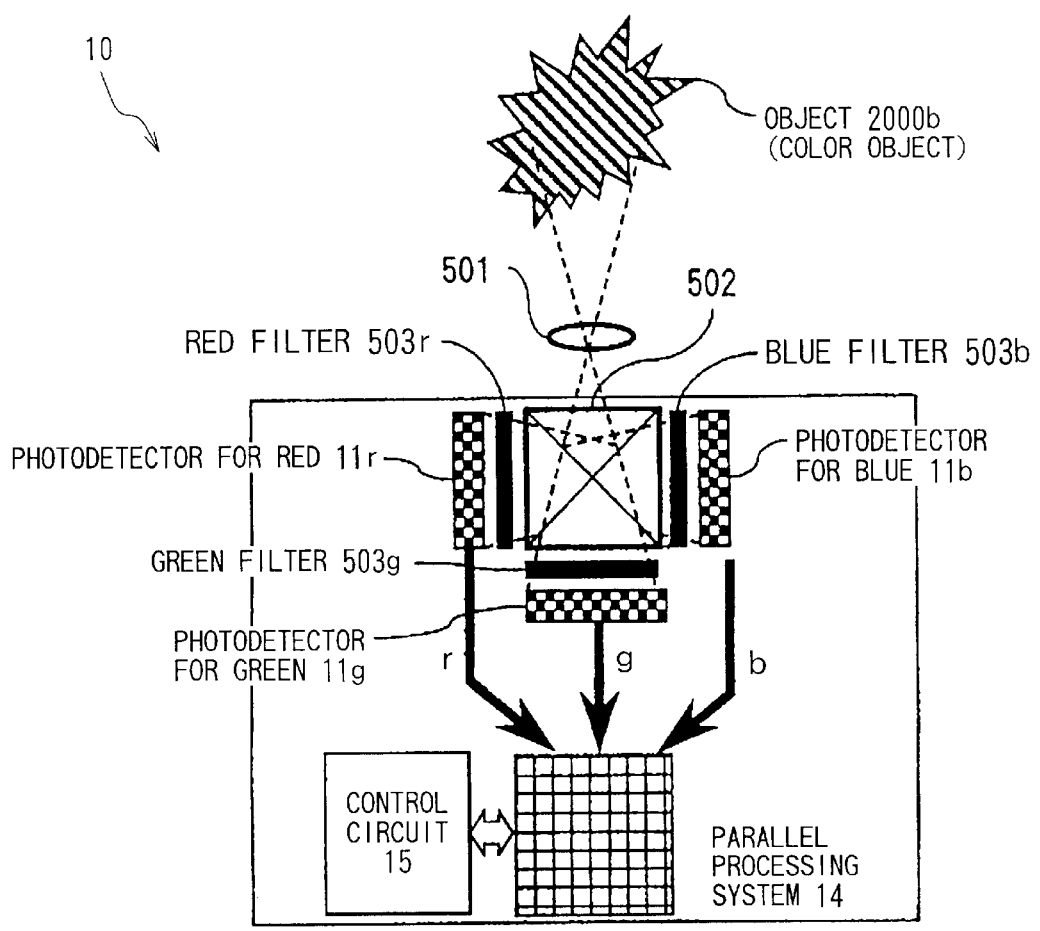
FIG. 19 is an explanatory diagram showing a high-speed vision sensor for color image recognition according to a third embodiment of the present invention.
Figure 20:
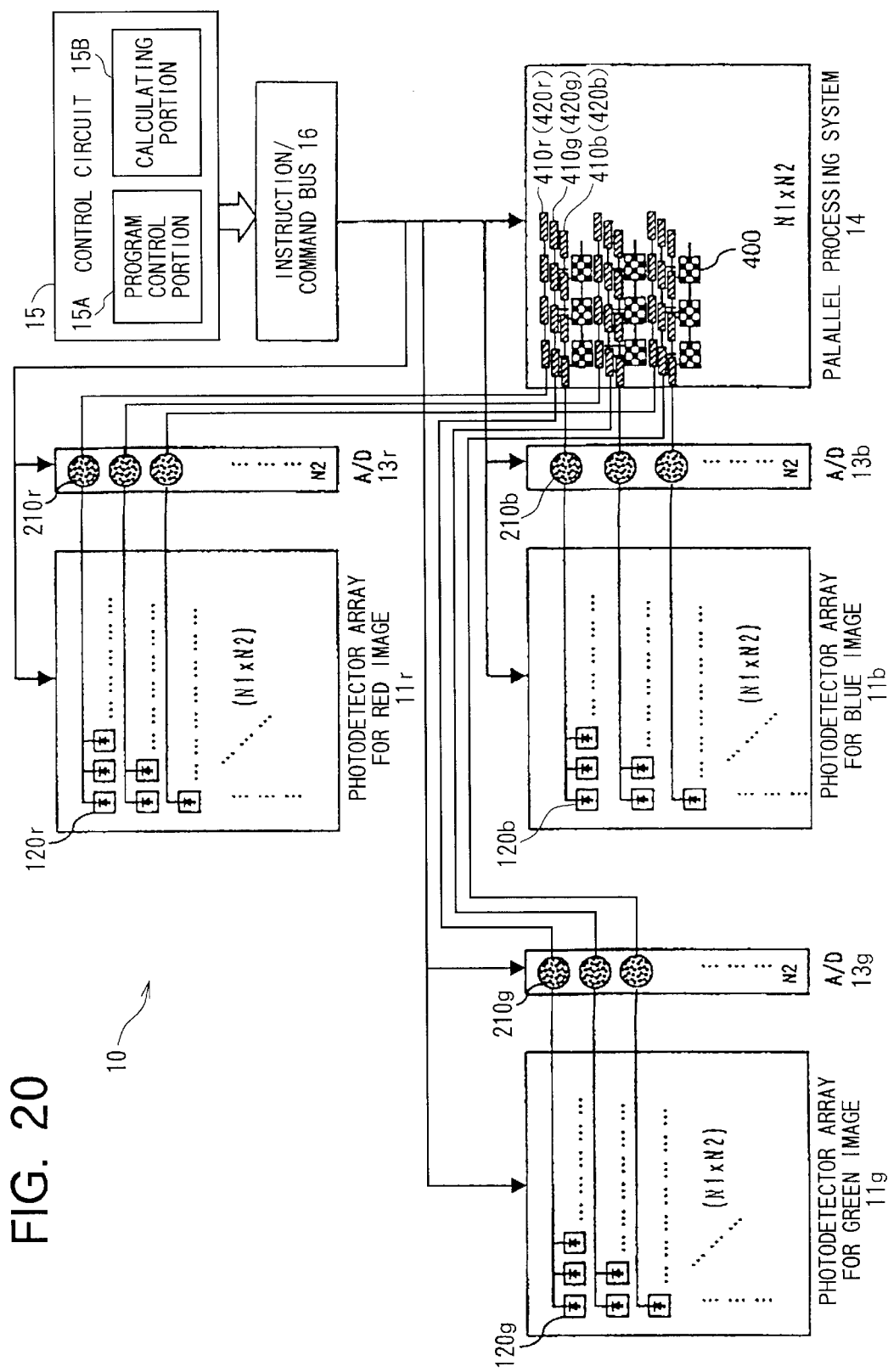
FIG. 20 is an entire block diagram showing the high-speed vision sensor of the third embodiment.

FIG. 19 is an explanatory diagram showing the structure of the high-speed vision sensor 10 for color image recognition according to the present embodiment. FIG. 20 is a block diagram showing a more detailed structure of the high-speed vision sensor 10.

An image of an object 2000b passes through a lens 501 and is separated into three RGB colors by a cross dichroic prism 502. Unnecessary wavelength signals are removed by filters 503r, 503g, and 503b for the three colors. The remaining signals are fed to the photodetector arrays 11r, 11g, and 11b for the three colors.

As shown in FIG. 20, similarly to the second embodiment, the photodetector arrays 11r, 11g, and 11b have the same construction as the photodetector array 11 in the first embodiment. Analog-to-digital converter arrays 13r, 13g, and 13b have the same construction as the analog-to-digital converter array 13 in the first embodiment. As in the second embodiment, the parallel processing system 14 includes N1 columns×N2 rows of processing elements 400 which are arranged two-dimensionally to correspond one-on-one to the N1×N2 photodetectors 120 in each of the photodetector arrays 11r, 11g, and 11b. The high-speed vision sensor 10 of the present embodiment is further provided with N2 shift register lines 420r in one to one correspondence with the N2 rows of processing elements. The high-speed vision sensor 10 of the present embodiment is further provided with N2 shift register lines 420g in one to one correspondence with the N2 rows of processing elements. The high-speed vision sensor 10 of the present embodiment is further provided with N2 shift register lines 420b in one to one correspondence with the N2 rows of processing elements. The shift register lines 420r are for transferring red data. The shift register lines 420g are for transferring green data. The shift register lines 420b are for transferring blue data. The shift register lines 420r, 420g, and 420b are connected to the analog-to-digital converter arrays 13r, 13g, and 13b, respectively. As in the second embodiment, N1 shift registers 410r, each having a plurality of bits (four bits in this example), are connected in series in each shift register line 420r; N1 shift registers 410g, each having a plurality of bits (four bits in this example), are connected in series in each shift register line 420g; and N1 shift registers 410b, each having a plurality of bits (four bits in this example), are connected in series in each shift register line 420b. Each processing element 400 is connected to all of a corresponding shift register 410r, a corresponding shift register 410g, and a corresponding shift register 410b.

Image signals obtained by the photodetector arrays 11r, 11g, and 11b are converted to digital signals by the corresponding analog-to-digital converter arrays 13r, 13g, and 13b. Subsequently, the digital signals are fed to the single parallel processing system 14 and subjected to calculation processing. In the parallel processing system 14, the shift registers 410r, 410g, and 410b are dedicated to transferring image signals obtained by the corresponding photodetector arrays 11r, 11g, and 11b to the processing elements 400. With this configuration, as with the three-dimensional vision system of the second embodiment, image data from the respective photodetector arrays 11 can be transferred independently from and in parallel with the calculation process, thereby achieving high-speed image processing.

According to the present embodiment, digital signals which have already been separated into RGB colors are transmitted to the processing elements 400. Accordingly, the processing elements 400 can easily perform high-speed image processing such as color correction and color conversion. Further, by providing the high-speed vision sensor 10 with additional plural photodetector arrays 11, each of which has a filter 503 for acquiring images of a wavelength region different from the RGB colors, the high-speed vision sensor 10 can be used for analyzing wavelength characteristics. The color image recognition of the present embodiment can be used for detecting objects with color information. Some applications of the high-speed vision sensor include real-time quality checking of printed materials and automated vehicle driving by detection of a white line on a road. According to the present embodiment, it is also possible to immediately determine whether the currently-inputted image is the same as a predetermined template image.

Next, the operations for recognizing color images according to the present embodiment will be described with reference to the flowcharts in FIGS. 21 and 22.

First, in S501, RGB image data r(x, y), g(x, y), and b(x, y) is picked up at each position (x, y) in the corresponding photodetector arrays 11r, 11g, and 11b, and is converted into digital signals by the corresponding analog-to-digital converter arrays 13r, 13g, and 13b. Next, in S502 and S503, RGB image data r(x, y), g(x, y), and b(x, y) is transferred using the corresponding shift registers 410r, 410g, and 410b up to the corresponding position (x, y) in the parallel processing system 14. In other words, the shift registers 410r, 410g, and 410b are controlled by a transfer start signal to start a transfer of corresponding color image data. The shift registers 410r, 410g, and 410b perform their transfer operations by shifting bits by the number that is equal to the product of the total number N1 of elements in a row and the number of bits of analog data levels. Next, in S504, RGB image data r(x, y), g(x, y), and b(x, y) is transferred, at the transfer position (x, y), to the register matrix 401 of the corresponding processing element 400.

Next, the RGB template matching process is executed in S600.

It is noted that reference image data Tr(x, y), Tg(x, y), and Tb(x, y) for RGB colors are prestored in the register matrix 401 of the corresponding pixel (x, y). This reference image data indicates a frame image (template) obtained by picking up an image of an ideal object (such as printed material). In the RGB template matching process, input image data is compared with the reference image data to find a matching position.

Figure 22:
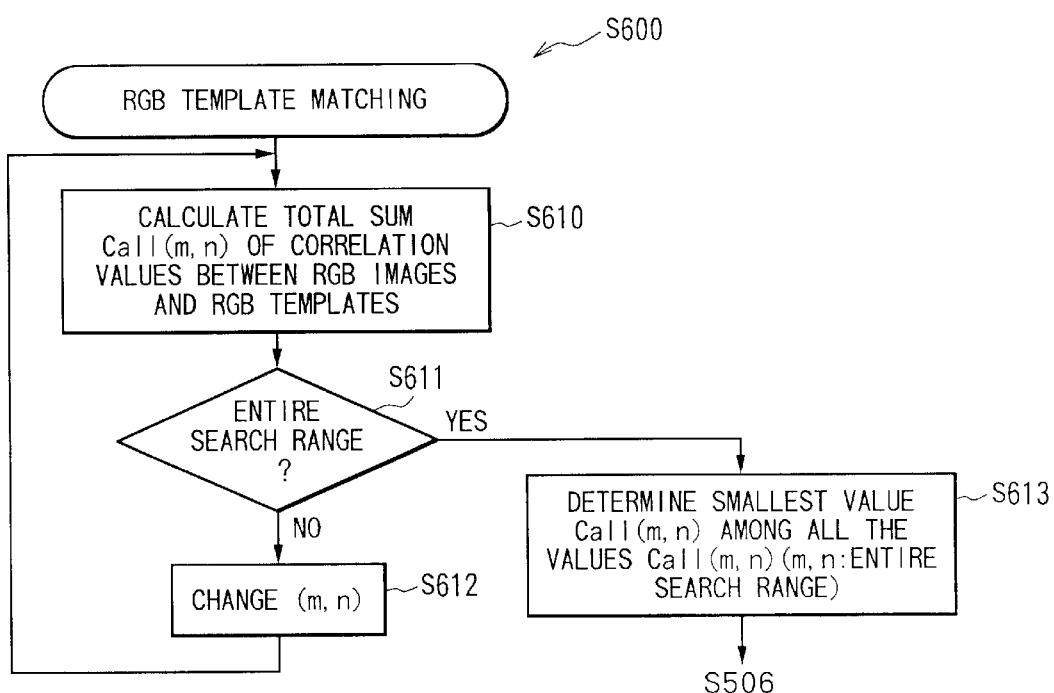
FIG. 22 is a flowchart showing the process S600 in FIG. 21.

More specifically, during the RGB template matching process of S600, as shown in FIG. 22, a correlation value C(m, n), where both of m and n are first initialized to zero (0), is first calculated in S610 for each RGB component with respect to one block (3×3 pixel block, for example) in the reference image and the corresponding current block in the input image. The correlation values Cr(m, n), Cg(m, n), and Cb(m, n) for the RGB components are expressed by the following equations:

$$Cr(m,n)=\Sigma|r(x,y) -Tr(x+m,y+n)|$$

$$Cg(m,n)=\Sigma|g(x,y) -Tg(x+m,y+n)|$$

$$Cb(m,n)=\Sigma|b(x,y) -Tb(x+m,y+n)|$$

Wherein x, y represents all the pixels located in the present block. The correlation values are calculated by the processing elements in the same manner that the correlation value C(j) is calculated in the second embodiment.

In S610, calculation is further performed to obtain the total sum "Call (m, n)" of the correlation values for all the RGB components. The total sum Call (m, n) is therefore expressed by the following equation:

$$Call(m,n)=Cr(m,n) +Cg(m,n)+Cb(m,n)$$

The total sum Call (m, n) of correlation values is calculated also by the processing elements 400. The calculated value Call (m, n) is then transferred to and stored in the calculating portion 15B.

Next, the value of m or n is changed within the entire search range (No in S611, S612). More specifically, the reference image data Tr, Tg, and Tb is transferred between register matrices 401 of neighboring processing elements 400 in the up, down, left, or right direction.

Next, in S610, the value Call (m, n) is calculated again. In this way, while transferring reference images Tr, Tg, and Tb between neighboring processing elements 400 (no in S611 and S612), calculation of the value Call (m, n) is repeated over the entire search range. It is noted that the search range is determined dependently on conditions such as an estimated maximum deviation of the object, reduction power of the lens 501, and pixel pitch in the photodetector arrays 11.

When all the values Call (m, n) are obtained for the entire search range (Yes in S611), the smallest value Call (m, n) is selected among all the values Call (m, n) which are now stored in the calculating portion 15B. Then, the value (m,n) for the selected value Call (m, n) is determined. The thus determined position (m, n) indicates the matching position. At this point, the RGB template matching process of S600 ends.

Figure 21:
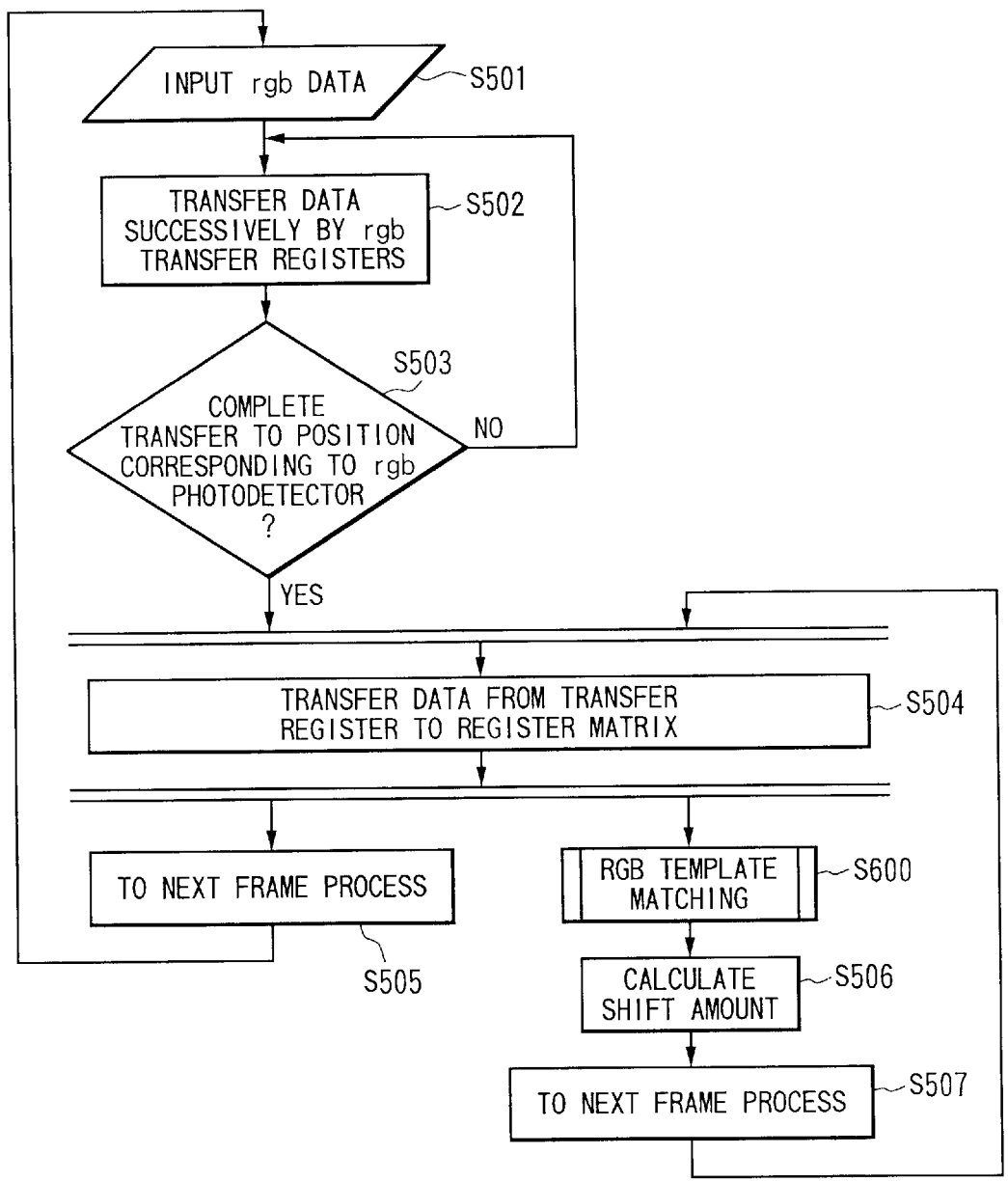
FIG. 21 is a flowchart showing the process of the high-speed vision sensor of the third embodiment.

Next, as shown in FIG. 21, the image shift amount $(m^2=n^2)^{1/2}$ is calculated in S506 based on the values m, n which have been determined in S600. The image shift amount indicates the amount, by which the object image in the block deviates from the ideal position. It is noted that in the RGB template matching process of S600, the processes of S610–S612 are executed by the program control portion 15A controlling the processing elements 400 to perform parallel processing. The calculation processes of S613 and S506 are executed by the calculating portion 15B. It is noted that by performing the RGB template matching processes of S600 for all the blocks in the light receiving surfaces 11r, 11g, and 11b, it is possible to obtain the positional shift amount of the objects appearing in the respective blocks.

The shift registers 410r, 410g, and 410b transfer RGB data for one frame to the processing elements 400. Then, while the processing elements 400 and the calculating portion 15B perform their calculations in S600–S506 onto the received data, the shift registers 410r, 410g, and 410b move on to the process of the next frame in S505, and execute processes in S501–S503. After completing a calculation process in S600–S506, the processing elements 400 and the calculating portion 15B move on to the process of the next frame in S507, and receive RGB image data for the next frame from the shift registers 410r, 410g, and 410b in S504. By repeating the above-described processes, the processing elements 400 and the calculating portion 15B can perform calculations on the present frame in S600–S506 while the shift registers 410r, 410g, and 410b transfer RGB image data for the next frame in S501–S503, thereby reducing wasteful wait time.

Next, another embodiment (fourth embodiment) that employs a plurality of photodetector arrays will be described with reference to FIGS. 23–26.

Figure 23:
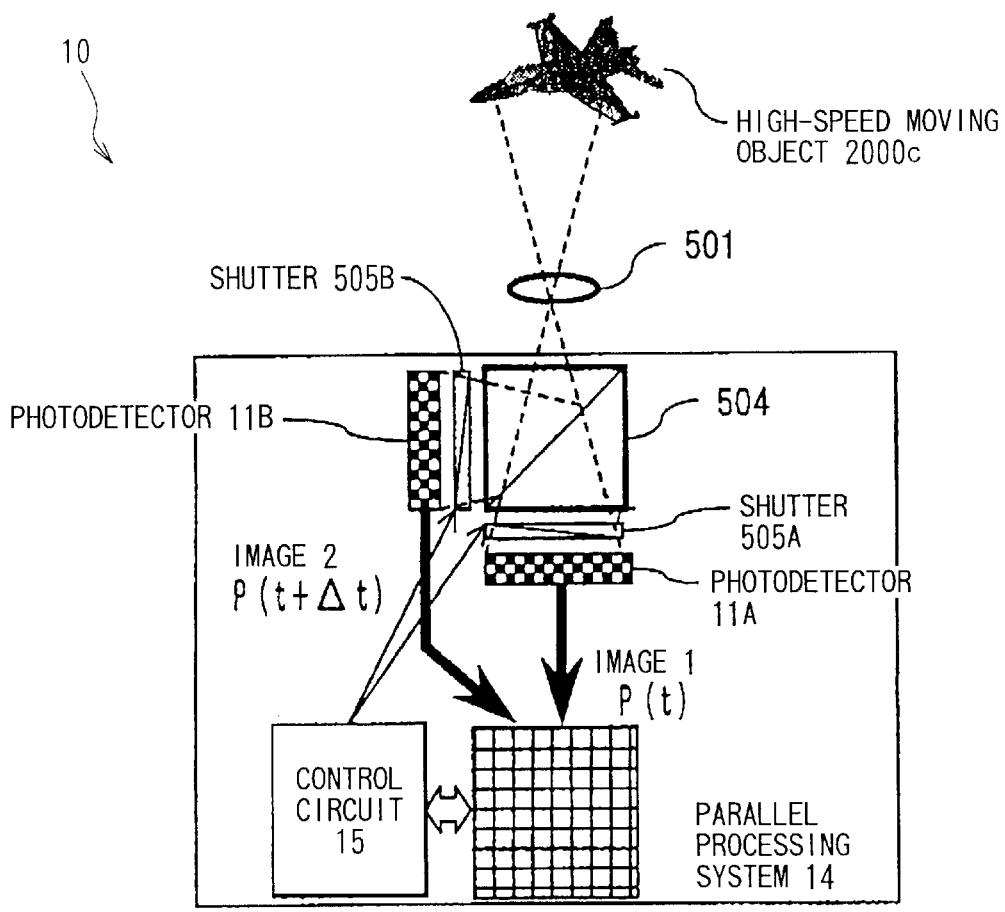
FIG. 23 is an explanatory diagram showing the structure of a high-speed vision sensor for recognition of a moving object according to a fourth embodiment of the present invention.
Figure 24:
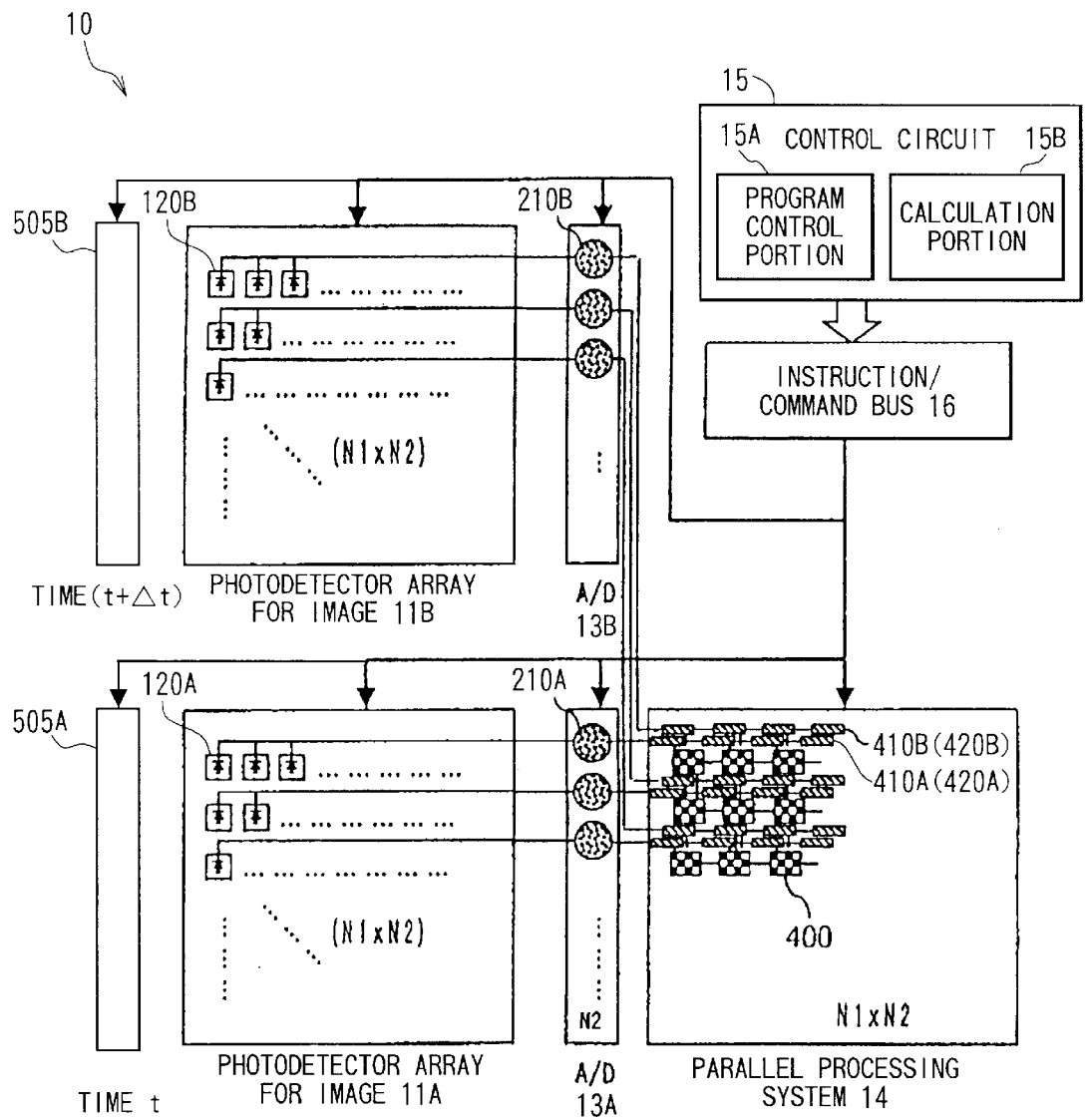
FIG. 24 is a block diagram showing the high-speed vision sensor of the third embodiment.

FIG. 23 is an explanatory diagram showing the overall construction of the system 10 for detecting a high-speed moving object, and FIG. 24 is a detailed block diagram of the system.

An image of an object 2000c passes through a lens 501 and is split into two directions by a beam splitter 504. The split images are guided through shutters 505A and 505B to photodetector arrays 11A and 11B. By controlling the shutters 505A and 505B with the control circuit 15, the images of the object 2000c at different times (different frames) are obtained by the photodetector arrays 11A and 11B. More specifically, the photodetector array 11A obtains an image P(t) at a time t (frame t), while the photodetector array 11B obtains an image P(t+Δt) for another time t+Δt (frame t+Δt). By controlling the shutters 505A and 505B, it is possible to set the length of the Δt (frame rate) to an extremely short period of time.

As in the second embodiment, as shown in FIG. 24, the photodetector arrays 11A and 11B have the same construction as the photodetector array 11 in the first embodiment. Analog-to-digital converter arrays 13A and 13B have the same construction as the analog-to-digital converter array 13 in the first embodiment. As in the second embodiment, the parallel processing system 14 includes N1 columns×N2 rows of processing elements 400 which are arranged two-dimensionally to correspond one-on-one to the N1×N2 photodetectors 120 in each of the photodetector arrays 11A and 11B. The high-speed vision sensor 10 of the present embodiment is further provided with N2 shift register lines 420A in one to one correspondence with the N2 rows of processing elements. The high-speed vision sensor 10 of the present embodiment is further provided with other N2 shift register lines 420B in one to one correspondence with the N2 rows of processing elements. The shift register lines 420A and 420B are connected to the analog-to-digital converter arrays 13A and 13B, respectively. As in the second embodiment, N1 shift registers 410A, each having a plurality of bits (four bits in this example), are connected in series in each shift register line 420A. N1 shift registers 410B, each having a plurality of bits (four bits in this example), are connected in series in each shift register line 420B. Each processing element 400 is connected to both of a corresponding shift register 410A and a corresponding shift register 410B.

With this configuration, two images obtained by the photodetector arrays 11A and 11B are converted to digital signals by the corresponding analog-to-digital converter arrays 13A and 13B. The digital signals are fed to the single parallel processing system 14. In the parallel processing system 14, the digital signals are transferred by the corresponding shift registers 410A and 410B to the processing elements 400, and are subjected to calculation operations. In this way, the high-speed vision sensor 10 of the present embodiment can detect movement of a high-speed moving object that has been difficult to be recognized based on images picked up at a conventional frame rate. Additionally, image processing can be performed without delays at a frame rate higher than the conventional frame rate.

Next, the operations of the present embodiment will be described with reference to the flowcharts in FIGS. 25–26.

It is noted that according to the present embodiment, an image for a certain frame at a time t is transferred. Then, while an image for the next frame (t+Δt) is being transferred, calculation is performed on two images for time t and the previous time (t−Δt) to determine the velocity of the moving object at time t. While an image for the next frame (t+2 Δt) is being transferred, calculation is performed on two images for time (t+Δt) and time t to determine the velocity of the moving object at time (t+Δt).

More specifically, first, in S701, image data t(x, y) for frame t at time t is obtained from the corresponding camera 11a. Next, in S702 and S703, the image data of the frame at time t is transferred using the corresponding shift registers 410A up to the processing element 400 at the corresponding position (x, y). Next, in S704, at the transferred position (x, y), image data t(x, y) is transferred from the corresponding shift register 410A to the corresponding processing element 400. It is noted that image data t'(x, y) for the frame at time (t−Δt), which has been obtained by the photodetector array 11B at time (t−Δt), has already been transferred by the shift registers 410B and stored in the processing element 400.

Next, a matching process for images over Δt is performed in S800.

Figure 26:
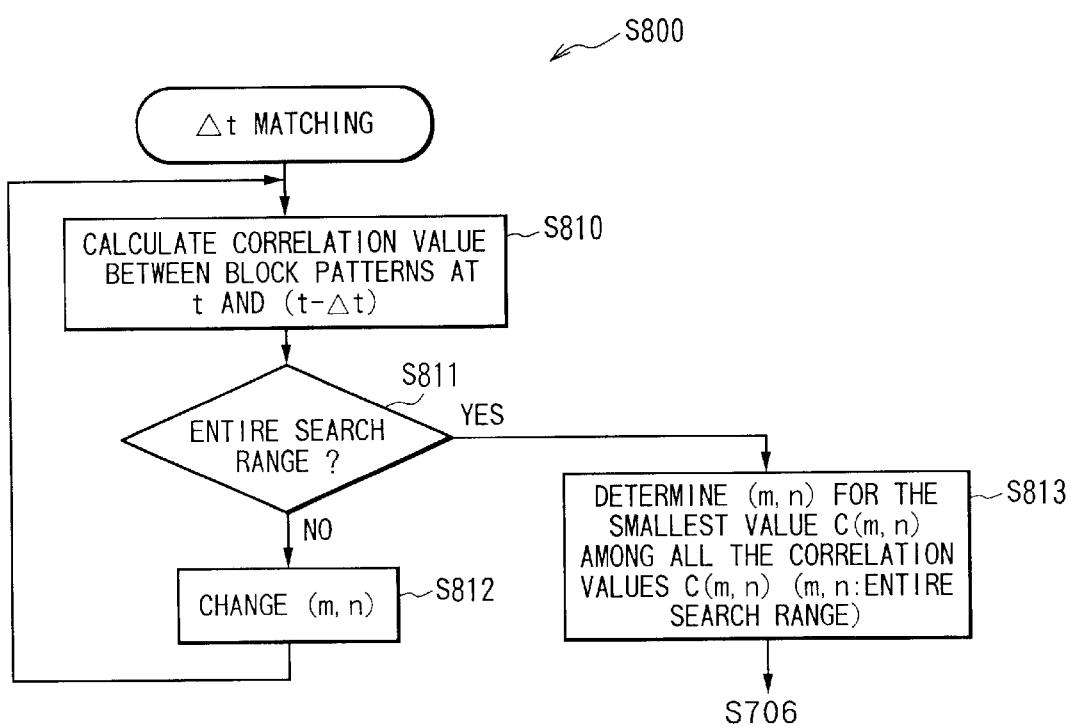
FIG. 26 is a flowchart showing the process S800 in FIG. 25.

During the Δt matching process, as shown in FIG. 26, in order to find what portion of the image in (t−Δt) has a high match with a single block (3×3 pixel block, for example) in the image at time t, a correlation value C(m, n), where m and n are first initialized to zero (0), is calculated with respect to the block in the image of time t and a corresponding current block in the image of time (t−Δt).

It is noted that the value C(m, n) is expressed by the following equation:

$$C(m,n)=\Sigma|t'(x,y) -t(x+m,y+n)|$$

wherein x, y represents all the pixels located in the current block. The correlation value C(m, n) can be calculated in the same manner the correlation value C(j) is calculated in the second embodiment. The calculated correlation value C(m, n) is transferred to and stored in the calculating portion 15B.

Next, the values m and n are changed within the entire search range (No in S811 and S812). More specifically, image data for time t is transferred up, down, left, or right between the register matrices 401 of neighboring processing elements 400.

Next, the correlation value C(m, n) is calculated again in S810. Thus, calculation of the correlation value C(m, n) is repeated within the entire search range while transferring image data for the time t between neighboring processing elements 400 (no in S811, S812). It is noted that the search range is determined dependently on conditions such as an estimated maximum velocity of the object, reduction power of the lens 501, and pixel pitch of the photodetector arrays 11A and 11B. Because the high-speed vision sensor 10 of the present embodiment can achieve a fast frame rate by setting the shutter time interval Δt to a very small value, it is possible to set both m and n in a small range, such as −1, 0, and +1.

After all the correlation values C(m, n) are obtained for the entire search range (Yes in S811), the smallest value C(m,n) is selected in S813 among all the correlation values C(m, n) (where m=−1, 0, +1 and n=−1, 0, +1) which are currently stored in the calculating portion 15B. Then, the value (m, n) for the smallest value C(m, n) is determined. The thus determined value (m, n) indicates the matching position of the block in the image at time t with respect to the image at time (t−Δt)

Thus, the matching process of S800 ends.

Figure 25:
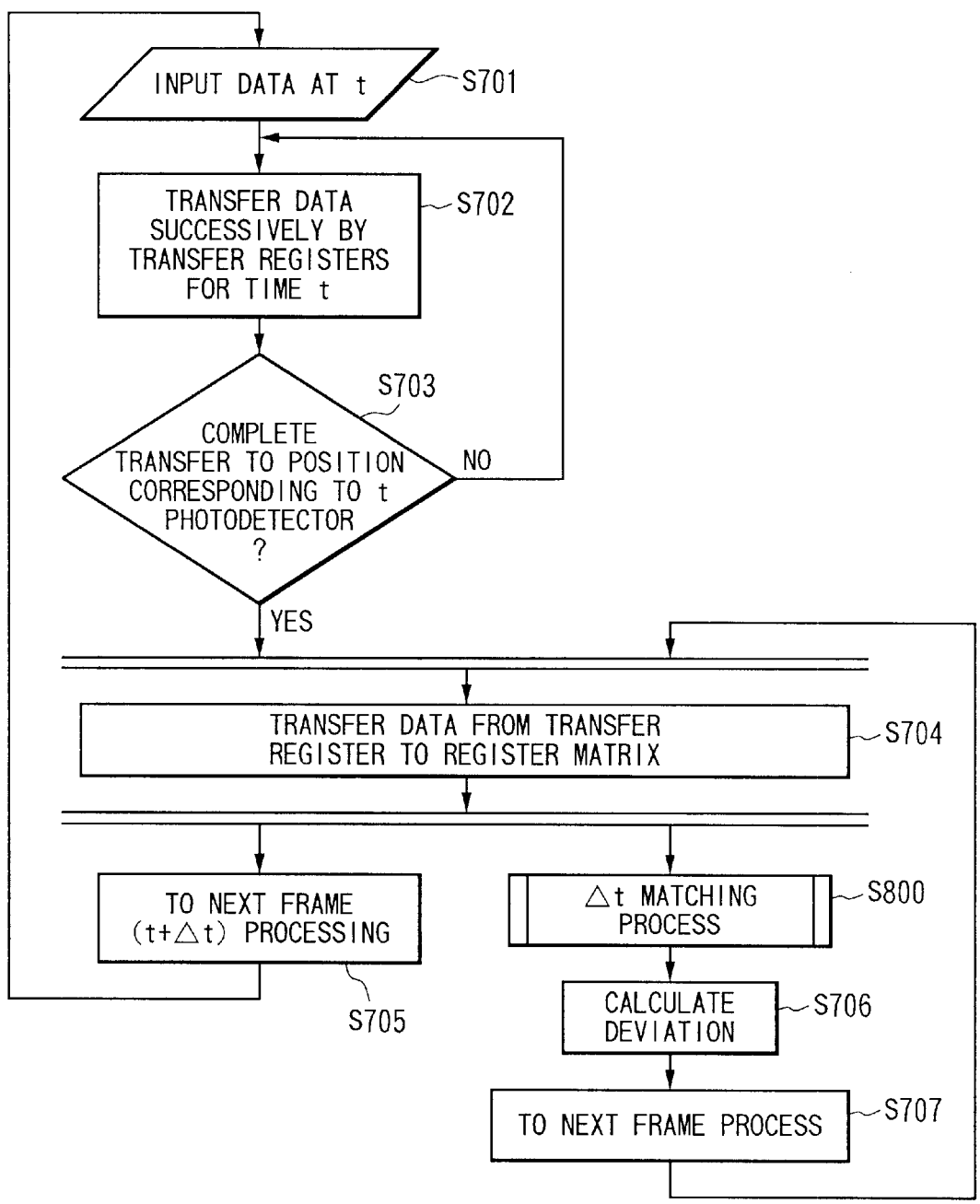
FIG. 25 is a flowchart showing the process of the high-speed vision sensor of the fourth embodiment.

Next, as shown in FIG. 25, in S706, the shift amount $(m^2+n^2)^{1/2}$ is calculated based on the value (m, n) determined as described above. This shift amount indicates the deviation of the object image in the block. The velocity of the object is calculated based on this deviation. It is noted that during the Δt image matching process of S800, processes S810–S812 is executed by the control portion 15A controlling the processing elements 400 to perform parallel processing. The calculations in S813 and S706 are executed by the calculating portion 15B. Further, by performing the matching process of S800 for all the blocks in the light receiving surfaces, it is possible to determine in S706 the positional shift amount, during the time At, of the objects appearing in the respective block images and the velocities of the objects.

As described above, while calculation process is being performed in S800–S706 onto the images at time t and time (t−Δt), the light receiving portion 11B and the corresponding shift registers 410B move on to the process of the next frame (t+Δt) in S705, thereby transferring the image for the time (t+Δt) to the parallel processing system 14 by executing the processes of S701–S703. After completing the calculation of images at time t and time (t−Δt) in S800–S706, the processing elements 400 and the calculating portion 15B move on to process the next frame in S707. When image data for the next frame time (t+Δt) is transferred to the register matrices 401 from the shift registers 410B in S704, the processing elements 400 and the calculating portion 15B perform calculation for time t and time (t+Δt) in S800–S706. In this way, input of frame images is repeatedly alternated between the photodetector arrays 11A and 11B. At the same time, calculations are repeatedly performed on two consecutive frames. Hence, the processing elements 400 and calculating portion 15B can perform calculations of S800–S706 while the shift registers 410A or 410B transfer image data for the next frame (next time) in S701–S703, thereby reducing wasteful wait time.

The high-speed vision sensor 10 of the present embodiment can be applied to an automatic tracking system, for example, and can be used to control a camera-mounting unit (external device 1000), which mounts thereon the photodetector arrays 11A and 11B, with respect to the matched image position.

It is noted that in the example described above, the present embodiment is provided with the two photodetector arrays. However, the embodiment can include three or more photodetector arrays. In this case, the parallel processing system 14 has to be provided with a group of shift registers dedicated for each photodetector array.

In the high-speed vision sensor 10 of the second through fourth embodiments described above, when a plurality of photodetector arrays 11a are used, a group of shift registers 410 is provided as being dedicated for each photodetector array 11. For this reason, the high-speed vision sensor 10 can perform transfer operation and processing operation, in parallel, onto the images obtained at the respective photodetector arrays, thereby achieving efficient transfer. Accordingly, the high-speed vision sensor 10 is particularly suitable for such processes as three-dimensional vision, color image processing, and detection of high-speed moving object.

Next, a fifth embodiment of the present invention will be described with reference to FIGS. 27–32.

Various types of image processes require data, separate from input image data, such as image data other than the input image data or parameters to be used for image processes. The present embodiment is provided for enabling faster processing of those various image process calculations that include the step of transferring the separate data.

Figure 27:
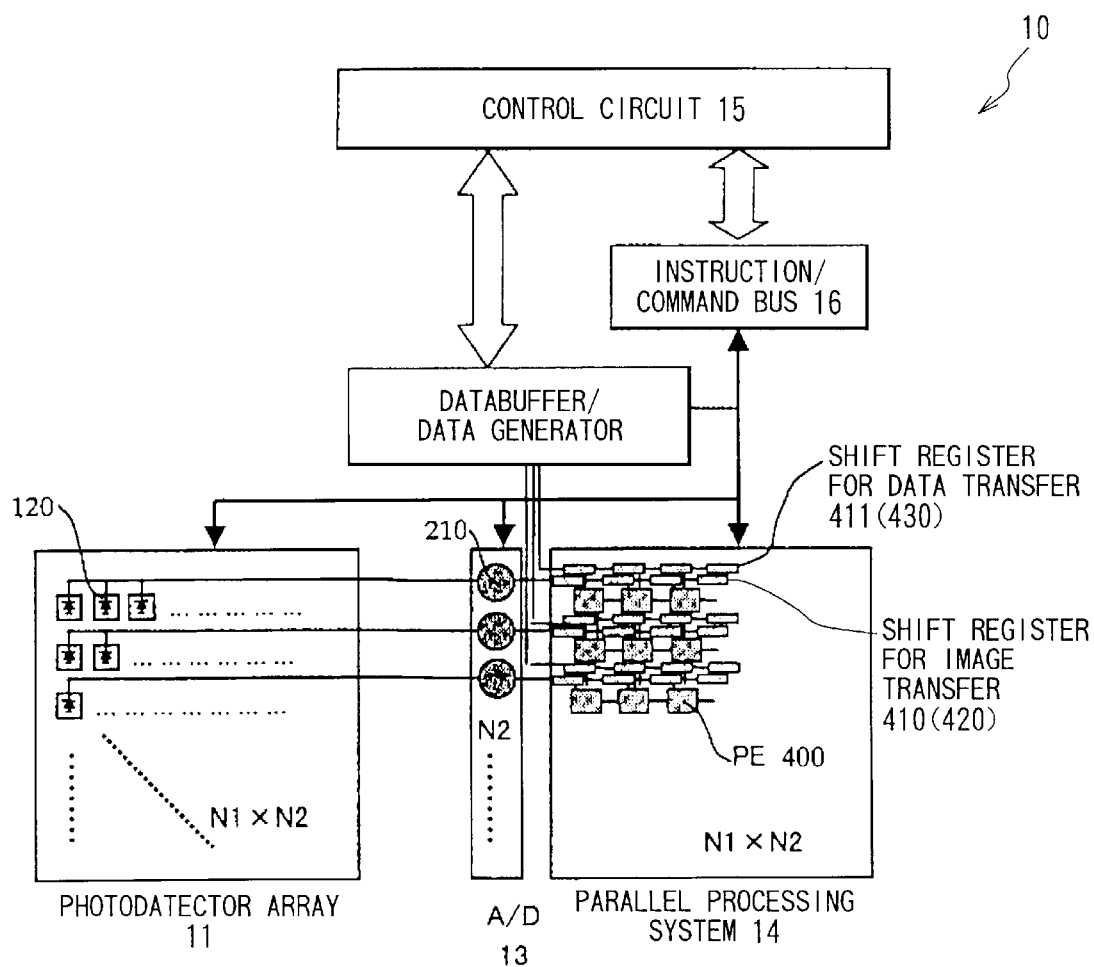
FIG. 27 is a block diagram showing a high-speed vision sensor according to a fifth embodiment of the present invention.

FIG. 27 shows the construction of the high-speed vision sensor 10 according to the present embodiment. The high-speed vision sensor 10 of the present embodiment is different from that in the first embodiment (FIG. 1) in that the high-speed vision sensor 10 of the present embodiment is provided with a data buffer/data generator 17, and that the parallel processing system 14 has shift registers 411 for transferring data from the data buffer/data generator 17 to the processing elements 400.

More specifically, the parallel processing system 14 of the present embodiment is provided with N2 shift register lines 430, in addition to the N2 shift register lines 420. The N2 shift register lines 430 are arranged in one to one correspondence with the N2 rows of processing elements. The N2 shift register lines 430 are connected to the data buffer/data generator 17. As in the shift register lines 420, each shift register line 430 includes N1 shift registers 411 which are connected in series. Each shift register 411 has plural bits (four bits in the present embodiment). Each processing element 400 is connected to both of the corresponding shift register 410 and the corresponding shift register 411.

The data buffer/data generator 17 is for transmitting and receiving predetermined external data (process data and/or control data), which are required for image processing calculations, to and from the shift registers 411 according to instructions issued by the control circuit 15.

It is noted that the process data is required for image processing. Examples of the process data include coefficient data. The control data indicates a control description of the calculation. Examples of the control data include data indicative of whether to or not to calculate. The shift registers 411 transfer the external data, received from the data buffer/data generator 17, to the processing elements 400.

Figure 28:
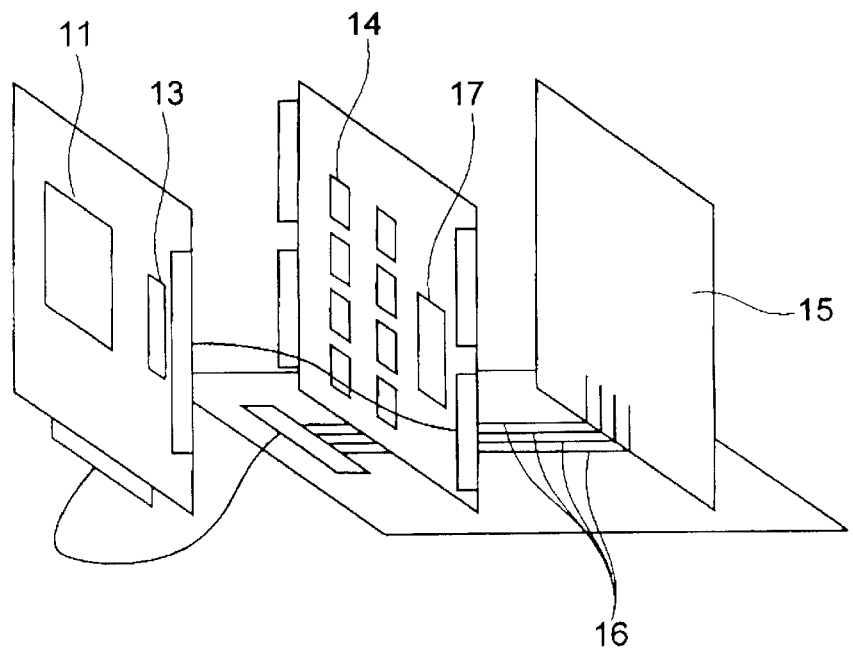
FIG. 28 is a schematic view showing the construction of the fifth embodiment.

As shown in FIG. 28, the data buffer 17 can be formed on the same circuit board as the parallel processing system 14. Or, the data buffer 17 can be formed on the same circuit board as the control circuit 15. The data buffer 17 can be integrated on either the parallel processing system 14 or the control circuit 15.

Figure 29:
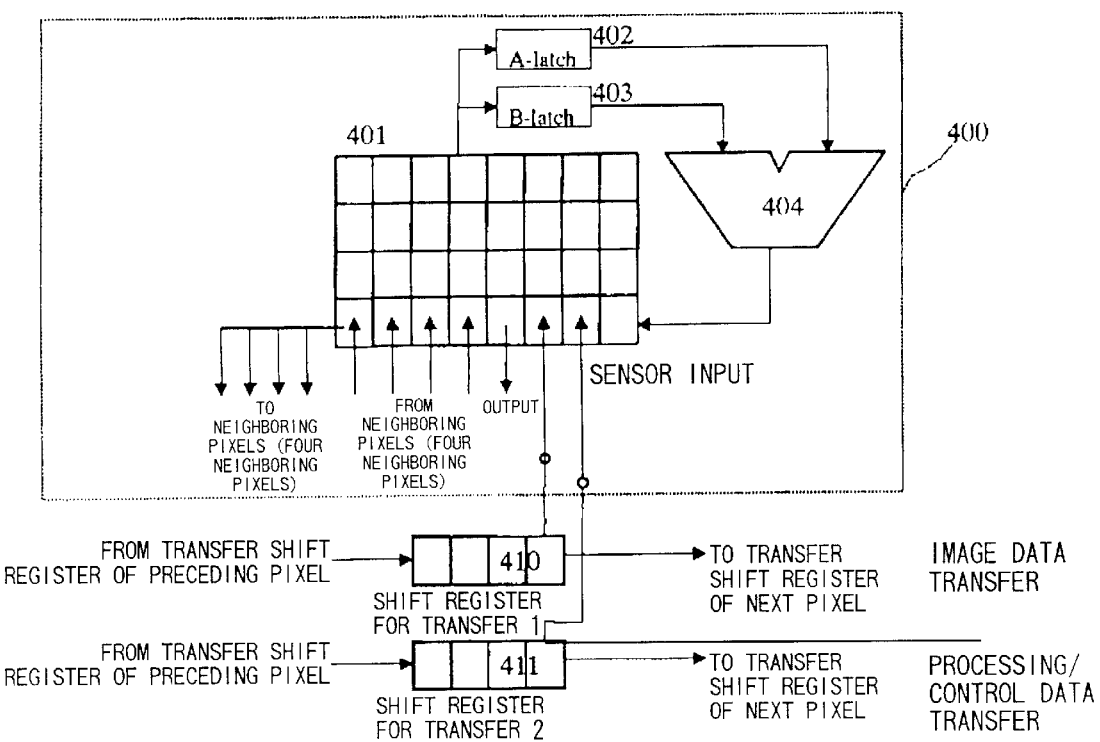
FIG. 29 is a block diagram showing a processing element according to the fifth embodiment.

According to the present embodiment, as shown in FIG. 29, each processing element 400 is connected to both of the shift register 411 and the shift register 410. Hence, in response to instructions from the control circuit 15, the data buffer/data generator 17 prepares control data and/or processing data according to the contents of the process to be performed. The data buffer/data generator 17 then transfers the control data and/or processing data via the shift registers 411 to the register matrices 401 of the processing elements 400. This data transfer operation is performed in parallel to image data transfer operation. The shift registers 411 operate substantially in the same manner as the shift registers 410, and therefore description of the operations of the shift registers 411 is omitted.

As in the first through fourth embodiments, the high-speed vision sensor 10 of the present embodiment can perform the method called SIMD for controlling all of the processing elements 400 to perform the same calculations. Additionally, the high-speed vision sensor 10 of the present embodiment can allow the respective processing elements 400 to perform different operations by transferring non-uniform control data to the processing elements 400 using the shift registers 411. Accordingly, the high-speed vision sensor 10 of the present embodiment can perform more flexible processing.

Next will be described a detailed description of one example of the process that uses the shift registers 411. It is noted that the human eye has a function for observing the center portion of an image in high resolution and the peripheral portion in low resolution. The example described below relates to an image processing that attains this function.

This process can be implemented by differing the processing description for the central portion of an image from that for the peripheral portions of the same image. This process can be implemented also by differing the weight variables to be used for the central portion of an image from those to be used for the peripheral portions of the same image.

For example, in order to lower the resolution in the peripheral area, it is conceivable to perform a process called smoothing by performing calculations between four neighboring pixels as indicated below:

$$I'(x, y) = \frac{\begin{Bmatrix} D1 \times I(x, y) + D2 \times I(x, y+1) + D3 \times I(x, y-1) + \\ D4 \times I(x+1, y) + D5 \times I(x-1, y) \end{Bmatrix}}{D1 + D2 + D3 + D4 + D5}$$

wherein I(x, y) is input image data received at the position (x, y), and I'(x, y) is resultant image data obtained at the position (x, y) by the present processing. D1–D6 are weight variables used for obtaining a weighted average. It is possible to adjust the degree of smoothing by changing the amounts of the weight variables for each pixel. For example, D1 is set to one (1) and D2 through D5 are set to zero (0) in the center portion where no smoothing is desired to be performed, while D1 is set to two (2) and D2 through D5 are set to one (1) in the peripheral areas in order to provide much smoothing in those areas. In order to attain a proper smoothing operation, the amounts of the weight variables are previously determined for the respective pixels according to the positions of the pixels. The weight variables are then stored in the data buffer/data generator 17. At the time of calculations, data of those variables are transferred to the processing elements 400 via the shift registers 411, enabling the respective processing elements to perform different calculations from one another.

In this way, it is possible to perform calculations using different filtering functions for the respective pixels. Hence, when it is more important to attain high-speed calculations than to attain high resolution, for example, it is possible to first calculate the adding average of image data for every 2×2=4 pixels and then to perform, at the respective four pixels, detection of a vertical edge, a horizontal edge, a right diagonal edge, and a left diagonal edge, thereby detecting edges in four directions simultaneously.

Figure 30:
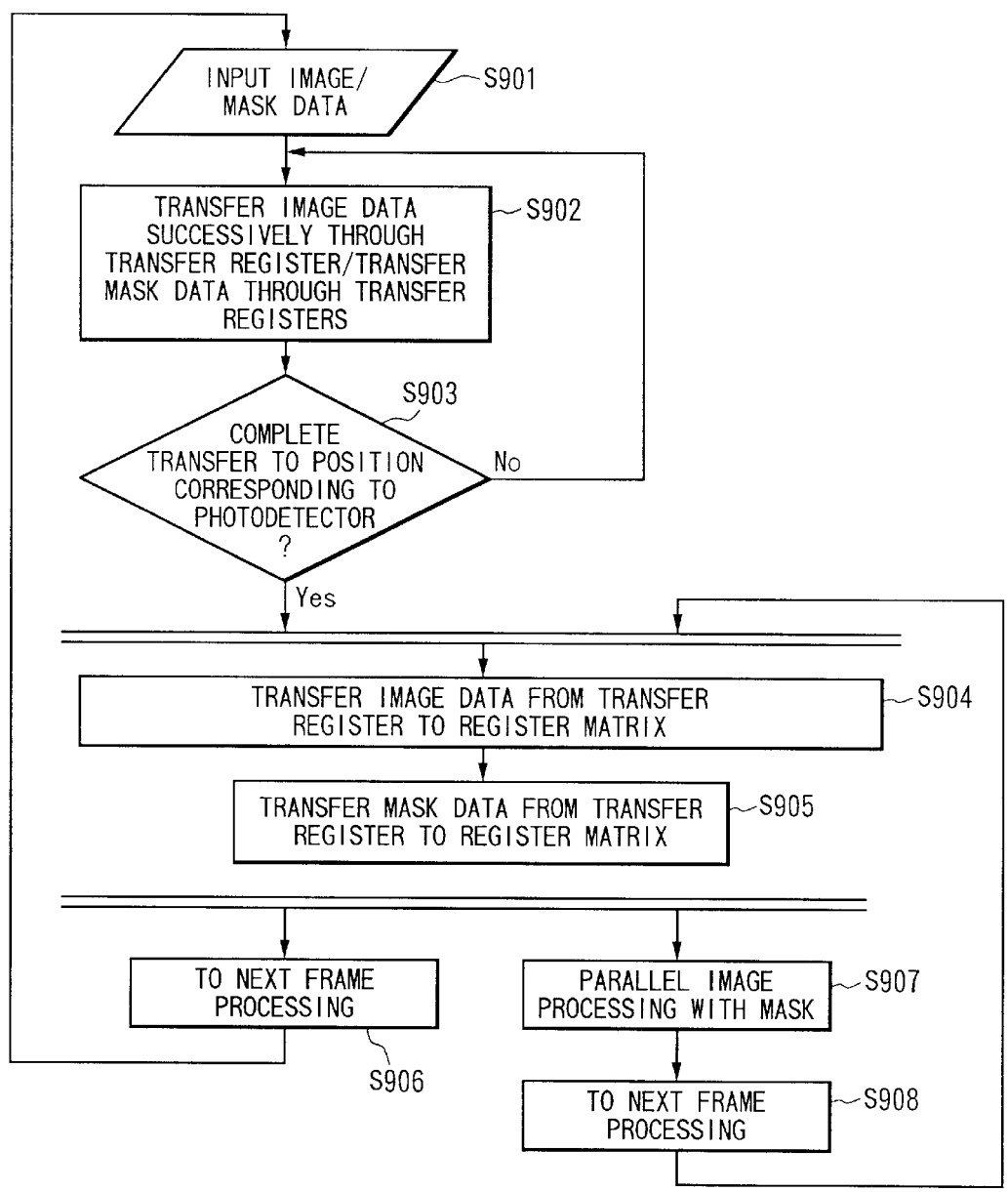
FIG. 30 is a flowchart showing the process of the high-speed vision sensor of the fifth embodiment.

Next, the operations of the high-speed vision sensor 10 will be described with reference to the flowchart in FIG. 30.

First, in S901, image data from the photodetector array 11 is outputted to the parallel processing system 14 via the analog-to-digital converter array 13. Simultaneously, the data buffer/data generator 17 is controlled to output process commands to the parallel processing system 14.

The process command indicates a 3×3 weighting mask. To perform high-resolution filtering on the center portion and low-resolution filtering on the peripheral portion, for example, the weighting mask to be transferred to each pixel in the center portion is merely for multiplying the image value of the subject pixel by eight (8). The weighting mask to be transferred to each pixel in the peripheral portion is for performing a smoothing operation with eight neighboring pixels that are located to the up, down, left, and right of the subject pixel. More specifically, the data buffer/data generator 17 prepares two types of mask data: mask A=(0, 0, 0, 0, 8, 0, 0, 0, 0) and mask B=(0, 1, 0, 1, 4, 1, 0, 1 0). Mask A is for multiplying the image value of the subject pixel by eight (8), while mask B is for smoothing the subject pixel with the neighboring pixels that are located to the up, down, left, and right of the subject pixel. It is now assumed that the parallel processing system 14 has 128×128 processing elements 400. That is, the coordinates (x, y) for all the processing elements are in the range of x=0~127 and y=0~127. In this case, the mask A is used for the processing elements 400 that are located in the center portion of the parallel processing system 14. More specifically, the mask A is used for those processing elements 400 that have coordinates (x, y) in the range of x=32~95 and y=32~95. On the other hand, mask B is used for the peripheral portion of the parallel processing system 14. More specifically, the mask B is used for those processing elements 400 that are located at coordinates (x, y) in the range of x=0~31 or 96~127 and y=0~31 and 96~127.

In S902–S903, image data I(x, y) from the analog-to-digital converter array 13 is transferred through the shift registers 410 to the processing elements 400 at corresponding positions (x, y). At the same time, masks A and B are transferred from the buffer/data generator 17 through the shift registers 411 to the processing elements 400 at the corresponding positions (x, y). It is noted that the mask A is transferred to coordinate positions (x, y) where 32≦x≦95 and 32≦y≦95. The mask B is transferred to coordinate positions (x, y) where 0≦x≦31 or 96≦x≦127 and y=0≦y≦31 or 96≦y≦127.

When the transfer is completed, image data I(x, y) is transferred from each shift register 410 to the register matrix 401 of the corresponding processing element 400 in S904. Next, in S905, the mask A or B is transferred from each shift register 411 to the register matrix 401 of the corresponding processing element 400.

Next, in S907, each processing element 400 receives input image data I(x−1, y−1), I(x, y−1), I(x+1, y−1), I(x−1, y), I(x+1, y), I(x−1, y+1), I(x, y+1), and I(x+1, y+1) from its eight neighboring pixels, and uses the mask A or B, which is stored in S905, to perform the following calculations onto the eight neighboring input image data and its own input image data I(x, y):

$I'(x,y)$=mask(0)×$I(x−1,y−1)$

+mask(1)×$I(x,y−1)$

+mask(2)×$I(x+1,y−1)$

+mask(3)×$I(x−1,y)$

+mask(4)×$I(x,y)$

+mask(5)×$I(x+1,y)$

+mask(6)×$I(x−1,y+1)$

+mask(7)×$I(x,y+1)$

+mask(8)×$I(x+1,y+1)$ $I''(x,y)=I'(x,y)/8$

It is noted that the processing elements 400 located in the center portion receive the mask A=(0, 0, 0, 0, 8, 0, 0, 0, 0). Accordingly, those processing elements 400 perform the above-described calculation by setting "mask (0)" through "mask (3)" and "mask (5)" through "mask (8)" to zero (0) and by setting "mask (4)" to eight (8). The processing elements 400 located in the peripheral portions receive the mask B=(0, 1, 0, 1, 4, 1, 0, 1, 0). Accordingly, those processing elements 400 perform the above-described calculation by setting mask (0), mask (2) mask (6), and mask (8) to zero (0), by setting mask (1) mask (3), mask (5), and mask (7) to one (1); and by setting mask (4) to four (4). In this way, the present embodiment can perform image processing calculations by setting different mask coefficients to respective pixels.

It is noted that among the image data for the eight neighboring pixels, four sets of image data I(x, y−1), I(x−1, y), I(x+1, y), and I(x, y+1) are transferred to each processing element 400 directly from the shift register matrices of the neighboring processing elements 400 on the four sides. The remaining four sets of image data I(x−1, y−1), I(x+1, y−1), I(x+1, y+1), and I(x+1, y+1) are transferred to each processing element 400 by repeating two times the transfer operation between neighboring processing elements.

Each processing element 400 outputs the resultant image data I"(x, y−1) to the calculating portion 15b. The image data is subjected to a necessary image process in the calculating portion 15B. It is noted that the resultant image data I"(x, y) indicates an image whose center portion is not changed from the original state but whose peripheral portion is smoothed. By using this image, it is possible to perform matching operation while allowing the peripheral portion of the image to be unfocused, similarly to the process achieved by a human eye. The calculating portion 15B can therefore know the general position and the general shape of an object that is located in the peripheral portion of the image by making a general matching of the object based on the resultant image I"(x, y). Based on the result of the general matching operation, control operations are performed to move an external device 1000, which is the camera-mounting device mounting the photodetector array 11, in order to position the object in the center of the camera, enabling more detailed matching thereafter.

The shift registers 410 and 411 transfer image data and mask data to the processing elements. While the processing elements 400 perform calculations on the received image and mask data in S907, the shift registers 410 and 411 move on to the process of the next frame in S906 and execute processes in S901–S903. After completing the calculating process in S907, the processing elements 400 move on to the next frame process in S908. Image data for the next frame is transferred from the shift registers 410 to the register matrices 401 of the processing elements, and mask data is transferred from the shift registers 411 to the register matrices 401 of the processing elements (S904 and S905). By repeating the above-described processes, the processing elements 400 perform calculations in S907 while the shift registers 410 and 411 transfer data for the next frame in S901–S903, thereby reducing the amount of unnecessary wait time.

Figure 31:
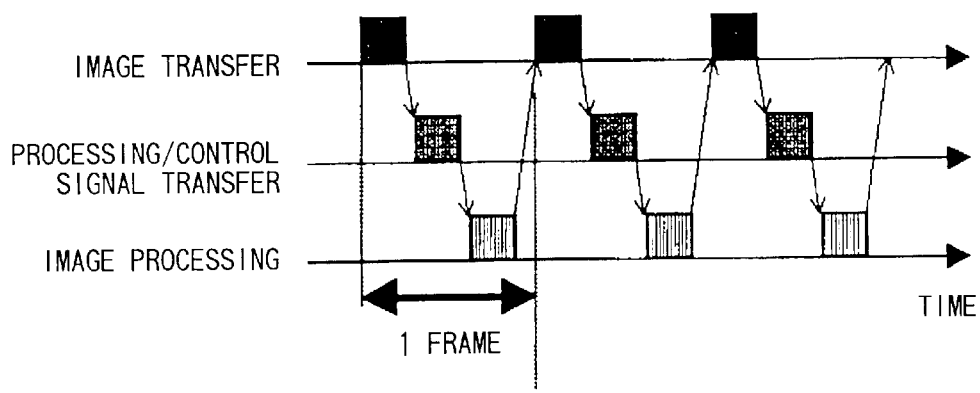
FIG. 31 is a timing chart for the processes of a parallel processing system in a comparative example.
Figure 32:
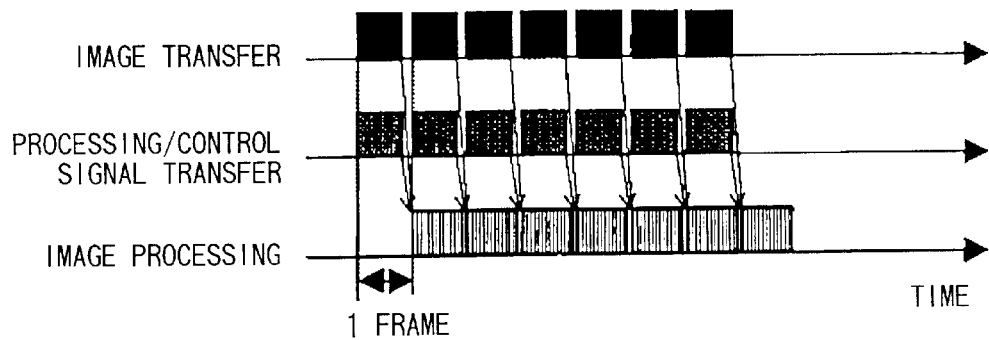
FIG. 32 is a timing chart for the processes of the parallel processing system according to the sixth embodiment.

FIG. 31 is a timing chart showing timings of the transfer processes and the calculating processes executed by a comparative example of a parallel processing system that is not provided with shift registers 410 or 411. FIG. 32 is a timing chart showing timings of the transfer processes and the calculating processes executed by the parallel processing system of the present embodiment. Because the parallel processing system of the comparative example is provided with no shift registers 410 or 411, transfer operations are performed by the processing elements. Accordingly, as shown in FIG. 31, this system has to perform transfer of an image, transfer of a process/control signal, and image calculations in a time-sharing manner.

Accordingly, the time (one frame) required from the beginning of the process of one image to the beginning of the process of the next image is at least the <image transfer time>+<process/control signal transfer time>+<image processing time>.

Contrarily, the parallel processing system of the present embodiment can perform the image transfer, the process/control signal transfer, and the image calculation independently and in parallel with one another, as shown in FIG. 32. Accordingly, one frame can be reduced to the longest one among the <image transfer time>, <process/control signal transfer time>, and <image processing time>. Hence, real-time processing can be achieved.

As described above, according to the present embodiment, image data and processing/control data are transferred by the shift registers 410 and 411, respectively. Accordingly, it is possible to perform transfer operations and the calculation operations in parallel. It is possible to perform, at a high-rate of speed, those processing operations that require transfer of data from an external source.

Next, a sixth embodiment will be described with reference to FIGS. 33–35.

Figure 33:
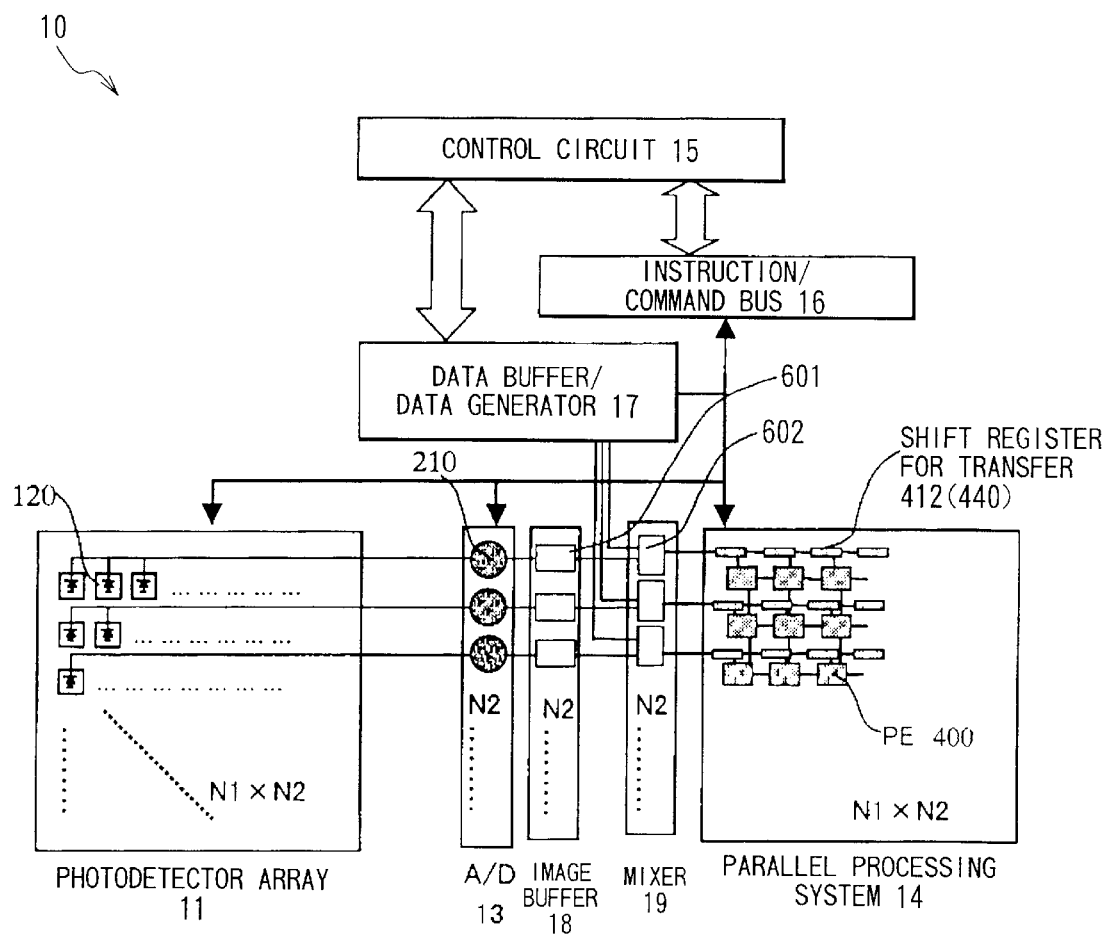
FIG. 33 is a block diagram showing a high-speed vision sensor according to a sixth embodiment of the present invention.
Figure 34:
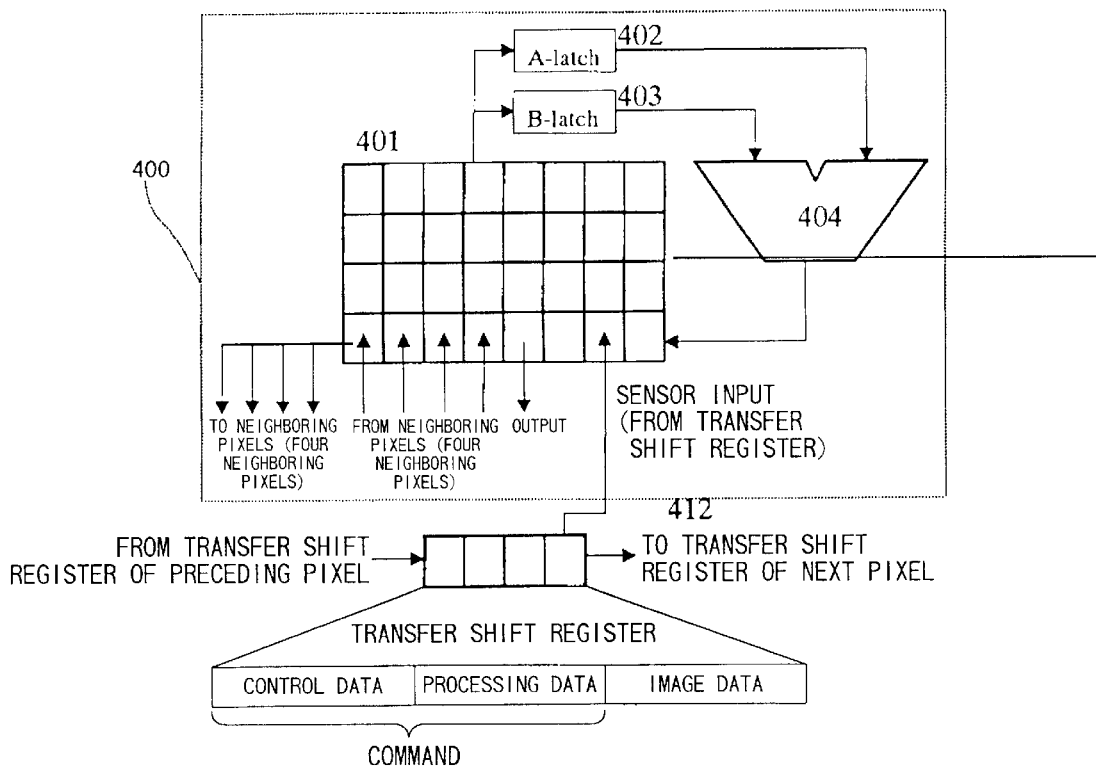
FIG. 34 is a block diagram showing a processing element according to the sixth embodiment.

FIGS. 33 is a block diagram showing the high-speed vision sensor 10 of the present embodiment. FIG. 34 shows the construction of the processing element 400 and a shift register 412. The high-speed vision sensor 10 of the present embodiment is different from that of the fifth embodiment shown in FIGS. 27 and 29 in that one shift register line 440 for transferring both of image data and commands is provided for each row j of processing elements in the parallel processing system 14. In other words, N2 shift register lines 440 are provided in one to one correspondence with the N2 rows of processing elements. In addition, the high-speed vision sensor 10 is provided with an image buffer array 18 and a mixer array 19. The image buffer array 18 includes N2 image buffers 601, each for temporarily storing image data sent from the corresponding analog-to-digital converter 210. The mixer array 19 includes N2 time-sharing mixers 602, each for combining signals from the corresponding image buffer 601 and signals from the data buffer/data generator 17 on a time-sharing basis. The N2 shift register lines 440 are connected one-on-one to the N2 time-sharing mixers 602 in the mixer array 19. N1 shift registers 412 are connected in series in each of the shift register lines 440. Each shift register 412 has a plurality of bits (four bits in this example). Each processing element 400 is connected to a corresponding shift register 412.

Unlike the high-speed vision sensor 10 in the fifth embodiment, wherein image data and process/control data are transferred separately by the shift registers 410 and 411, the high-speed vision sensor 10 of the present embodiment mixes, in time-sharing basis, the image data and the process/control data by the time-sharing mixers 602, and transfers the mixed data with the shift registers 412 only. It is noted that the speed of the overall system is determined by the conversion rate of the analog-to-digital converters 210 (1 Mbps (bits-per-second)). The multiplex transfers during one frame are sufficiently feasible because the transfer rate of the shift registers 412 is about 10–100 Mbps.

Figure 35:
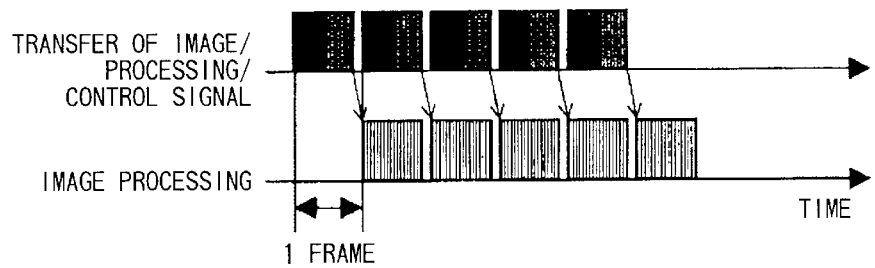
FIG. 35 is a timing chart for the processes of the parallel processing system according to the sixth embodiment.

FIG. 35 is a timing chart showing timings of transfer processes and calculating processes by the parallel processing system of the present embodiment. As with the fifth embodiment whose processing timing is shown in FIG. 32, the parallel processing system of the present embodiment can perform a pipeline process by performing the image calculations and transfers in parallel. Unlike the processing timing of the comparative example shown in FIG. 31, the high-speed vision sensor 10 of the present embodiment can shorten the processing time to the longer one of (the time required for transferring image data and process/control signals) and (the time required for processing image data). Hence, the high-speed vision sensor 10 of the present embodiment can achieve real-time processing.

As described above, according to the fifth and sixth embodiments, not only image data but also process/control data, stored in the data buffer 17, is transmitted to the processing elements 400 via the shift registers, thereby achieving high-speed and flexible calculations. The process/ control data can be transferred using either the dedicated shift registers, as described in the fifth embodiment, or the same shift registers used for transferring the image data, as described in the sixth embodiment.

The high-speed vision sensor of the present invention is not limited to the above-described embodiments, but can be modified in various manners.

For example, in the second through fourth embodiments, image data is transferred from the plural photodetector arrays 11 using the plural groups of shift registers 410. However, it is possible to transfer, in a time-sharing basis, image data from the plural photodetector arrays using only the single group of shift registers 412 by using the image buffer array 18 and the mixer array 19 as described in the sixth embodiment.

In the first through sixth embodiments, the analog-to-digital converter 210 includes the charge amp $221_j$. However, the analog-to-digital converter 210 and the charge amp 221 can be provided separately, as shown in FIG. 36. As shown in this figure, an amp array 12 is connected to the photodetector array 11. The amp array 12 has N2 charge amps 221. The analog-to-digital converter array 13 is provided between the amp array 12 and the parallel processing system 14. The analog-to-digital converter array 13 has N2 analog-to-digital converters 210. With this construction, each amp 220 in the amp array 12 successively converts charges, outputted from the N1 photodetectors 120 on the corresponding row 110 of the photodetector array 11, into voltage signals. These analog voltage signals are outputted to the corresponding analog-to-digital converter 210 in the analog-to-digital converter array 13. The analog-to-digital converter 210 successively converts the analog voltage signals to digital signals, and supplies the digital signals to the parallel processing system 14.

The configurations in the fifth and sixth embodiments can also be applied to a high-speed vision sensor 10 that has a plurality of photodetector arrays 11 as described in the second through fourth embodiments.

INDUSTRIAL APPLICABILITY

The high-speed vision sensor of the present invention can be employed in a wide variety of vision recognition processes, including FA robot control, three-dimensional vision, color image processing, and recognition of a high-speed moving object.

What is claimed is:

1. A high-speed vision sensor, comprising;
   at least one photodetector array, each having a plurality of photodetectors which are arranged two-dimensionally in a plurality of rows and in a plurality of columns;
   an analog-to-digital converter array having a plurality of analog-to-digital converters which are arranged one-dimensionally such that each analog-to-digital converter corresponds to one row in the at least one photodetector array, each analog-to-digital converter converting, into digital signals, analog signals which are successively outputted from the photodetectors in the corresponding row;
   a parallel processing system, including a parallel processing element array and a shift register array, the parallel processing element array having a plurality of processing elements which are arranged two-dimensionally in a plurality of rows and in a plurality of columns and in one-to-one correspondence with the plurality of photodetectors in the at least one photodetector array, each processing element performing a predetermined calcu-
   lation on digital signals transferred from the analog-to-digital converter array, the shift register array having a plurality of shift registers which are disposed in one-to-one correspondence with the plurality of analog-to-digital converters and in one-to-one correspondence with the plurality of rows of processing elements, each shift register successively transferring digital signals, which are received from the corresponding analog-to-digital converter and which are equivalent to signals outputted from the photodetectors in a corresponding photodetector row, to predetermined processing elements in the corresponding row; and
   a control circuit controlling the photodetector array and the analog-to-digital converter array to output digital signals for a single frame and controlling the shift register array to transfer the digital signals of the single frame to the parallel processing element array, and thereafter controlling the photodetector array and the analog-to-digital converter array to output digital signals for the next frame and controlling the shift register array to transfer the digital signals of the next frame to the parallel processing element array, while simultaneously controlling the parallel processing element array to perform the predetermined calculation onto the single frame.

2. A high-speed vision sensor as claimed in claim 1, wherein the at least one photodetector array includes a plurality of photodetector arrays, and wherein the parallel processing system includes, in correspondence with each processing element row, a plurality of lines of shift registers, the number of the plurality of lines being equal to the number of the plurality of photodetector arrays.

3. A high-speed vision sensor as claimed in claim 2, wherein the plurality of photodetector arrays are disposed at positions different from one another, and
   wherein the control circuit includes:
      a parallel processing control portion controlling the respective lines of shift registers to transfer images which are taken at different positions and outputted from the corresponding photodetector arrays, and controlling the parallel processing system to perform calculations, based on image signals obtained by the plurality of photodetector arrays, to determine the amount of positional shift, of an object, between its images taken by the plurality of photodetector arrays; and
      a calculating portion calculating three-dimensional positional information of the object based on the determined amount of positional shift and information on the position of each photodetector array and on the direction in which each photodetector array takes images.

4. A high-speed vision sensor as claimed in claim 3, wherein the plurality of photodetector arrays are arranged such that data transfer directions, along which the rows of the photodetectors in the respective photodetector arrays extend to transfer data from the photodetectors, are lined up in the same direction and such that corresponding photodetectors in the plural photodetector arrays are positioned to be shifted from one another in the data transfer direction, and
   wherein the parallel processing control portion controls the parallel processing system to calculate, based on the image signals obtained by the plural photodetector arrays, the amount of positional shift along the data transfer direction among the images taken by the plural photodetector arrays.

5. A high-speed vision sensor as claimed in claim 4, further comprising a pixel shift amount storage device storing the amount of positional shift, along the data transfer direction, which is calculated by the parallel processing system with respect to the plurality of images taken by the plurality of photodetector arrays, wherein the parallel processing control portion controls, based on the stored positional shift amount, the transfer position of the processing elements, to which each line of shift registers transfers an image signal.

6. A high-speed vision sensor as claimed in claim 2, further comprising:

a timing controller that controls the plurality of photodetector arrays to take images at timings independent from one another; and a beam splitter that enables the plurality of photodetector arrays to pick up images from the same direction, and wherein the control circuit includes a parallel processing control portion controlling the plural lines of shift registers to transfer images taken by the respective photodetector arrays at the different times, and controlling the processing elements to perform calculation onto the images taken at the different times.

7. A high-speed vision sensor as claimed in claim 2, further comprising a filtering/beam splitter mechanism enabling the plurality of photodetector arrays to pick up, from the same direction, color-separated images, of an object, which have colors different from one another, and wherein the control circuit includes a parallel processing control portion controlling the plural lines of shift registers to transfer the color-separated images outputted from the respective photodetector arrays and controlling the processing elements to perform calculations onto the color-separated images.

8. A high-speed vision sensor as claimed in claim 1, further comprising data supply mechanism supplying predetermined data required for image processing calculation, wherein each of the plurality of shift registers successively transfers output signals, outputted from the corresponding analog-to-digital converter, and the predetermined data, supplied from the data supply mechanism, to the predetermined processing elements in the corresponding processing element row, and wherein the control circuit controls the photodetector array, the analog-to-digital converter array, the parallel processing system, and the data supply mechanism.

9. A high-speed vision sensor as claimed in claim 8, wherein the data supply mechanism includes a time-sharing mixing unit combining, according to a time-sharing method, output signals outputted from the analog-to-digital converters and the predetermined data.

10. A high-speed vision sensor as claimed in claim 1, wherein the parallel processing system further includes a plurality of data-transfer shift registers which are arranged in one-to-one correspondence with the plurality of rows of processing elements, each data-transfer shift register supplying predetermined data to the respective processing elements in the corresponding row.

11. A high-speed vision sensor as claimed in claim 1, wherein the at least one photodetector array includes a plurality of photodetector arrays, the parallel processing system including a single line of shift register for each processing element row, the single line of shift register being used in a time-sharing manner to transfer the output signals from the plurality of photodetector arrays.

* * * * *